(12) United States Patent
Hwang et al.

(10) Patent No.: US 12,069,642 B2
(45) Date of Patent: Aug. 20, 2024

(54) METHOD AND DEVICE FOR TRANSMISSION OR RECEPTION OF SIGNAL FOR MULTIPLE TRANSPORT BLOCK SCHEDULING

(71) Applicant: LG Electronics Inc., Seoul (KR)

(72) Inventors: Seunggye Hwang, Seoul (KR); Changhwan Park, Seoul (KR); Joonkui Ahn, Seoul (KR); Jaehyung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 292 days.

(21) Appl. No.: 17/441,030

(22) PCT Filed: Mar. 27, 2020

(86) PCT No.: PCT/KR2020/004230
§ 371 (c)(1),
(2) Date: Sep. 20, 2021

(87) PCT Pub. No.: WO2020/204497
PCT Pub. Date: Oct. 8, 2020

(65) Prior Publication Data
US 2022/0159677 A1    May 19, 2022

Related U.S. Application Data

(60) Provisional application No. 62/931,818, filed on Nov. 7, 2019.

(30) Foreign Application Priority Data

Mar. 29, 2019  (KR) ......................... 10-2019-0037020
Aug. 16, 2019  (KR) ......................... 10-2019-0100640
Oct. 4, 2019   (KR) ......................... 10-2019-0123021

(51) Int. Cl.
*H04W 72/1263* (2023.01)
*H04L 1/1812* (2023.01)
(Continued)

(52) U.S. Cl.
CPC ....... *H04W 72/1263* (2013.01); *H04L 1/1812* (2013.01); *H04L 5/0012* (2013.01); *H04W 72/23* (2023.01)

(58) Field of Classification Search
CPC ... H04W 72/1263; H04W 72/23; H04W 4/70; H04W 72/12; H04W 72/535;
(Continued)

(56) References Cited

U.S. PATENT DOCUMENTS

2012/0182944 A1   7/2012   Sorrentino et al.
2015/0223236 A1   8/2015   Ko et al.
(Continued)

FOREIGN PATENT DOCUMENTS

CN    102291209    12/2011
CN    106993332    7/2017
(Continued)

OTHER PUBLICATIONS

Ericsson, "Updated Feature lead summary Scheduling of multiple DL UL transport blocks in LTE MTC," Tdoc R1-1813759, Presented at 3GPP TSG-RAN WG1 Meeting #95, Spokane, USA, Nov. 12-16, 2018, 13 pages.
(Continued)

*Primary Examiner* — Hanh N Nguyen
(74) *Attorney, Agent, or Firm* — Fish & Richardson P.C.

(57) ABSTRACT

The present invention relates to a method performed in a wireless communication system supporting multiple transport block scheduling, and a device therefor, the method comprising: receiving downlink control information (DCI) for scheduling of one or more transport blocks; on the basis
(Continued)

(a)

(b)

of the number of the transport blocks to be scheduled, which is one, acquiring 2-bit information for a redundancy version of one transport block and 1-bit information for frequency hopping indication of the one transport block, from the DCI; and on the basis of the number of the transport blocks to be scheduled, which is two, acquiring 2-bit information for frequency hopping indication and a redundancy version of two transport blocks, from the DCI.

16 Claims, 27 Drawing Sheets

(51) Int. Cl.
  *H04L 5/00* (2006.01)
  *H04W 72/23* (2023.01)
(58) Field of Classification Search
  CPC ... H04L 1/1812; H04L 1/1819; H04L 1/1822; H04L 1/1864; H04L 1/1896; H04L 5/0048; H04L 5/0053; H04L 1/08; H04L 5/0044; H04L 1/189
  See application file for complete search history.

(56) References Cited

U.S. PATENT DOCUMENTS

| | | | | |
|---|---|---|---|---|
| 2020/0145964 | A1* | 5/2020 | Sengupta | H04L 1/0029 |
| 2020/0313793 | A1* | 10/2020 | Jung | H04L 5/0094 |
| 2022/0191899 | A1* | 6/2022 | Hwang | H04L 1/1822 |
| 2022/0191911 | A1* | 6/2022 | Hwang | H04W 4/70 |
| 2023/0155747 | A1* | 5/2023 | Choi | H04L 1/1819 |
| | | | | 370/329 |

FOREIGN PATENT DOCUMENTS

| | | |
|---|---|---|
| CN | 108292976 | 7/2018 |
| WO | WO2012029245 | 3/2012 |
| WO | WO 2018/143033 | 8/2018 |
| WO | WO 2019/049283 | 3/2019 |

OTHER PUBLICATIONS

International Search Report and Written Opinion in International Appln. No. PCT/KR2020/004230, dated Jul. 13, 2020, 14 pages (with English translation).
Qualcomm Incorporated, "Scheduling of multiple DL/UL transport blocks," R1-1902368, Presented at 3GPP TSG RAN WG1 Meeting #96, Athens, Greece, Feb. 25-Mar. 1, 2019, 13 pages.
Sierra Wireless, "LTE-M Multiple Transport Block Grant Design Considerations," R1-1901630, Presented at 3GPP TSG RAN WG1 Meeting #96, Athens, Greece, Feb. 25-Mar. 3, 2019, 13 pages.
ZTE, "Summary on Multiple TB scheduling enhancement for Nb-IoT," R1-1903257, Presented at 3GPP TSG RAN WG1 Meeting #96, Athens, Greece, Feb. 25-Mar. 1, 2019, 14 pages.
Extended European Search Report in European Appln. No. 20784457.2, dated Feb. 17, 2022, 8 pages.
Qualcomm Incorporated, "Scheduling of multiple DL/UL transport blocks," R1-1902376, Presented at 3GPP TSG RAN WG1 Meeting #96, Athens, Greece, Feb. 25-Mar. 1, 2019, 7 pages.
Office Action in Japanese Appln. No. 2021-557058, dated Mar. 14, 2023, 11 pages (with English translation).
Lenovo & Motorola Mobility, "Design of scheduling of multiple DU/UL TB for Rel.16 MTC," R1-1810582, Presented at 3GPP TSG RAN WG1 Meeting #94bis, Chengdu, China, Oct. 8-12, 2018, 4 pages.
Lenovo & Motorola Mobility, "Design of scheduling of multiple DU/UL TB for Rel.16 NBIoT," R1-1810584, 3GPP TSG RAN WG1 Meeting #94bis, Chengdu, China, Oct. 8-12, 2018, 3 pages.
Office Action in Japanese Appln. No. 2021-557058, dated Oct. 11, 2022, 8 pages (with English translation).
Huawei, HiSilicon, "DCI content for MTC and coverage enhancement," 3GPP TSG RAN WG1 Meeting #82, R1-154602, Beijing, China, Aug. 24-28, 2015, 5 pages.
Lenovo, Motorola Mobility, "Design of scheduling of multiple DL/UL TB for Rel. 16 NBIoT," 3GPP TSG RAN WG1 Meeting #94bis, R1-1810584, Chengdu, China, Oct. 8-12, 2018, 3 pages.
Lenovo, Motorola Mobility,"Design of scheduling of multiple DL/UL TB for Rel.16 MTC," 3GPP TSG RAN WG1 Meeting #94bis, R1-1810582, Chengdu, China, Oct. 8-12, 2018, 4 pages.

* cited by examiner (a) In-band system (b) Guard-band system (c) Stand-alone system (a)  (b)

METHOD AND DEVICE FOR TRANSMISSION OR RECEPTION OF SIGNAL FOR MULTIPLE TRANSPORT BLOCK SCHEDULING

CROSS-REFERENCE TO RELATED APPLICATIONS

This application is a National Stage application under 35 U.S.C. § 371 of International Application No. PCT/KR2020/004230, filed on Mar. 27, 2020, which claims the benefit of U.S. Provisional Application No. 62/931,818, filed on Nov. 7, 2019, and Korean Application Nos. 10-2019-0123021, filed on Oct. 4, 2019, 10-2019-0100640, filed on Aug. 16, 2019, and 10-2019-0037020, filed on Mar. 29, 2019. The disclosures of the prior applications are incorporated by reference in their entirety.

TECHNICAL FIELD

The present disclosure relates to a wireless communication system, and more particularly, to a method and apparatus for transmitting and receiving a signal in a wireless communication system supporting multi-transport block (TB) scheduling.

BACKGROUND

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

SUMMARY

An aspect of the present disclosure is to provide a method and apparatus for efficiently transmitting and receiving a signal in a wireless communication system supporting multi-transport block (TB) scheduling.

More particularly, an aspect of the present disclosure is to provide a method and apparatus for efficiently transmitting and receiving a downlink control channel or downlink control information in a wireless communication system supporting multi-TB scheduling.

It will be appreciated by persons skilled in the art that the objects that could be achieved with the present disclosure are not limited to what has been particularly described hereinabove and the above and other objects that the present disclosure could achieve will be more clearly understood from the following detailed description.

According to one aspect of the present disclosure, a method performed by a user equipment (UE) in a wireless communication system supporting multiple transport block scheduling is provided. The method may include receiving downlink control information (DCI) scheduling one or more transport blocks, obtaining 2-bit information for a redundancy version of one transport block and 1-bit information for frequency hopping indication for the one transport block from the DCI, based on the number of the scheduled one or more transport blocks being 1, and obtaining 2-bit information for a redundancy version and frequency hopping indication for two transport blocks from the DCI, based on the number of the scheduled one or more transport blocks being 2.

According to another aspect of the present disclosure, a UE configured to operate in a wireless communication system is provided. The UE may include a transceiver and a processor configured to perform operations by controlling the transceiver. The operations may include receiving downlink control information (DCI) scheduling one or more transport blocks, obtaining 2-bit information for a redundancy version of one transport block and 1-bit information for frequency hopping indication for the one transport block from the DCI, based on the number of the scheduled one or more transport blocks being 1, and obtaining 2-bit information for a redundancy version and frequency hopping indication for two transport blocks from the DCI, based on the number of the scheduled one or more transport blocks being 2.

According to another aspect of the present disclosure, a computer-readable storage medium storing instructions which, when executed by a processor, are configured to cause the processor to perform operations is provided. The operations may include receiving downlink control information (DCI) scheduling one or more transport blocks, obtaining 2-bit information for a redundancy version of one transport block and 1-bit information for frequency hopping indication for the one transport block from the DCI, based on the number of the scheduled one or more transport blocks being 1, and obtaining 2-bit information for a redundancy version and frequency hopping indication for two transport blocks from the DCI, based on the number of the scheduled one or more transport blocks being 2.

The method or the operations may further include, based on the number of the scheduled one or more transport blocks being 2 and a repetition number being two or more, determining a redundancy version based on first 1-bit information out of the 2-bit information for the two transport blocks, and determining whether to apply frequency hopping based on second 1-bit information out of the 2-bit information for the two transport blocks.

The first 1-bit information may indicate a redundancy version of 0 or 2.

The method or the operations may further include, based on the number of the scheduled one or more transport blocks being 2 and a repetition number being 1, determining a redundancy version based on the 2-bit information for the two transport blocks, and determining that frequency hopping is disabled.

The 2-bit information for the two transport blocks may indicate one of redundancy versions of 0, 1, 2, and 3.

The DCI may include new data indicator (NDI) information having the same number of bits as the number of the scheduled one or more transport blocks.

The method or the operations may further include transmitting the one or more transport blocks on a physical uplink shared channel (PUSCH) based on the DCI.

The method or the operations may further include receiving the one or more transport blocks on a physical downlink shared channel (PDSCH) based on the DCI.

The UE may not be configured to use 64-quadrature amplitude modulation (64QAM).

The DCI may be configured to schedule up to 8 transport blocks.

The method or the operations may further include receiving a higher-layer signal indicating a maximum number of transport blocks scheduled by one DCI.

The DCI may include information about the number of transport blocks.

According to the present disclosure, a signal may be efficiently transmitted and received in a wireless communication system supporting multi-transport block (TB) scheduling.

More particularly, a downlink control channel or downlink control information may be efficiently transmitted and received in a wireless communication system supporting multi-TB scheduling.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Figure 1:
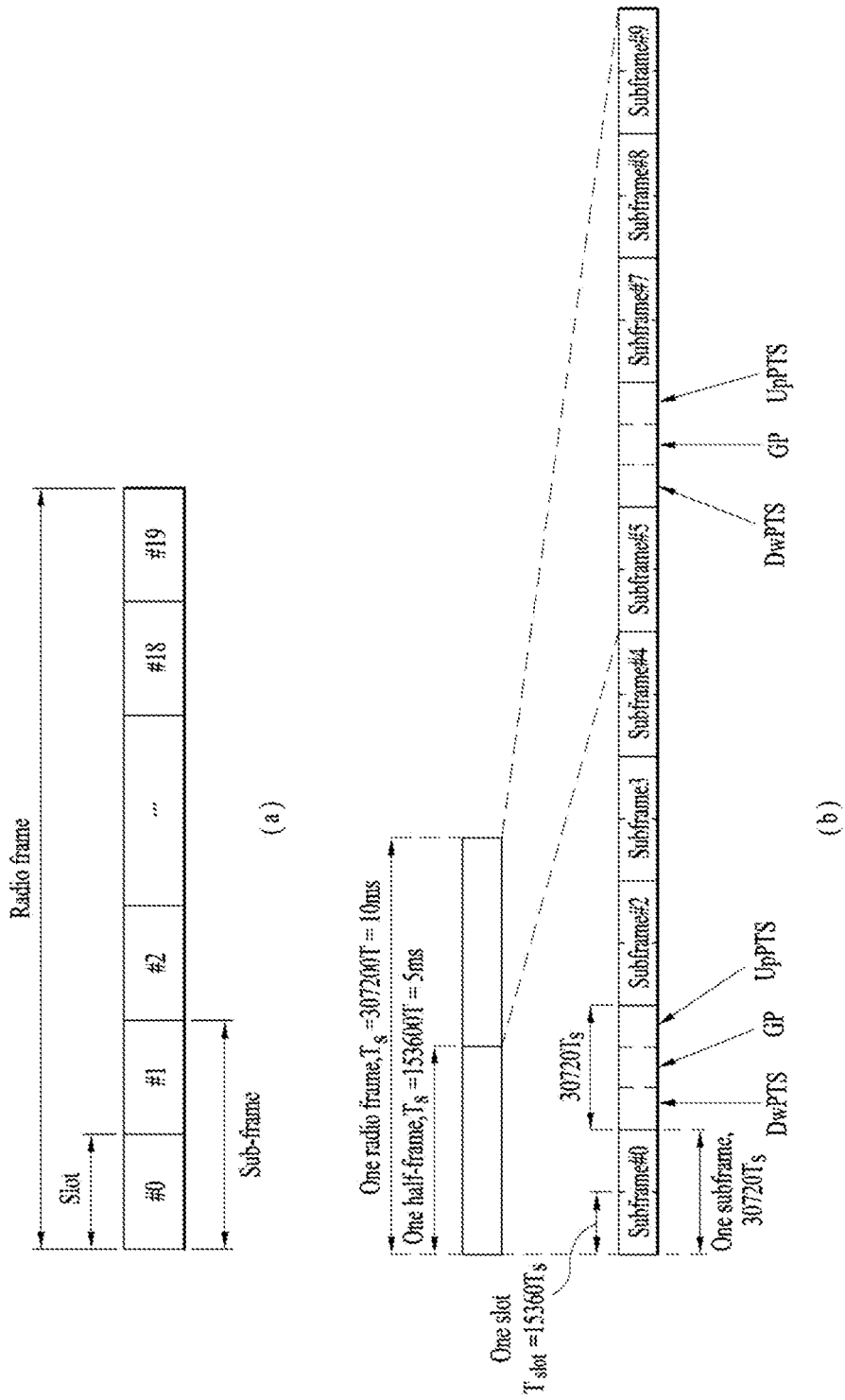
FIG. 1 is a diagram illustrating a long term evolution (LTE) radio frame structure.

In the following, downlink (DL) refers to communication from a base station (BS) to a user equipment (UE), and uplink (UL) refers to communication from the UE to the BS. In the case of DL, a transmitter may be a part of the BS, and a receiver may be a part of the UE. In the case of UL, a transmitter may be a part of the UE, and a receiver may be a part of the BS.

The technology described herein is applicable to various wireless access systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented as radio technology such as universal terrestrial radio access (UTRA) or CDMA2000. The TDMA may be implemented as radio technology such as global system for mobile communications (GSM), general packet radio service (GPRS), or enhanced data rates for GSM evolution (EDGE). The OFDMA may be implemented as radio technology such as the Institute of Electrical and Electronics Engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). The 3rd generation partnership project (3GPP) long term evolution (LTE) is a part of an evolved UMTS (E-UMTS) using the E-UTRA. LTE-advance (LTE-A) or LTE-A pro is an evolved version of the 3GPP LTE. 3GPP new radio or new radio access technology (3GPP NR) is an evolved version of the 3GPP LTE, LTE-A, or LTE-A pro.

Although the present disclosure is described based on 3GPP communication systems (e.g., LTE-A, NR, etc.) for clarity of description, the spirit of the present disclosure is not limited thereto. The LTE refers to the technology beyond 3GPP technical specification (TS) 36.xxx Release 8. In particular, the LTE technology beyond 3GPP TS 36.xxx Release 10 is referred to as the LTE-A, and the LTE technology beyond 3GPP TS 36.xxx Release 13 is referred to as the LTE-A pro. The 3GPP NR refers to the technology beyond 3GPP TS 38.xxx Release 15. The LTE/NR may be called '3GPP system'. Herein, "xxx" refers to a standard specification number. The LTE/NR may be commonly referred to as '3GPP system'. Details of the background, terminology, abbreviations, etc. used herein may be found in documents published before the present disclosure. For example, the following documents may be referenced.
3GPP LTE
- 36.211: Physical channels and modulation
- 36.212: Multiplexing and channel coding
- 36.213: Physical layer procedures
- 36.300: Overall description
- 36.304: User Equipment (UE) procedures in idle mode
- 36.331: Radio Resource Control (RRC)

3GPP NR
- 38.211: Physical channels and modulation
- 38.212: Multiplexing and channel coding
- 38.213: Physical layer procedures for control
- 38.214: Physical layer procedures for data
- 38.300: NR and NG-RAN Overall Description
- 38.304: User Equipment (UE) procedures in Idle mode and RRC Inactive state
- 36.331: Radio Resource Control (RRC) protocol specification A. Frame Structure Hereinafter, an LTE frame structure will be described.

In the LTE standards, the sizes of various fields in the time domain are expressed in a time unit (Ts=1/(15000×2048) seconds) unless specified otherwise. DL and UL transmissions are organized in radio frames, each of which has a duration of 10 ms (Tf=307200×Ts=10 ms). Two radio frame structures are supported.

Type 1 is applicable to frequency division duplex (FDD).
Type 2 is applicable to time division duplex (TDD).
(1) Frame Structure Type 1

Frame structure type 1 is applicable to both full-duplex FDD and half-duplex FDD. Each radio frame has a duration of $T_f=307200 \cdot T_s=10$ ms and is composed of 20 slots, each of which has a length of $T_{slot}=15360 \cdot T_s=0.5$ ms. The 20 slots are indexed from 0 to 19. A subframe is composed of two consecutive slots. That is, subframe i is composed of slot 2$i$ and slot (2$i$+1). In the FDD, 10 subframes may be used for DL transmission, and 10 subframes may be available for UL transmissions at every interval of 10 ms. DL and UL transmissions are separated in the frequency domain. However, the UE may not perform transmission and reception simultaneously in the half-duplex FDD system.

FIG. 1(a) illustrates a radio frame structure of frame structure type 1.

Referring to FIG. 1(a), the radio frame includes 10 subframes. Each subframe includes two slots in the time domain. The time to transmit one subframe is defined as a transmission time interval (TTI). For example, one subframe may have a length of 1 ms, and one slot may have a length of 0.5 ms. One slot may include a plurality of orthogonal frequency division multiplexing (OFDM) symbols in the time domain. Since the 3GPP LTE system uses OFDMA in DL, the OFDM symbol may represent one symbol period. The OFDM symbol may be referred to as an SC-FDMA symbol or a symbol period. A resource block (RB) is a resource allocation unit and includes a plurality of consecutive subcarriers in one slot. This radio frame structure is merely exemplary. Therefore, the number of subframes in a radio frame, the number of slots in a subframe, or the number of OFDM symbols in a slot may be changed in various ways.

(2) Frame Structure Type 2

Frame structure type 2 is applicable to TDD. Each radio frame has a length of $T_f=307200 \times T_s=10$ ms and includes two half-frames, each of which has a length of $15360 \cdot T_s=0.5$ ms. Each half-frame includes five subframes, each of which has a length of $30720 \cdot T_s=1$ ms. Supported UL-DL configurations are defined in the standards. In each subframe of a radio frame, "D" denotes a subframe reserved for DL transmission, "U" denotes a subframe reserved for UL transmission, and "S" denotes a special subframe including the following three fields: downlink pilot time slot (DwPTS), guard period (GP), and uplink pilot time slot (UpPTS). The DwPTS may be referred to as a DL period, and the UpPTS may be referred to as a UL period. The lengths of the DwPTS and UpPTS depend on the total length of the DwPTS, GP, and UpPTS, which is equal to $30720 \cdot T_s=1$ ms Subframe i is composed of two slots, slot 2$i$ and slot (2$i$+1), each of which has a length of $T_{slot}=15360 \cdot T_s=0.5$ ms.

FIG. 1(b) illustrates a radio frame structure of frame structure type 2.

FIG. 1(b) shows that a UL-DL configuration supports DL-to-UL switch-point periodicities of 5 ms and 10 ms. In the case of the 5-ms DL-to-UL switch-point periodicity, the special subframe exists across two half-frames. In the case of the 10-ms DL-to-UL switch-point periodicity, the special subframe exists only in the first half-frame. The DwPTS and subframe 0 and 5 are always reserved for DL transmission, and the UpPTS and a subframe next to the special subframe are always reserved for UL transmission.

Next, a description will be given of a frame structure of NR.

Figure 2:
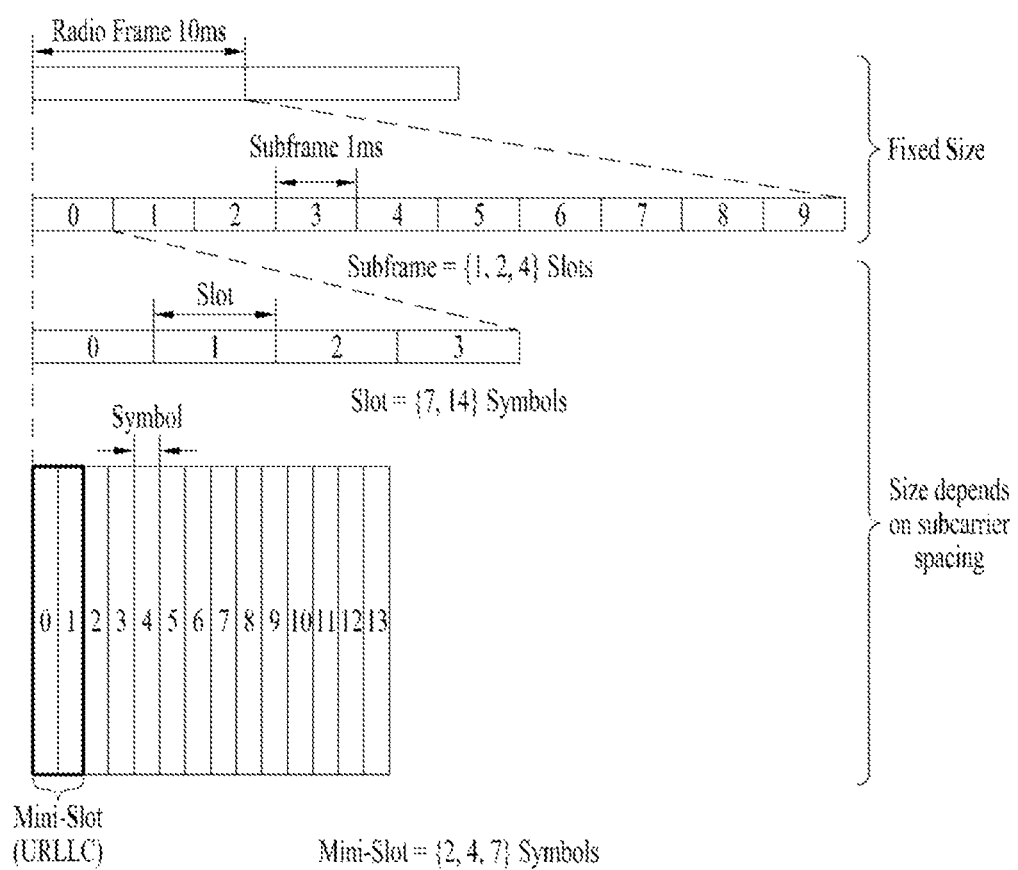
FIG. 2 is a diagram illustrating an exemplary frame structure in new RAT (NR)

FIG. 2 illustrates an example of a frame structure in NR.

The NR system may support various numerologies. The numerology may be defined by subcarrier spacing and cyclic prefix (CP) overhead. Multiple subcarrier spacing may be derived by scaling basic subcarrier spacing by an integer N (or p). In addition, even though very low subcarrier spacing is assumed not to be used at a very high subcarrier frequency, a numerology to be used may be selected independently from frequency bands. In the NR system, various frame structures may be supported based on multiple numerologies.

Hereinafter, an OFDM numerology and a frame structure, which may be considered in the NR system, will be described. Table 1 shows multiple OFDM numerologies supported in the NR system.

TABLE 1

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

Regarding a frame structure in the NR system, the sizes of various fields in the time domain are expressed in multiples of a time unit, $T_s=1/(\Delta f_{max} \cdot N_f)$. In this case, $\Delta f_{max}=480 \cdot 10^3$ and $N_f=4096$. Downlink and uplink transmissions are configured in a radio frame having a duration of $T_f=(\Delta f_{max} N_f/100) \cdot T_s=1$ ms. The radio frame is composed of 10 subframes, each having a duration of $T_{sf}=(\Delta f_{max}N_f/1000)\cdot T_s=1$ ms. In this case, there may be a set of uplink frames and a set of downlink frames. Transmission of an uplink frame with frame number i from a UE needs to be performed earlier by $T_{TA}=N_{TA}T_s$ than the start of a corresponding downlink frame of the UE. Regarding the numerology p, slots are numbered in a subframe in the following ascending order: $n_s^\mu \in \{0, \ldots, N_{subframe}^{slots,\mu}-1\}$ and numbered in a frame in the following ascending order: $n_{s,f}^\mu \in \{0, \ldots, N_{frame}^{slots,\mu}-1\}$. One slot is composed of $N_{symb}^\mu$ consecutive OFDM symbols, and $N_{symb}^\mu$ is determined by the current numerology and slot configuration. The starts of $n_s^\mu$ slots in a subframe are temporally aligned with those of $n_s^\mu N_{symb}^\mu$ OFDM symbols in the same subframe. Some UEs may not perform transmission and reception at the same time, and this means that some OFDM symbols in a downlink slot or an uplink slot are unavailable. Table 2 shows the number of OFDM symbols per slot ($N_{symb}^{slot}$), the number of slots per radio frame ($N_{slot}^{frame,\mu}$), and the number of slots per subframe ($N_{slot}^{subframe,\mu}$) in the case of a normal CP, and Table 3 shows the number of OFDM symbols per slot, the number of slots per radio frame, and the number of slots per subframe in the case of an extended CP.

TABLE 2

| μ | $N_{symb}^{slot}$ | $N_{slot}^{frame, \mu}$ | $N_{slot}^{subframe, \mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame, \mu}$ | $N_{slot}^{subframe, \mu}$ |
|---|---|---|---|
| 2 | 12 | 40 | 4 |

FIG. 1(a) shows an example of μ=2, i.e., 60 kHz subcarrier spacing (SCS). Referring to Table 2, one subframe may include four slots. FIG. 2 shows slots in a subframe (subframe={1, 2, 4}). In this case, the number of slots included in the subframe may be defined as shown in Table 2 above.

In addition, a mini-slot may be composed of 2, 4, or 7 symbols. Alternatively, the number of symbols included in the mini-slot may vary.

B. Physical Resources

Figure 3:
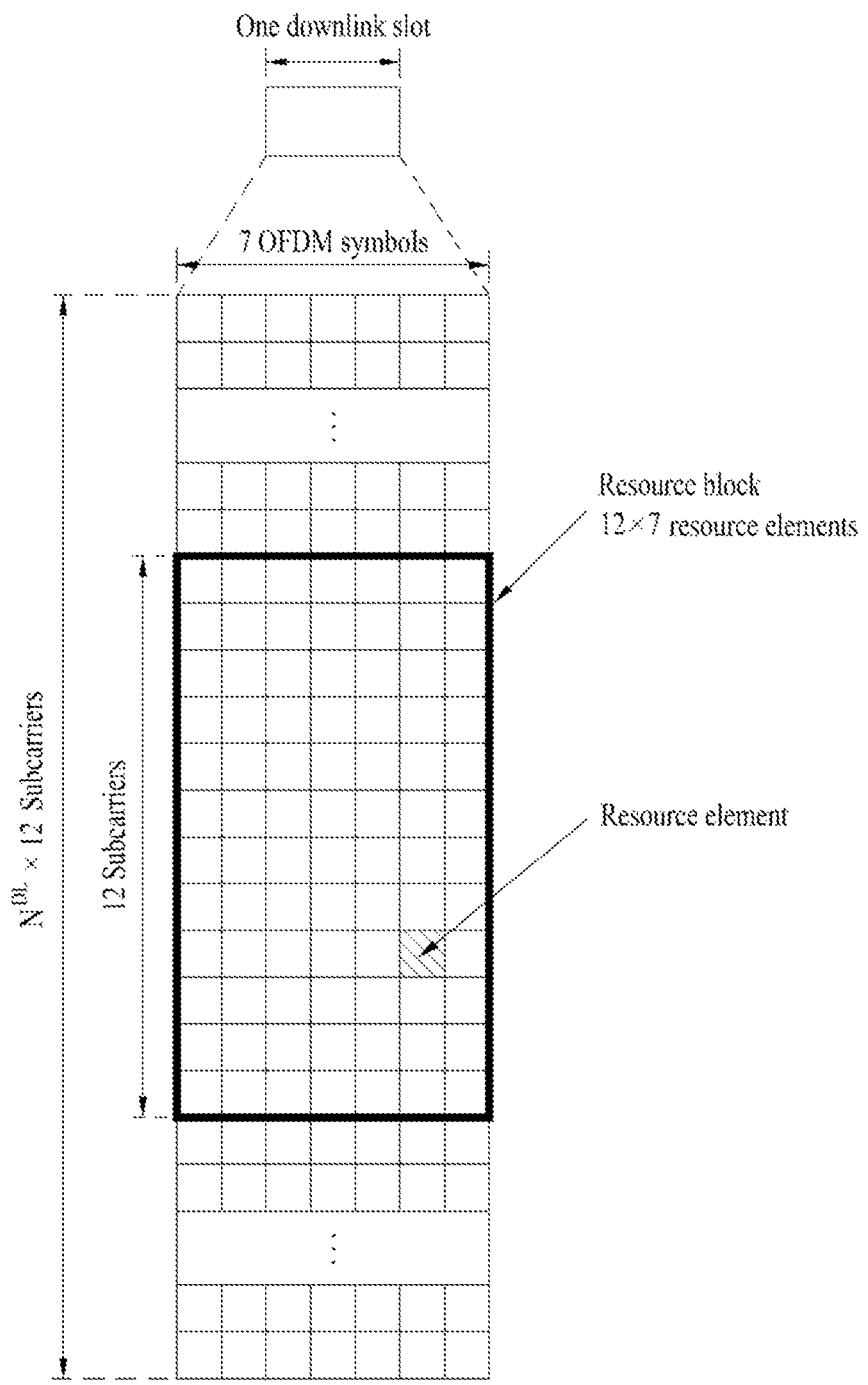
FIG. 3 is a diagram illustrating a resource grid for the duration of one downlink (DL) slot.

FIG. 3 illustrates a resource grid for one DL slot.

Referring to FIG. 3, a downlink slot includes a plurality of OFDM symbols in the time domain. One downlink slot includes 7 OFDM symbols in the time domain, and a resource block (RB) for example includes 12 subcarriers in the frequency domain. However, the present disclosure is not limited thereto. Each element of the resource grid is referred to as a resource element (RE). One RB includes 12×7 REs. The number of RBs in the DL slot depends on a downlink transmission bandwidth. An uplink slot may have the same structure as the downlink slot.

Figure 4:
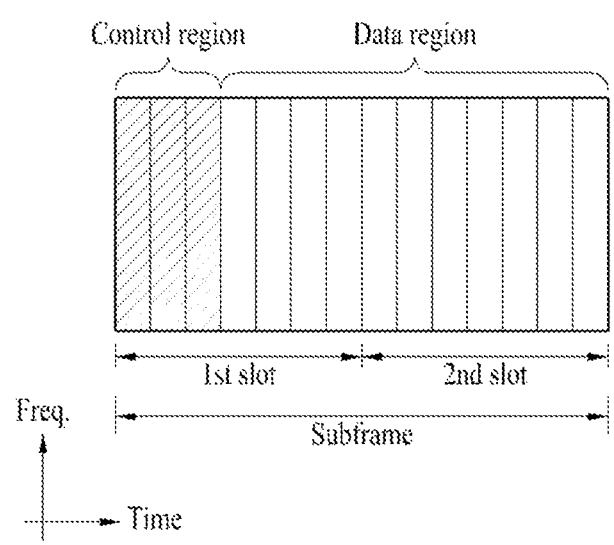
FIG. 4 is a diagram illustrating a DL subframe structure.

FIG. 4 illustrates the structure of a downlink subframe.

Referring to FIG. 4, up to three OFDM symbols at the start of the first slot in a downlink subframe are used as a control region to which a control channel is allocated. The remaining OFDM symbols are used as a data region to which a physical downlink shared channel (PDSCH) is allocated. Downlink control channels used in the 3GPP LTE system include a physical control format indicator channel (PCFICH), a physical downlink control channel (PDCCH), a physical hybrid ARQ indicator channel (PHICH), etc. The PCFICH is transmitted in the first OFDM symbol in a subframe and carries information for the number of OFDM symbols used for transmitting a control channel. The PHICH carries a hybrid automatic repeat request (HARQ) acknowledgement/negative-acknowledgement or not-acknowledgement (ACK/NACK) signal in response to uplink transmission. Control information transmitted on the PDCCH is referred to as downlink control information (DCI). The DCI contains uplink or downlink scheduling information or an uplink transmission (Tx) power control command for a random UE group. The PDCCH carries information for resource allocation for a downlink shared channel (DL-SCH), information for resource allocation for a uplink shared channel, paging information for a paging channel (PCH), and a DL-SCH voice over Internet protocol (VoIP) corresponding to resource allocation for a higher layer control message such as a random access response transmitted on the PDSCH, a set of Tx power control commands for individual UEs in a random UE group, a Tx power control command, activation of the Tx power control command, etc. Multiple PDCCHs may be transmitted in the control region, and the UE may monitor the multiple PDCCHs. The PDCCH may be transmitted on one control channel element (CCE) or aggregation of multiple consecutive CCEs. The CCE is a logical allocation unit used to provide the PDCCH with a coding rate based on the state of a radio channel. The CCE corresponds to a plurality of resource element groups (REGs). A PDCCH format and the number of available PDCCH bits are determined based on a relationship between the number of CCEs and the coding rate provided by the CCE. The base station determines the PDCCH format depending on DCI to be transmitted to the UE and adds a cyclic redundancy check (CRC) to control information. The CRC is masked with a unique identifier (e.g., radio network temporary identifier (RNTI)) according to the owner or usage of the PDCCH. If the PDCCH is for a specific UE, the CRC may be masked with a unique UE identifier (e.g., cell-RNTI). If the PDCCH is for a paging message, the CRC may be masked with a paging indication identifier (e.g., paging-RNTI (P-RNTI)). If the PDCCH is for system information (more specifically, for a system information block (SIB)), the CRC may be masked with a system information identifier and a system information RNTI (SI-RNTI). Further, the CRC may be masked with a random access-RNTI (RA-RNTI) to indicate a random access response in response to transmission of a random access preamble of the UE.

Figure 5:
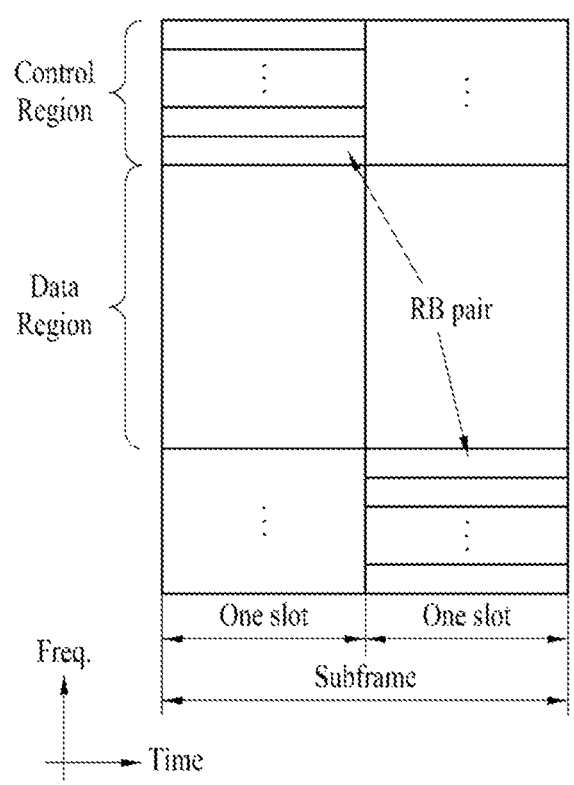
FIG. 5 is a diagram illustrating an uplink (UL) subframe structure.

FIG. 5 illustrates the structure of an uplink subframe.

Referring to FIG. 5, an uplink subframe may be divided into a control region and a data region in the frequency domain. A physical uplink control channel (PUCCH) for carrying uplink control information may be allocated to the control region, and a physical uplink shared channel (PUSCH) for carrying user data may be allocated to the data region. The UE may not transmit the PUCCH and the PUSCH at the same time to maintain single-carrier characteristics. The PUCCH for the UE is allocated to an RB pair in a subframe. The RBs included in the RB pair occupy different subcarriers in two slots. In other words, the RB pair allocated for the PUCCH may be frequency-hopped at a slot boundary.

As physical resources in the NR system, an antenna port, a resource grid, a resource element, a resource block, a carrier part, etc. may be considered. Hereinafter, the above physical resources considered in the NR system will be described in detail. First, an antenna port may be defined such that a channel carrying a symbol on the antenna port is inferred from a channel carrying another symbol on the same antenna port. When the large-scale properties of a channel carrying a symbol on an antenna port are inferred from a channel carrying a symbol on another antenna port, the two antenna ports may be said to be in quasi co-located or quasi co-location (QC/QCL) relationship. The large-scale properties may include at least one of delay spread, Doppler spread, frequency shift, average received power, and received timing.

Figure 6:
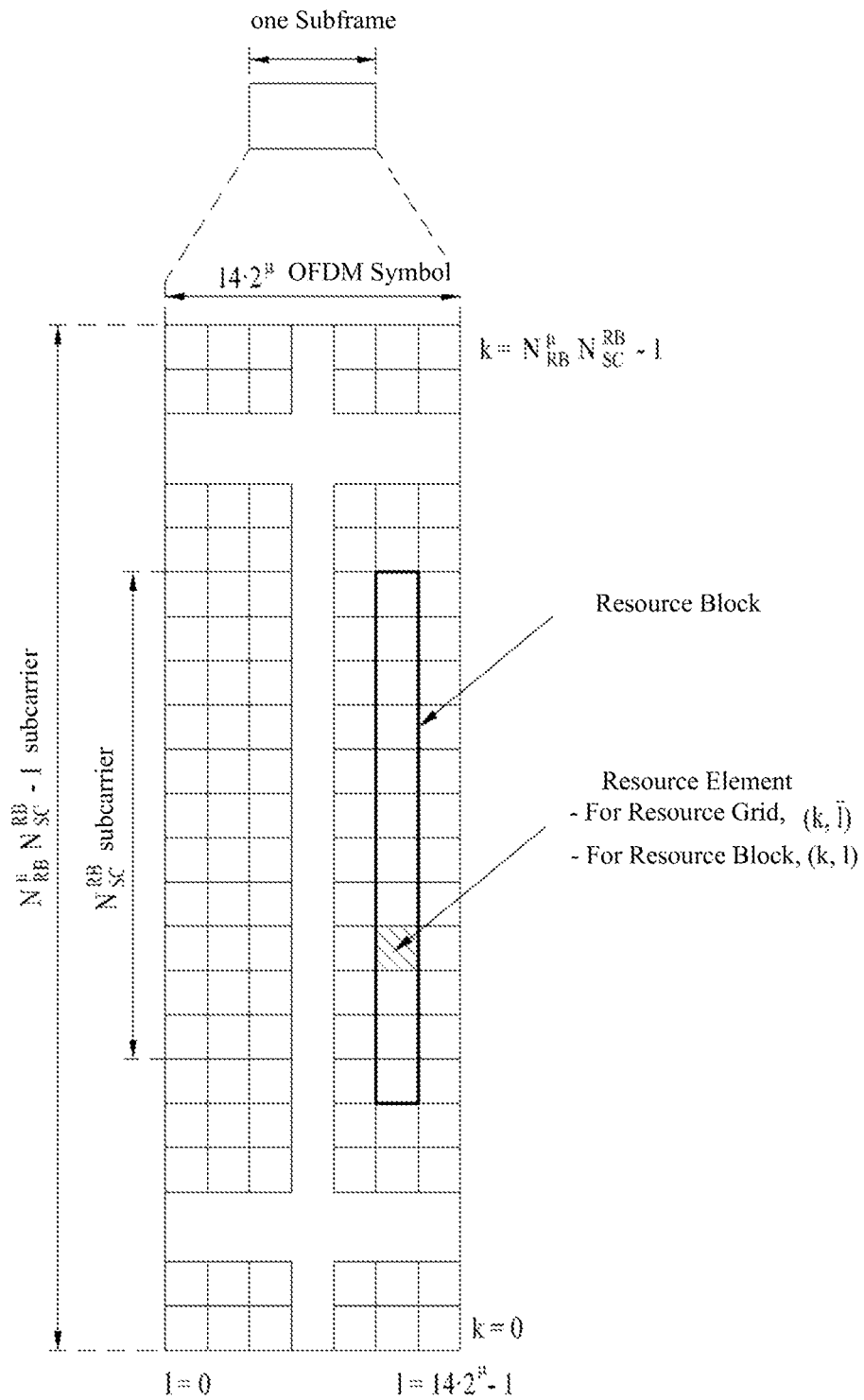
FIG. 6 is a diagram illustrating an exemplary resource grid in NR.

FIG. 6 illustrates an example of a resource grid in NR.

Referring to the resource grid of FIG. 6, there are $N_{RB}^{\mu} N_{sc}^{RB}$ subcarriers in the frequency domain, and there are $14 \cdot 2\mu$ OFDM symbols in one subframe. However, the resource grid is merely exemplary and the present disclosure is not limited thereto. In the NR system, a transmitted signal is described by one or more resource grids, each including $N_{RB}^{\mu} N_{sc}^{RB}$ subcarriers, and $2^{\mu} N_{symb}^{(\mu)}$ OFDM symbols. In this case, $N_{RB}^{\mu} \leq N_{RB}^{max,\mu}$. $N_{RB}^{max,\mu}$ denotes the maximum transmission bandwidth and may change not only between numerologies but also between uplink and downlink. As shown in FIG. 6, one resource grid may be configured for each numerology and antenna port p. Each element of the resource grid for the numerology and antenna port p is referred to as a resource element, and it is uniquely identified by an index pair (k, l̄), where k is an index in the frequency domain (k=0, ..., $N_{RB}^{\mu} N_{sc}^{RB}$−1) and l̄ denotes the location of a symbol in the subframe (l̄=0, ..., $2^{\mu} N_{symb}^{(\mu)}$−1). The resource element (k, l̄) for the numerology μ and antenna port p corresponds to a complex value $a_{k,\bar{l}}^{(p,\mu)}$. When there is no risk of confusion or when a specific antenna port or numerology is not specified, the indexes p and μ may be dropped, and as a result, the complex value may be $a_{k,\bar{l}}^{(p)}$ or $a_{k,\bar{l}}$. In addition, a resource block (RB) is defined as $N_{sc}^{RB}$=12 consecutive subcarriers in the frequency domain.

Point A serves as a common reference point for resource block grids and may be obtained as follows.

OffsetToPointA for primary cell (PCell) downlink represents a frequency offset between point A and the lowest subcarrier of the lowest resource block in an SS/PBCH block used by the UE for initial cell selection. OffsetToPointA is expressed in the unit of resource block on the assumption of 15 kHz SCS for frequency range 1 (FR1) and 60 kHz SCS for frequency range 2 (FR2).

AbsoluteFrequencyPointA represents the frequency location of point A expressed as in absolute radio-frequency channel number (ARFCN).

Common resource blocks are numbered from 0 upwards in the frequency domain for SCS configuration μ.

The center of subcarrier 0 of common resource block 0 for the SCS configuration P is equivalent to point A.

The relation between a common RB number $n_{CRB}^{\mu}$ in the frequency domain and a resource element (k, l) for the SCS configuration P is determined as shown in Equation 1.

$$n_{CRB}^{\mu} = \left\lfloor \frac{k}{N_{sc}^{RB}} \right\rfloor \quad \text{[Equation 1]}$$

In Equation 1, k is defined relative to point A such that k=0 corresponds to a subcarrier centered on point A.

Physical resource blocks are defined within a bandwidth part (BWP) and numbered from 0 to $N_{BWP,i}^{size}$−1, where i denotes the number of the BWP.

The relationship between a physical resource block $n_{PRB}$ and a common resource block $n_{CRB}$ in BWP i is given by Equation 2.

$$n_{CRB} = n_{PRB} + N_{BWP,i}^{start} \quad \text{[Equation 2]}$$

In Equation 2, $N_{BWP,i}^{start}$ is a common resource block where the BWP starts relative to common resource block 0.

Figure 7:
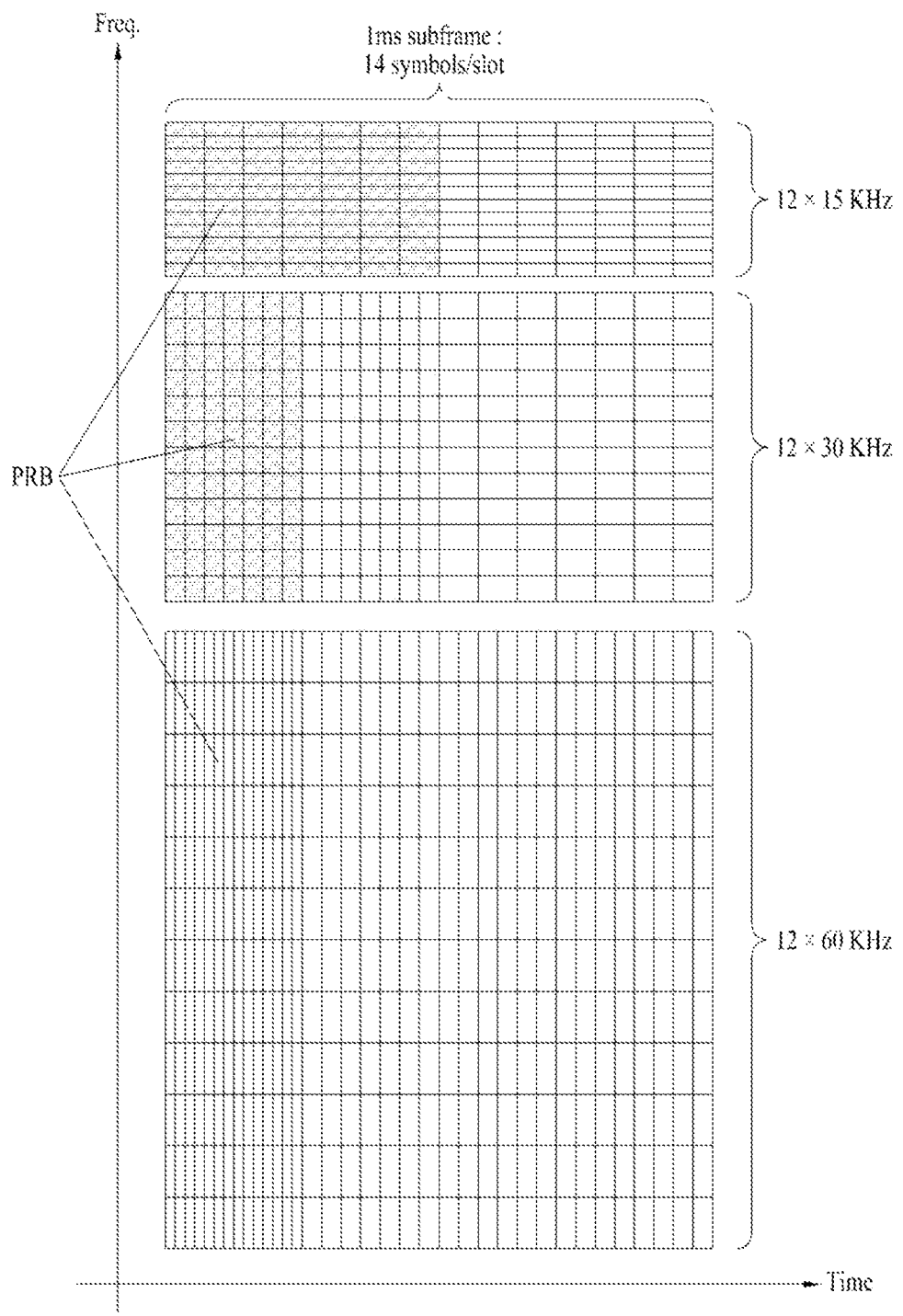
FIG. 7 is a diagram illustrating an exemplary physical resource block in NR.

FIG. 7 illustrates an example of a physical resource block in NR.

C. MTC (Machine Type Communication

The Machine Type Communication (MTC) refers to communication technology adopted by 3$^{rd}$ Generation Partnership Project (3GPP) to meet Internet of Things (IoT) service requirements. Since the MTC does not require high throughput, it may be used as an application for machine-to-machine (M2M) and Internet of Things (IoT).

The MTC may be implemented to satisfy the following requirements: (i) low cost and low complexity; (ii) enhanced coverage; and (iii) low power consumption.

The MTC was introduced in 3GPP release 10. Hereinafter, the MTC features added in each 3GPP release will be described.

The MTC load control was introduced in 3GPP releases 10 and 11.

The load control method prevents IoT (or M2M) devices from creating a heavy load on the base station suddenly.

Specifically, according to release 10, when a load occurs, the base station may disconnect connections with IoT devices to control the load. According to release 11, the base station may prevent the UE from attempting to establish a connection by informing the UE that access will become available through broadcasting such as SIB14.

In release 12, the features of low-cost MTC were added, and to this end, UE category 0 was newly defined. The UE category indicates the amount of data that the UE is capable of processing using a communication modem.

Specifically, a UE that belongs to UE category 0 may use a reduced peak data rate, a half-duplex operation with relaxed RF requirements, and a single reception antenna, thereby reducing the baseband and RF complexity of the UE.

In Release 13, enhanced MTC (eMTC) was introduced. In the eMTC, the UE operates in a bandwidth of 1.08 MHz, which is the minimum frequency bandwidth supported by legacy LTE, thereby further reducing the cost and power consumption.

Although the following description relates to the eMTC, the description is equally applicable to the MTC, 5G (or NR) MTC, etc. For convenience of description, all types of MTC is commonly referred to as 'MTC'.

In the following description, the MTC may be referred to as another terminology such as 'eMTC', 'LTE-M1/M2', 'bandwidth reduced low complexity/coverage enhanced (BL/CE)', 'non-BL UE (in enhanced coverage)', 'NR MTC', or 'enhanced BL/CE'. Further, the term "MTC" may be replaced with a term defined in the future 3GPP standards.

1) General Features of MTC (1) The MTC operates only in a specific system bandwidth (or channel bandwidth).

The specific system bandwidth may use 6 RBs of the legacy LTE as shown in Table 4 below and defined by considering the frequency range and subcarrier spacing (SCS) shown in Tables 5 to 7. The specific system bandwidth may be referred to as narrowband (NB). Here, the legacy LTE may encompass the contents described in the 3GPP standards expect the MTC. In the NR, the MTC may use RBs corresponding the smallest system bandwidth in Tables 6 and 7 as in the legacy LTE. Alternatively, the MTC may operate in at least one BWP or in a specific band of a BWP.

TABLE 4

| Channel bandwidth BWChannel [MHz] | 1.4 | 3 | 5 | 10 | 15 | 20 |
|---|---|---|---|---|---|---|
| Transmission bandwidth configuration $N_{RB}$ | 6 | 15 | 25 | 50 | 75 | 100 |

Table 5 shows the frequency ranges (FRs) defined for the NR.

TABLE 5

| Frequency range designation | Corresponding frequency range |
|---|---|
| FR1 | 450 MHz-6000 MHz |
| FR2 | 24250 MHz-52600 MHz |

Table 6 shows the maximum transmission bandwidth configuration (NRB) for the channel bandwidth and SCS in NR FR1.

TABLE 6

| SCS (kHz) | 5 MHz NRB | 10 MHz NRB | 15 MHz NRB | 20 MHz NRB | 25 MHz NRB | 30 MHz NRB | 40 MHz NRB | 50 MHz NRB | 60 MHz NRB | 80 MHz NRB | 90 MHz NRB | 100 MHz NRB |
|---|---|---|---|---|---|---|---|---|---|---|---|---|
| 15 | 25 | 52 | 79 | 106 | 133 | 160 | 216 | 270 | N/A | N/A | N/A | N/A |
| 30 | 11 | 24 | 38 | 51 | 65 | 78 | 106 | 133 | 162 | 217 | 245 | 273 |
| 60 | N/A | 11 | 18 | 24 | 31 | 38 | 51 | 65 | 79 | 107 | 121 | 135 |

Table 7 shows the maximum transmission bandwidth configuration (NRB) for the channel bandwidth and SCS in NR FR2.

TABLE 7

| SCS (kHz) | 50 MHz NRB | 100 MHz NRB | 200 MHz NRB | 400 MHz NRB |
|---|---|---|---|---|
| 60 | 66 | 132 | 264 | N.A |
| 120 | 32 | 66 | 132 | 264 |

Hereinafter, the MTC narrowband (NB) will be described in detail.

The MTC follows narrowband operation to transmit and receive physical channels and signals, and the maximum channel bandwidth is reduced to 1.08 MHz or 6 (LTE) RBs.

The narrowband may be used as a reference unit for allocating resources to some downlink and uplink channels, and the physical location of each narrowband in the frequency domain may vary depending on the system bandwidth.

The 1.08 MHz bandwidth for the MTC is defined to allow an MTC UE to follow the same cell search and random access procedures as those of the legacy UE.

The MTC may be supported by a cell with a much larger bandwidth (e.g., 10 MHz), but the physical channels and signals transmitted/received in the MTC are always limited to 1.08 MHz.

The larger bandwidth may be supported by the legacy LTE system, NR system, 5G system, etc.

The narrowband is defined as 6 non-overlapping consecutive physical RBs in the frequency domain.

If $N_{NB}^{UL} \geq 4$, a wideband is defined as four non-overlapping narrowbands in the frequency domain. If $N_{NB}^{UL} < 4$, $N_{WB}^{UL} = 1$ and a single wideband is composed of $N_{NB}^{UL}$ non-overlapping narrowband(s).

For example, in the case of a 10 MHz channel, 8 non-overlapping narrowbands are defined.

Figure 8:
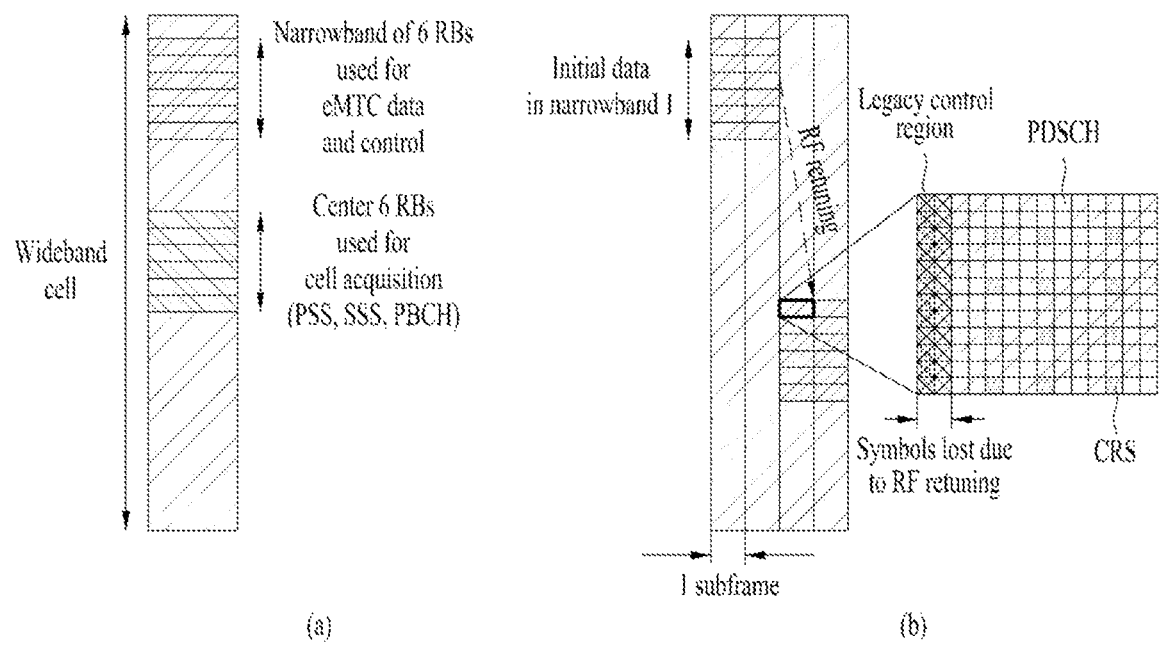
FIG. 8 is a diagram illustrating an exemplary narrowband operation and frequency diversity.

FIG. 8 illustrates examples of narrowband operations and frequency diversity.

Specifically, FIG. 8(a) illustrates an example of the narrowband operation, and FIG. 8(b) illustrates an example of repetitions with RF retuning.

Hereinafter, frequency diversity by RF retuning will be described with reference to FIG. 8(b).

The MTC supports limited frequency, spatial, and time diversity due to the narrowband RF, single antenna, and limited mobility. To reduce the effects of fading and outages, frequency hopping is supported between different narrowbands by the RF retuning.

The frequency hopping is applied to different uplink and downlink physical channels when repetition is enabled.

For example, if 32 subframes are used for PDSCH transmission, the first 16 subframes may be transmitted on the first narrowband. In this case, the RF front-end is retuned to another narrowband, and the remaining 16 subframes are transmitted on the second narrowband.

The MTC narrowband may be configured by system information or DCI.

(2) The MTC operates in half-duplex mode and uses limited (or reduced) maximum transmission power.

(3) The MTC does not use a channel (defined in the legacy LTE or NR) that should be distributed over the full system bandwidth of the legacy LTE or NR.

For example, the MTC does not use the following legacy LTE channels: PCFICH, PHICH, and PDCCH.

Thus, a new control channel, an MTC PDCCH (MPDCCH), is defined for the MTC since the above channels are not monitored.

The MPDCCH may occupy a maximum of 6 RBs in the frequency domain and one subframe in the time domain.

The MPDCCH is similar to an evolved PDCCH (EPDCCH) and supports a common search space for paging and random access.

In other words, the concept of the MPDCCH is similar to that of the EPDCCH used in the legacy LTE.

(4) The MTC uses newly defined DCI formats. For example, DCI formats 6-0A, 6-0B, 6-1A, 6-1B, 6-2, etc. may be used.

In the MTC, a physical broadcast channel (PBCH), physical random access channel (PRACH), MPDCCH, PDSCH, PUCCH, and PUSCH may be repeatedly transmitted. The MTC repeated transmission enables decoding of an MTC channel in a poor environment such as a basement, that is, when the signal quality or power is low, thereby increasing the radius of a cell or supporting the signal propagation effect. The MTC may support a limited number of transmission modes (TMs), which are capable of operating on a single layer (or single antenna), or support a channel or reference signal (RS), which are capable of operating on a single layer.

For example, the MTC may operate in TM 1, 2, 6, or 9.

(6) In the MTC, HARQ retransmission is adaptive and asynchronous and performed based on a new scheduling assignment received on the MPDCCH.

(7) In the MTC, PDSCH scheduling (DCI) and PDSCH transmission occur in different subframes (cross-subframe scheduling).

(8) All resource allocation information (e.g., a subframe, a transport block size (TBS), a subband index, etc.) for SIB1 decoding is determined by a master information block (MIB) parameter (in the MTC, no control channel is used for the SIB1 decoding).

(9) All resource allocation information (e.g., a subframe, a TBS, a subband index, etc.) for SIB2 decoding is determined by several SIB1 parameters (in the MTC, no control channel is used for the SIB2 decoding).

(10) The MTC supports an extended discontinuous reception (DRX) cycle.

(11) The MTC may use the same primary synchronization signal/secondary synchronization signal/common reference signal (PSS/SSS/CRS) as that used in the legacy LTE or NR. In the NR, the PSS/SSS is transmitted in the unit of SS block (or SS/PBCH block or SSB), and a tracking RS (TRS) may be used for the same purpose as the CRS. That is, the TRS is a cell-specific RS and may be used for frequency/time tracking.

2) MTC Operation Mode and Level

Hereinafter, MTC operation modes and levels will be described. To enhance coverage, the MTC may be divided into two operation modes (first and second modes) and four different levels as shown in Table 8 below.

The MTC operation mode may be referred to CE mode. The first and second modes may be referred to CE mode A and CE mode B, respectively.

TABLE 8

| Mode | Level | Description |
| --- | --- | --- |
| Mode A | Level 1 | No repetition for PRACH |
|  | Level 2 | Small Number of Repetition for PRACH |
| Mode B | Level 3 | Medium Number of Repetition for PRACH |
|  | Level 4 | Large Number of Repetition for PRACH |

The first mode is defined for small coverage where full mobility and channel state information (CSI) feedback are supported. In the first mode, the number of repetitions is zero or small. The operation in the first mode may have the same operation coverage as that of UE category 1. The second mode is defined for a UE with a very poor coverage condition where CSI feedback and limited mobility are supported. In the second mode, the number of times that transmission is repeated is large. The second mode provides up to 15 dB coverage enhancement with reference to the coverage of UE category 1. Each level of the MTC is defined differently in RACH and paging procedures.

Hereinafter, a description will be given of how to determine the MTC operation mode and level.

The MTC operation mode is determined by the base station, and each level is determined by the MTC UE. Specifically, the base station transmits RRC signaling including information for the MTC operation mode to the UE. The RRC signaling may include an RRC connection setup message, an RRC connection reconfiguration message, or an RRC connection reestablishment message. Here, the term "message" may refer to an information element (IE).

The MTC UE determines a level within the operation mode and transmits the determined level to the base station. Specifically, the MTC UE determines the level within the operation mode based on measured channel quality (e.g., RSRP, RSRQ, SINR, etc.) and informs the base station of the determined level using a PRACH resource (e.g., frequency, time, preamble, etc.).

3) MTC Guard Period

As described above, the MTC operates in the narrowband. The location of the narrowband may vary in each specific time unit (e.g., subframe or slot). The MTC UE tunes to a different frequency in every time unit. Thus, all frequency retuning may require a certain period of time. In other words, the guard period is required for transition from one time unit to the next time unit, and no transmission and reception occurs during the corresponding period.

The guard period varies depending on whether the current link is downlink or uplink and also varies depending on the state thereof. An uplink guard period (i.e., guard period defined for uplink) varies depending on the characteristics of data carried by a first time unit (time unit N) and a second time unit (time unit N+1). In the case of a downlink guard period, the following conditions need to be satisfied: (1) a first downlink narrowband center frequency is different from a second narrowband center frequency; and (2) in TDD, a first uplink narrowband center frequency is different from a second downlink center frequency.

The MTC guard period defined in the legacy LTE will be described. A guard period consisting of at most $N_{symb}^{retune}$ SC-FDMA symbols is created for Tx-Tx frequency retuning between two consecutive subframes. When the higher layer parameter ce-RetuningSymbols is configured, $N_{symb}^{retune}$ is equal to ce-RetuningSymbols. Otherwise, $N_{symb}^{retune}$ is 2. For an MTC UE configured with the higher layer parameter srs-UpPtsAdd, a guard period consisting of SC-FDMA symbols is created for Tx-Tx frequency retuning between a first special subframe and a second uplink subframe for frame structure type 2.

Figure 9:
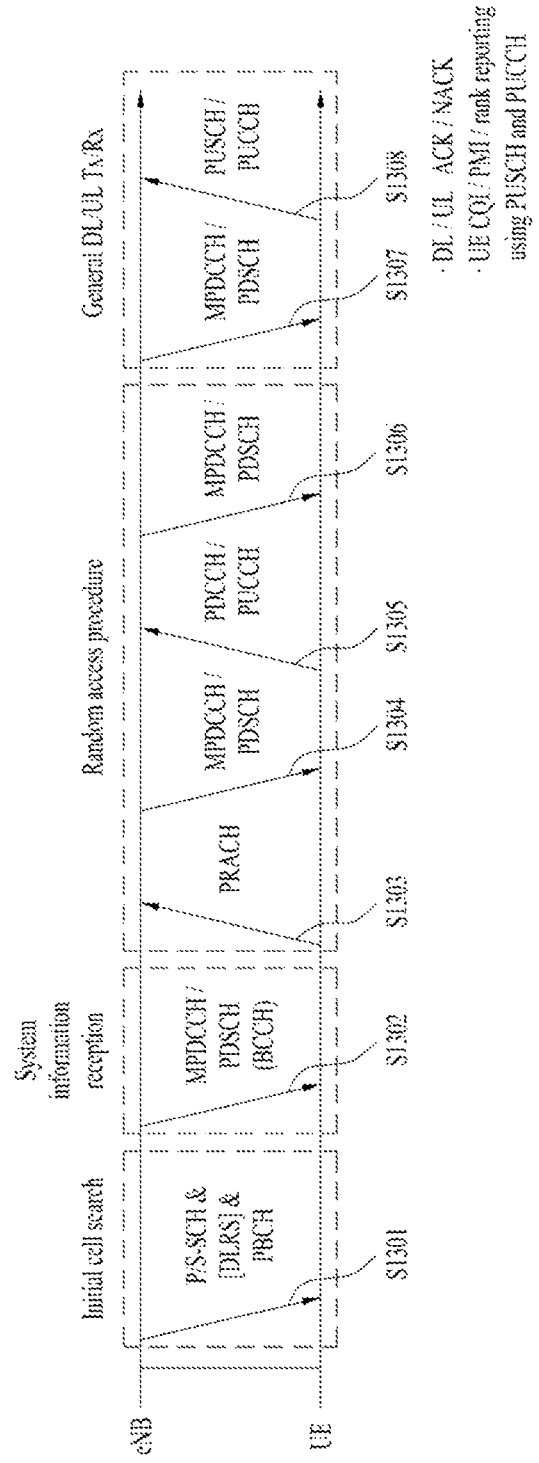
FIG. 9 is a diagram illustrating physical channels available in machine type communication (MTC) and a general signal transmission method using the physical channels.

FIG. 9 illustrates physical channels available in MTC and a general signal transmission method using the same.

When an MTC UE is powered on or enters a new cell, the MTC UE performs initial cell search in step S1301. The initial cell search involves acquisition of synchronization with a base station. Specifically, the MTC UE synchronizes with the base station by receiving a primary synchronization signal (PSS) and a second synchronization signal (SSS) from the base station and obtains information such as a cell identifier (ID). The PSS/SSS used by the MTC UE for the initial cell search may be equal to a PSS/SSS or a resynchronization signal (RSS) of the legacy LTE.

Thereafter, the MTC UE may acquire broadcast information in the cell by receiving a PBCH signal from the base station.

During the initial cell search, the MTC UE may monitor the state of a downlink channel by receiving a downlink reference signal (DL RS). The broadcast information transmitted on the PBCH corresponds to the MIB. In the MTC, the MIB is repeated in the first slot of subframe #0 of a radio frame and other subframes (subframe #9 in FDD and subframe #5 in the TDD).

The PBCH repetition is performed such that the same constellation point is repeated on different OFDM symbols to estimate an initial frequency error before attempting PBCH decoding.

Figure 10:
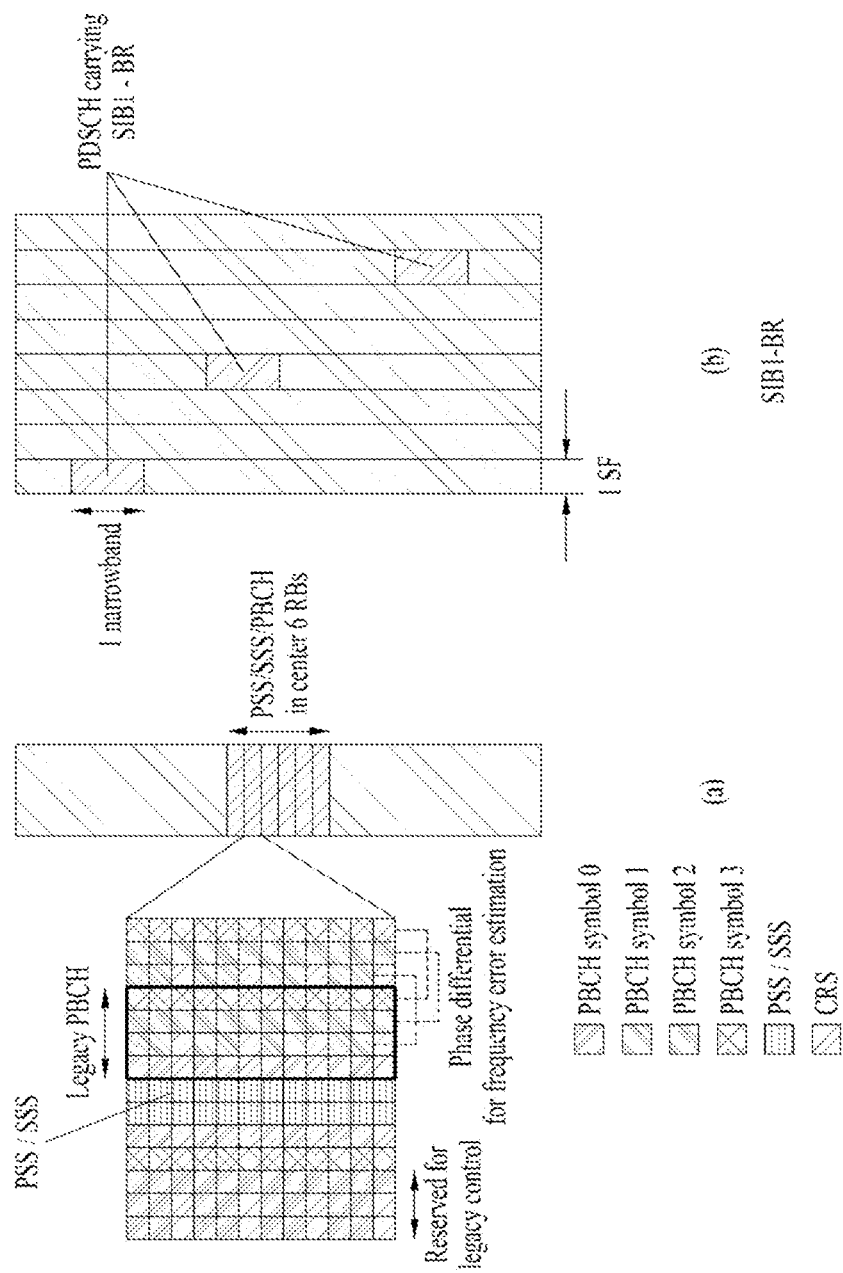
FIG. 10 is a diagram illustrating an exemplary system information transmission in MTC.

FIG. 10 illustrates an example of system information transmissions in MTC.

Specifically, FIG. 10(a) illustrates an example of a repetition pattern for subframe #0 in FDD and a frequency error estimation method for a normal CP and repeated symbols, and FIG. 10(b) illustrates an example of transmission of an SIB-BR on a wideband LTE channel.

Five reserved bits in the MIB are used in the MTC to transmit scheduling information for a new system information block for bandwidth reduced device (SIB1-BR) including a time/frequency location and a TBS.

The SIB-BR is transmitted on a PDSCH directly without any related control channels.

The SIB-BR is maintained without change for 512 radio frames (5120 ms) to allow a large number of subframes to be combined.

Table 9 shows an example of the MIB.

TABLE 9

| - - ASN1START | |
|---|---|
| MasterinformationBlock ::- | SEQUENCE { |
| dl-Bandwidth | ENUMERATED { |
| | n6, n15, n25, n50, n75, n100, |
| phich-config | PRICE-config, |
| systemframeNumber | BIT STRING (SIZE (8)), |
| schedulingInfoSIB1-BR-r13 | INTEGER (0 . . 31), |
| systemInfoUnchanged-BR-r15 | BOOLEAN, |
| spare | BIT STRING (SIZE (4)) |
| } | |
| ASN1STOP | |

In Table 9, the schedulingInfoSIB1-BR field indicates the index of a table that defines SystemInformationBlockType1-BR scheduling information. The zero value means that SystemInformationBlockType1-BR is not scheduled. The overall function and information carried by SystemInformationBlockType1-BR (or SIB1-BR) is similar to SIB1 of the legacy LTE. The contents of SIB1-BR may be categorized as follows: (1) PLMN; (2) cell selection criteria; and (3) scheduling information for SIB2 and other SIBs.

After completing the initial cell search, the MTC UE may acquire more detailed system information by receiving a MPDCCH and a PDSCH based on information in the MPDCCH in step S1302. The MPDCCH has the following features: (1) The MPDCCH is very similar to the EPDCCH; (2) The MPDCCH may be transmitted once or repeatedly (the number of repetitions is configured through higher layer signaling); (3) Multiple MPDCCHs are supported and a set of MPDCCHs are monitored by the UE; (4) the MPDCCH is generated by combining enhanced control channel elements (eCCEs), and each CCE includes a set of REs; and (5) the MPDCCH supports an RA-RNTI, SI-RNTI, P-RNTI, C-RNTI, temporary C-RNTI, and semi-persistent scheduling (SPS) C-RNTI.

To complete the access to the base station, the MTC UE may perform a random access procedure in steps S1303 to S1306. The basic configuration of an RACH procedure is carried by SIB2. SIB2 includes parameters related to paging. A paging occasion (PO) is a subframe in which the P-RNTI is capable of being transmitted on the MPDCCH. When a P-RNTI PDCCH is repeatedly transmitted, the PO may refer to a subframe where MPDCCH repetition is started. A paging frame (PF) is one radio frame, which may contain one or multiple POs. When DRX is used, the MTC UE monitors one PO per DRX cycle. A paging narrowband (PNB) is one narrowband, on which the MTC UE performs paging message reception.

To this end, the MTC UE may transmit a preamble on a PRACH (S1303) and receive a response message (e.g., random access response (RAR)) for the preamble on the MPDCCH and the PDSCH related thereto (S1304). In the case of contention-based random access, the MTC UE may perform a contention resolution procedure including transmission of an additional PRACH signal (S1305) and reception of a MPDCCH signal and a PDSCH signal related thereto (S1306). In the MTC, the signals and messages (e.g., Msg 1, Msg 2, Msg 3, and Msg 4) transmitted during the RACH procedure may be repeatedly transmitted, and a repetition pattern may be configured differently depending on coverage enhancement (CE) levels. Msg 1 may represent the PRACH preamble, Msg 2 may represent the RAR, Msg 3 may represent uplink transmission for the RAR at the MTC UE, and Msg 4 may represent downlink transmission for Msg 3 from the base station.

For random access, signaling of different PRACH resources and different CE levels is supported. This provides the same control of the near-far effect for the PRACH by grouping UEs that experience similar path loss together. Up to four different PRACH resources may be signaled to the MTC UE.

The MTC UE measures RSRP using a downlink RS (e.g., CRS, CSI-RS, TRS, etc.) and selects one of random access resources based on the measurement result. Each of four random access resources has an associated number of PRACH repetitions and an associated number of RAR repetitions.

Thus, the MTC UE in poor coverage requires a large number of repetitions so as to be detected by the base station successfully and needs to receive as many RARs as the number of repetitions such that the coverage levels thereof are satisfied.

The search spaces for RAR and contention resolution messages are defined in the system information, and the search space is independent for each coverage level.

A PRACH waveform used in the MTC is the same as that in the legacy LTE (for example, OFDM and Zadoff-Chu sequences).

After performing the above-described processes, the MTC UE may perform reception of an MPDCCH signal and/or a PDSCH signal (S1307) and transmission of a PUSCH signal and/or a PUCCH signal (S1308) as a normal uplink/downlink signal transmission procedure. Control information that the MTC UE transmits to the base station is commonly referred to as uplink control information (UCI). The UCI includes a HARQ-ACK/NACK, scheduling request, channel quality indicator (CQI), precoding matrix indicator (PMI), rank indicator (RI), etc.

When the MTC UE has established an RRC connection, the MTC UE blindly decodes the MPDCCH in a configured search space to obtain uplink and downlink data assignments.

In the MTC, all available OFDM symbols in a subframe are used to transmit DCI. Accordingly, time-domain multiplexing is not allowed between control and data channels in the subframe. Thus, the cross-subframe scheduling may be performed between the control and data channels as described above.

If the MPDCCH is last repeated in subframe #N, the MPDCCH schedules a PDSCH assignment in subframe #N+2.

DCI carried by the MPDCCH provides information for how many times the MPDCCH is repeated so that the MTC UE may know the number of repetitions when PDSCH transmission is started.

The PDSCH assignment may be performed on different narrowbands. Thus, the MTC UE may need to perform retuning before decoding the PDSCH assignment.

For uplink data transmission, scheduling follows the same timing as that of the legacy LTE. The last MPDCCH in subframe #N schedules PUSCH transmission starting in subframe #N+4.

Figure 11:
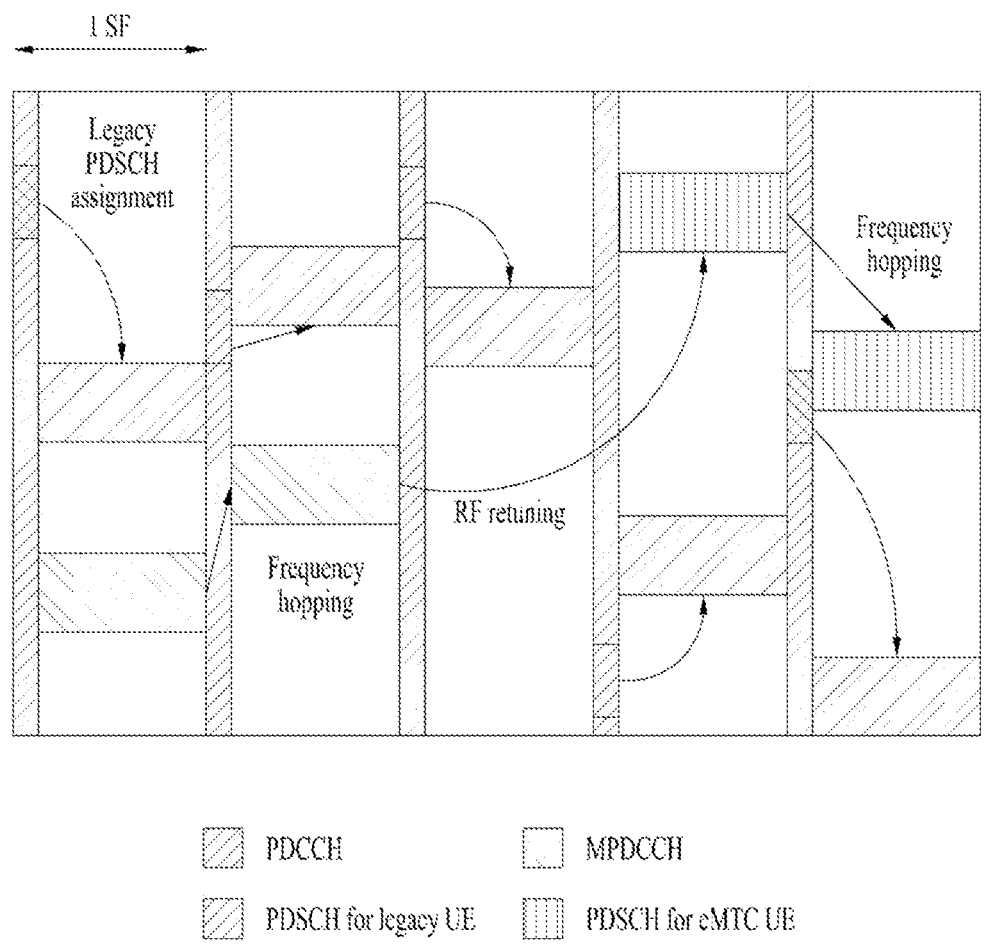
FIG. 11 is a diagram illustrating exemplary scheduling for each of MTC and legacy LTE.

FIG. 11 illustrates an example of scheduling for each of MTC and legacy LTE.

A legacy LTE assignment is scheduled using the PDCCH and uses the initial OFDM symbols in each subframe. The PDSCH is scheduled in the same subframe in which the PDCCH is received.

On the other hand, the MTC PDSCH is cross-subframe scheduled, and one subframe is defined between the MPDCCH and PDSCH to allow MPDCCH decoding and RF retuning.

MTC control and data channels may be repeated for a large number of subframes to be decoded in an extreme coverage condition. Specifically, the MTC control and data channels may be repeated for a maximum of 256 subframes for the MPDCCH and a maximum of 2048 subframes for the PDSCH.

D. NB-IoT (Narrowband-Internet of Things

The NB-IoT may refer to a system for providing low complexity and low power consumption based on a system bandwidth (BW) corresponding to one physical resource block (PRB) of a wireless communication system (e.g., LTE system, NR system, etc.).

Herein, the NB-IoT may be referred to as another terminology such as 'NB-LTE', 'NB-IoT enhancement', 'further enhanced NB-IoT', or 'NB-NR'. The NB-IoT may be replaced with a term defined or to be defined in the 3GPP standards. For convenience of description, all types of NB-IoT is commonly referred to as 'NB-IoT'.

The NB-IoT may be used to implement the IoT by supporting an MTC device (or MTC UE) in a cellular system. Since one PRB of the system BW is allocated for the NB-IoT, frequency may be efficiently used. In addition, considering that in the NB-IoT, each UE recognizes a single PRB as one carrier, the PRB and carrier described herein may be considered to have the same meaning.

Although the present disclosure describes frame structures, physical channels, multi-carrier operation, operation modes, and general signal transmission and reception of the NB-IoT based on the LTE system, it is apparent that the present disclosure is applicable to the next-generation systems (e.g., NR system, etc.). In addition, the details of the NB-IoT described in the present disclosure may be applied to the MTC, which has similar purposes (e.g., low power, low cost, coverage enhancement, etc.).

1) Frame Structure and Physical Resource of NB-IoT

The NB-IoT frame structure may vary depending on subcarrier spacing.

Figure 12:
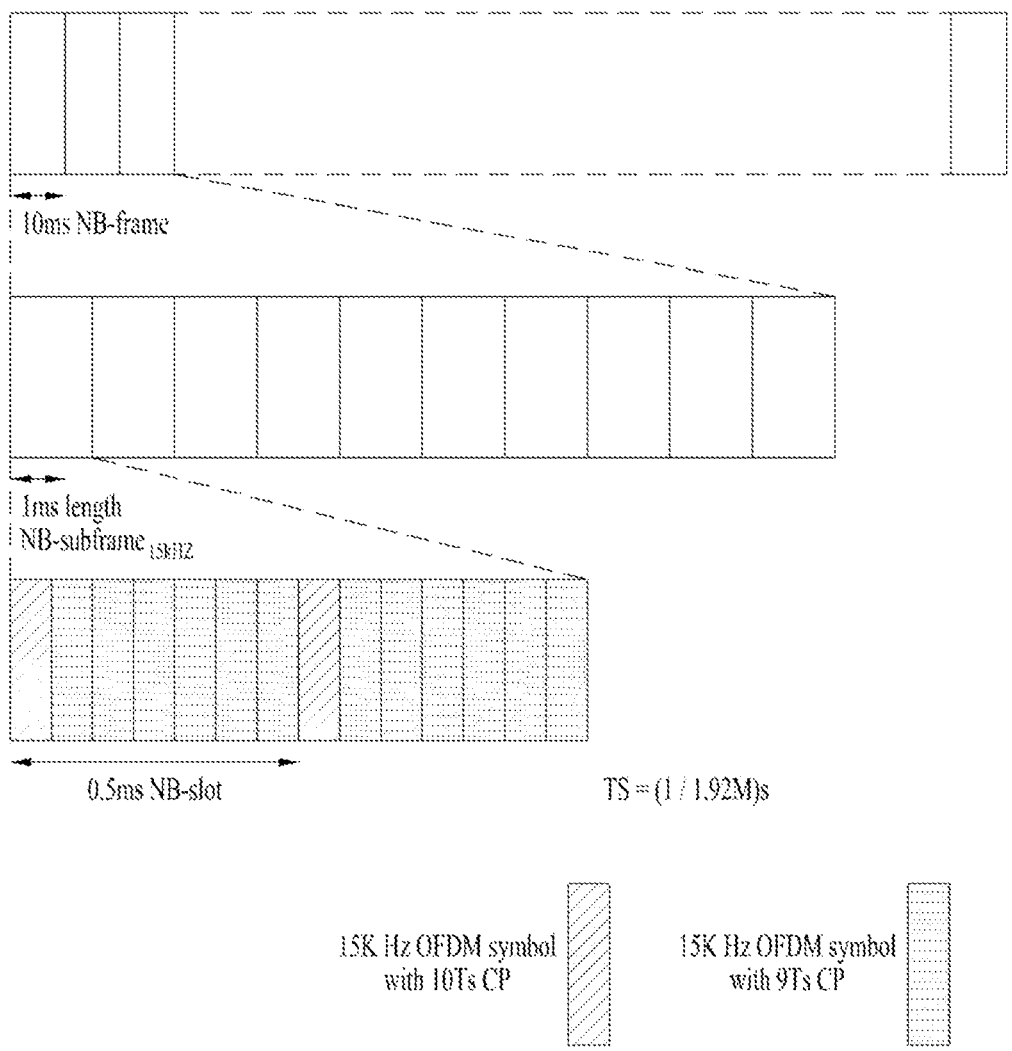
FIGS. 12 and 13 are diagrams illustrating exemplary narrowband-Internet of things (NB-IoT) frame structures according to subcarrier spacings.
Figure 13:
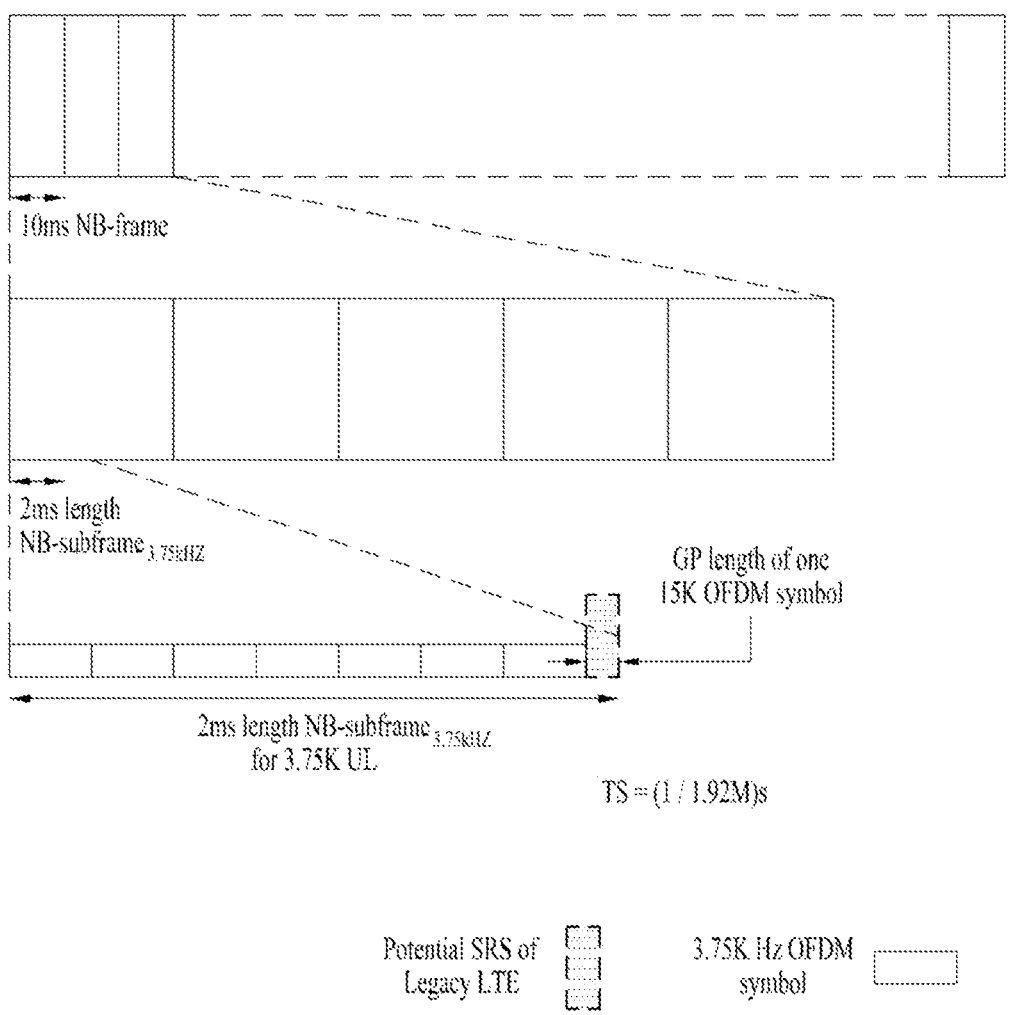
Figure 16:
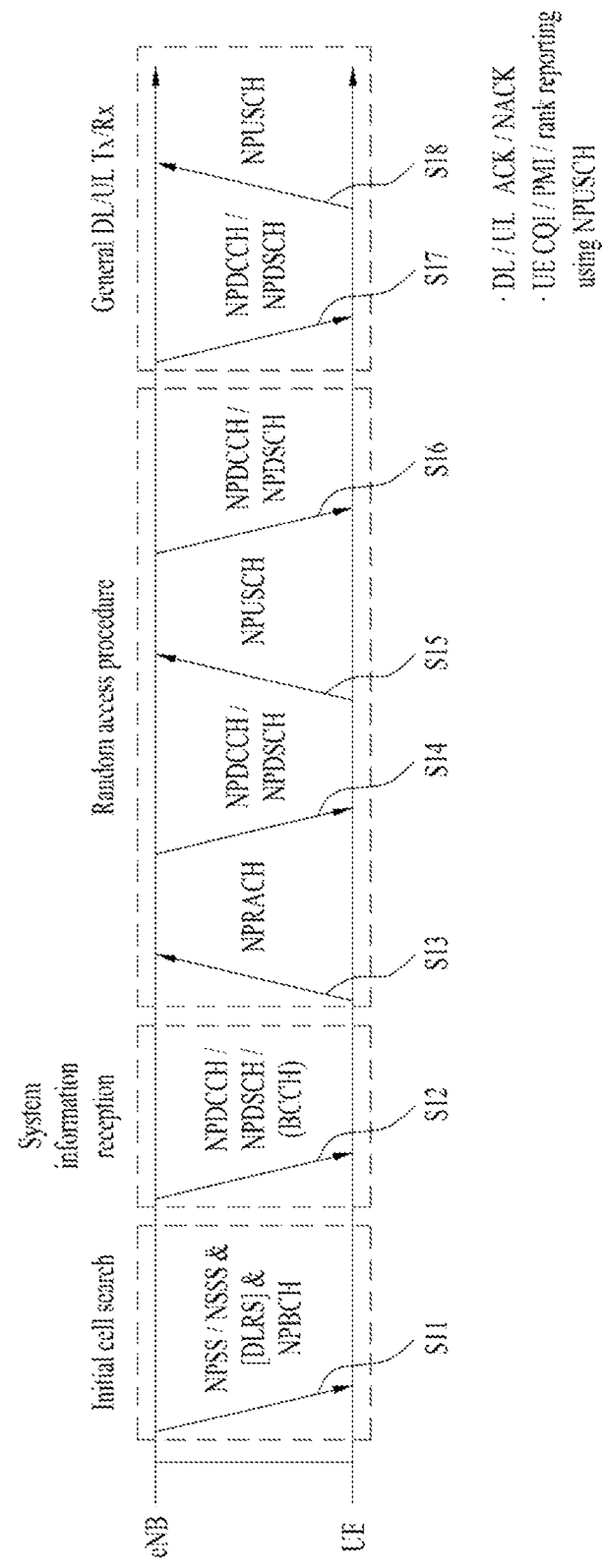
FIG. 16 is a diagram illustrating physical channels available in NB-IoT and a general signal transmission method using the physical channels.
Figure 17:
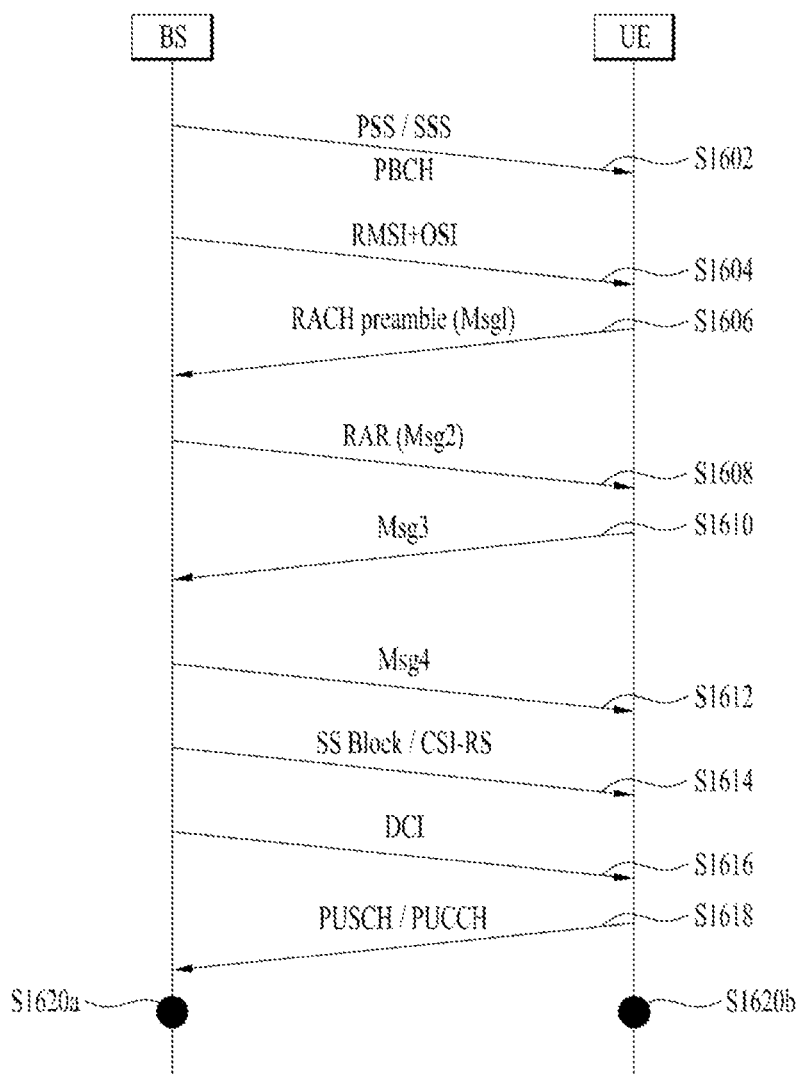
FIG. 17 is a diagram illustrating an exemplary initial network access and subsequent communication process in an NR system.

FIGS. 16 and 17 illustrate examples of NB-IoT frame structures according to subcarrier spacing (SCS). Specifically, FIG. 12 illustrates a frame structure with SCS of 15 kHz, and FIG. 13 illustrates a frame structure with SCS of 3.75 kHz. However, the NB-IoT frame structure is not limited thereto, and different SCS (e.g., 30 kHz, etc.) may be applied to the NB-IoT by changing the time/frequency unit.

Although the present disclosure describes the NB-IoT frame structure based on the LTE frame structure, this is merely for convenience of description and the present disclosure is not limited thereto. That is, the embodiments of the present disclosure are applicable to the NB-IoT based on the frame structure of the next-generation system (e.g., NR system).

Referring to FIG. 12, the NB-IoT frame structure for the 15 kHz subcarrier spacing is the same as the frame structure of the legacy system (LTE system). Specifically, a 10 ms NB-IoT frame may include 10 NB-IoT subframes of 1 ms each, and the 1 ms NB-IoT subframe may include two NB-IoT slots, each having a duration of 0.5 ms. Each 0.5 ms NB-IoT slot ms may include 7 OFDM symbols.

Referring to FIG. 13, a 10 ms NB-IoT frame may include five NB-IoT subframes of 2 ms each, and the 2 ms NB-IoT subframe may include 7 OFDM symbols and one guard period (GP). The 2 ms NB-IoT subframe may be expressed as an NB-IoT slot or an NB-IoT resource unit (RU).

Hereinafter, downlink and uplink physical resources for the NB-IoT will be described.

The NB-IoT downlink physical resource may be configured based on physical resources of other communication systems (e.g., LTE system, NR system, etc.) except that the system BW is composed of a specific number of RBs (e.g., one RB=180 kHz). For example, when NB-IoT downlink supports only the 15 kHz subcarrier spacing as described above, the NB-IoT downlink physical resource may be configured by limiting the resource grid of the LTE system illustrated in FIG. 6 to one RB (i.e., one PRB) in the frequency domain.

Figure 14:
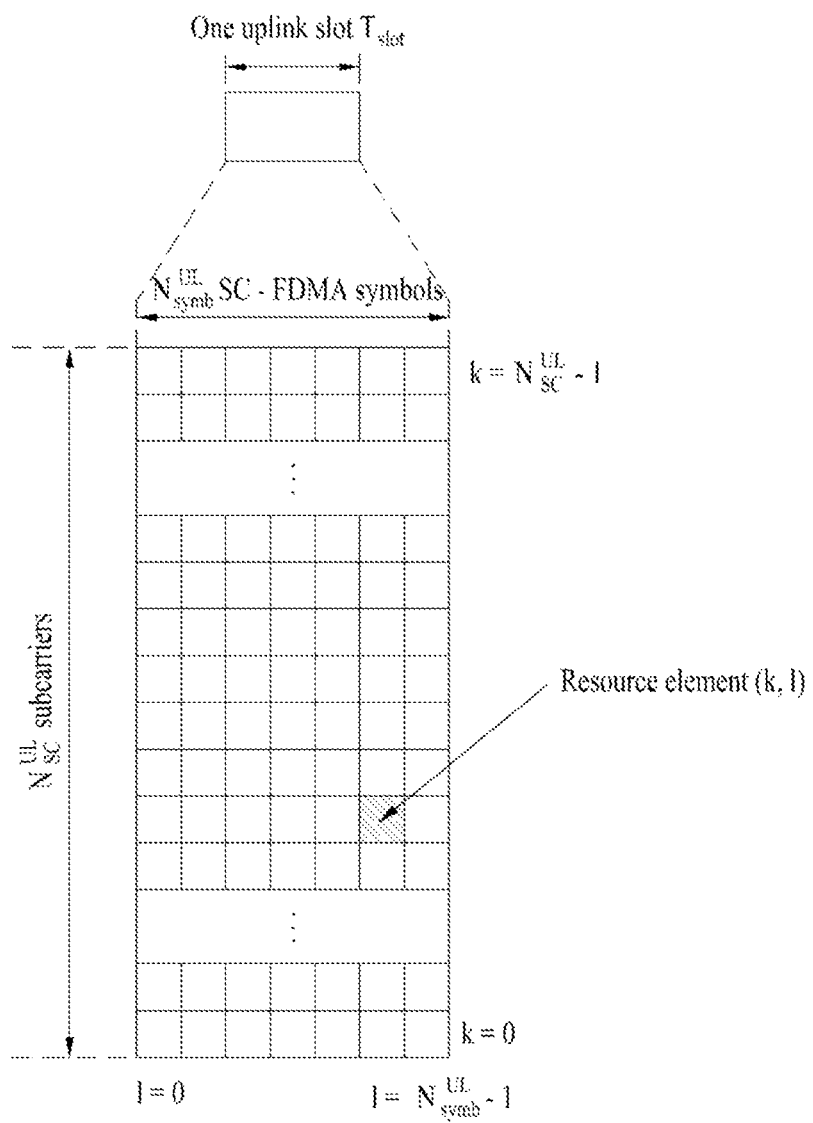
FIG. 14 is a diagram illustrating an exemplary resource grid for NB-IoT UL.

The NB-IoT uplink physical resource may be configured by limiting to the system bandwidth to one RB as in the NB-IoT downlink. For example, when NB-IoT uplink supports the 15 kHz and 3.75 kHz subcarrier spacing as described above, a resource grid for the NB-IoT uplink may be represented as shown in FIG. 14. The number of subcarriers $N_{sc}^{UL}$ and the slot period $T_{slot}$ may be given in Table 10 below.

FIG. 14 illustrates an example of the resource grid for NB-IoT uplink.

TABLE 10

| Subcarrier spacing | $N_{sc}^{UL}$ | $T_{slot}$ |
|---|---|---|
| $\Delta f = 3.75$ kHz | 48 | $61440 \cdot T_s$ |
| $\Delta f = 15$ kHz | 12 | $15360 \cdot T_s$ |

A resource unit (RU) for the NB-IoT uplink may include SC-FDMA symbols in the time domain and $N_{symb}^{UL}N_{slots}^{UL}$ consecutive subcarriers in the frequency domain. In frame structure type 1 (i.e., FDD), the values of $N_{sc}^{RU}$ and $N_{symb}^{UL}$ may be given in Table 11 below. In frame structure type 2 (i.e., TDD), the values of $N_{sc}^{RU}$ and $N_{symb}^{UL}$ may be given in Table 12.

TABLE 11

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|  | 15 kHz | 1 | 16 |  |
|  |  | 3 | 8 |  |
|  |  | 6 | 4 |  |

TABLE 11-continued

| NPUSCH format | Δf | $N_{sc}^{RU}$ | $N_{slots}^{UL}$ | $N_{symb}^{UL}$ |
|---|---|---|---|---|
| | | 12 | 2 | |
| 2 | 3.75 kHz | 1 | 4 | |
| | 15 kHz | 1 | 4 | |

TABLE 12

| NPUSCH format | Δf | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
| | 15 kHz | 1, 2, 3, 4, 5 | 1 | 16 | |
| | | | 3 | 8 | |
| | | | 6 | 4 | |
| | | | 12 | 2 | |
| 2 | 3.75 kHz | 1, 4 | 1 | 4 | |
| | 15 kHz | 1, 2, 3, 4, 5 | 1 | 4 | |

2) Physical Channels of NB-IoT

A base station and/or UE that support the NB-IoT may be configured to transmit and receive physical channels and signals different from those in the legacy system. Hereinafter, the physical channels and/or signals supported in the NB-IoT will be described in detail.

First, the NB-IoT downlink will be described. For the NB-IoT downlink, an OFDMA scheme with the 15 kHz subcarrier spacing may be applied. Accordingly, orthogonality between subcarriers may be provided, thereby supporting coexistence with the legacy system (e.g., LTE system, NR system, etc.).

To distinguish the physical channels of the NB-IoT system from those of the legacy system, 'N (narrowband)' may be added. For example, DL physical channels may be defined as follows: 'narrowband physical broadcast channel (NPBCH)', 'narrowband physical downlink control channel (NPDCCH)', 'narrowband physical downlink shared channel (NPDSCH)', etc. DL physical signals may be defined as follows: 'narrowband primary synchronization signal (NPSS)', 'narrowband secondary synchronization signal (NSSS)', 'narrowband reference signal (NRS)', 'narrowband positioning reference signal (NPRS)', 'narrowband wake-up signal (NWUS)', etc.

Generally, the above-described downlink physical channels and physical signals for the NB-IoT may be configured to be transmitted based on time-domain multiplexing and/or frequency-domain multiplexing.

The NPBCH, NPDCCH, and NPDSCH, which are downlink channels of the NB-IoT system, may be repeatedly transmitted for coverage enhancement.

The NB-IoT uses newly defined DCI formats. For example, the DCI formats for the NB-IoT may be defined as follows: DCI format N0, DCI format N1, DCI format N2, etc.

Next, the NB-IoT uplink will be described. For the NB-IoT uplink, an SC-FDMA scheme with the subcarrier spacing of 15 kHz or 3.75 kHz may be applied. The NB-IoT uplink may support multi-tone and single-tone transmissions. For example, the multi-tone transmission may support the 15 kHz subcarrier spacing, and the single-tone transmission may support both the 15 kHz and 3.75 kHz subcarrier spacing.

In the case of the NB-IoT uplink, 'N (narrowband)' may also be added to distinguish the physical channels of the NB-IoT system from those of the legacy system, similarly to the NB-IoT downlink. For example, uplink physical channels may be defined as follows: 'narrowband physical random access channel (NPRACH)', 'narrowband physical uplink shared channel (NPUSCH)', etc. UL physical signals may be defined as follows: 'narrowband demodulation reference signal (NDMRS)'.

The NPUSCH may be configured with NPUSCH format 1 and NPUSCH format 2. For example, NPUSCH format 1 is used for UL-SCH transmission (or transfer), and NPUSCH format 2 may be used for UCI transmission such as HARQ ACK signaling.

The NPRACH, which is a downlink channel of the NB-IoT system, may be repeatedly transmitted for coverage enhancement. In this case, frequency hopping may be applied to the repeated transmission.

3) Multi-Carrier Operation in NB-IoT

Hereinafter, the multi-carrier operation in the NB-IoT will be described. The multi-carrier operation may mean that when the base station and/or UE uses different usage of multiple carriers (i.e., different types of multiple carriers) in transmitting and receiving a channel and/or a signal in the NB-IoT.

In general, the NB-IoT may operate in multi-carrier mode as described above. In this case, NB-IoT carriers may be divided into an anchor type carrier (i.e., anchor carrier or anchor PRB) and a non-anchor type carrier (i.e., non-anchor carrier or non-anchor PRB).

From the perspective of the base station, the anchor carrier may mean a carrier for transmitting the NPDSCH that carries the NPSS, NSSS, NPBCH, and SIB (N-SIB) for initial access. In other words, in the NB-IoT, the carrier for initial access may be referred to as the anchor carrier, and the remaining carrier(s) may be referred to as the non-anchor carrier. In this case, there may be one or multiple anchor carriers in the system.

4) Operation Mode of NB-IoT

Figure 15:
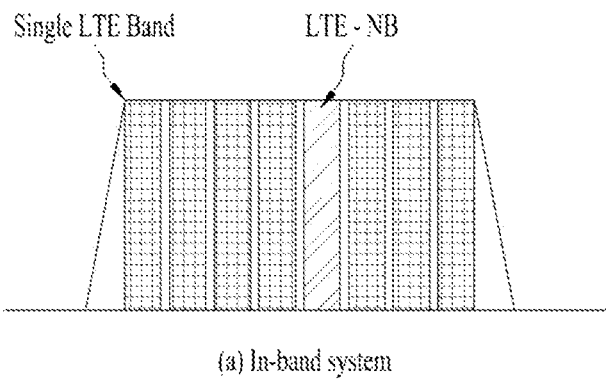
FIG. 15 is a diagram illustrating exemplary operation modes supported in an NB-IoT system.
Figure 15:
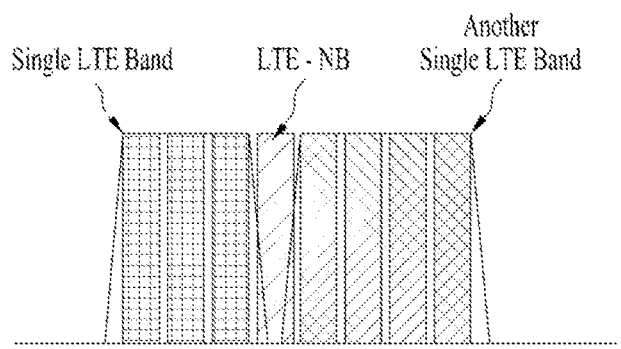
Figure 15:
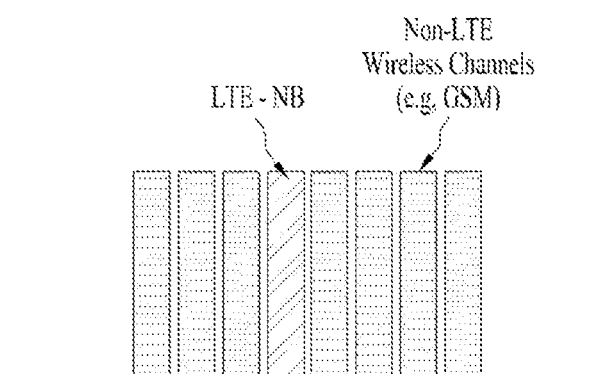

The operation mode of the NB-IoT will be described. The NB-IoT system may support three operation modes. FIG. 15 illustrates an example of operation modes supported in the NB-IoT system. Although the present disclosure describes the NB-IoT operation mode based on the LTE band, this is merely for convenience of description and the present disclosure is also applicable to other system bands (e.g., NR system band).

FIG. 15(a) illustrates an in-band system, FIG. 15(b) illustrates a guard-band system, and FIG. 15(c) illustrates a stand-alone system. The in-band system, guard-band system, and stand-alone system may be referred to as in-band mode, guard-band mode, and stand-alone mode, respectively.

The in-band system may mean a system or mode that uses one specific RB (PRB) in the legacy LTE band for the NB-IoT. To operate the in-band system, some RBs of the LTE system carrier may be allocated.

The guard-band system may mean a system or mode that uses a space reserved for the guard band of the legacy LTE band for the NB-IoT. To operate the guard-band system, the guard band of the LTE carrier which is not used as the RB in the LTE system may be allocated. For example, the legacy LTE band may be configured such that each LTE band has the guard band of minimum 100 kHz at the end thereof. In order to use 200 kHz, two non-contiguous guard bands may be used.

The in-band system and the guard-band system may operate in a structure where the NB-IoT coexists in the legacy LTE band.

Meanwhile, the stand-alone system may mean a system or mode independent from the legacy LTE band. To operate the stand-alone system, a frequency band (e.g., reallocated GSM carrier) used in a GSM EDGE radio access network (GERAN) may be separately allocated.

The above three operation modes may be applied independently, or two or more operation modes may be combined and applied.

5) General Signal Transmission and Reception Procedure in NB-IoT

FIG. 16 illustrates an example of physical channels available in the NB-IoT and a general signal transmission method using the same. In a wireless communication system, an NB-IoT UE may receive information from a base station in downlink (DL) and transmit information to the base station in uplink (UL). In other words, the base station may transmit the information to the NB-IoT UE in downlink and receive the information from the NB-IoT UE in uplink in the wireless communication system.

Information transmitted and received between the base station and the NB-IoT UE may include various data and control information, and various physical channels may be used depending on the type/usage of information transmitted and received therebetween. The NB-IoT signal transmission and reception method described with reference to FIG. 16 may be performed by the aforementioned wireless communication apparatuses (e.g., base station and UE in FIG. 11).

When the NB-IoT UE is powered on or enters a new cell, the NB-IoT UE may perform initial cell search (S11). The initial cell search involves acquisition of synchronization with the base station. Specifically, the NB-IoT UE may synchronize with the base station by receiving an NPSS and an NSSS from the base station and obtain information such as a cell ID. Thereafter, the NB-IoT UE may acquire information broadcast in the cell by receiving an NPBCH from the base station. During the initial cell search, the NB-IoT UE may monitor the state of a downlink channel by receiving a downlink reference signal (DL RS).

In other words, when the NB-IoT UE enters the new cell, the BS may perform the initial cell search, and more particularly, the base station may synchronize with the UE. Specifically, the base station may synchronize with the NB-IoT UE by transmitting the NPSS and NSSS to the UE and transmit the information such as the cell ID. The base station may transmit the broadcast information in the cell by transmitting (or broadcasting) the NPBCH to the NB-IoT UE. The BS may transmit the DL RS to the NB-IoT UE during the initial cell search to check the downlink channel state.

After completing the initial cell search, the NB-IoT UE may acquire more detailed system information by receiving a NPDCCH and a NPDSCH related to thereto (S12). In other words, after the initial cell search, the base station may transmit the more detailed system information by transmitting the NPDCCH and the NPDSCH related to thereto to the NB-IoT UE.

Thereafter, the NB-IoT UE may perform a random access procedure to complete the access to the base station (S13 to S16).

Specifically, the NB-IoT UE may transmit a preamble on an NPRACH (S13). As described above, the NPRACH may be repeatedly transmitted based on frequency hopping for coverage enhancement. In other words, the base station may (repeatedly) receive the preamble from the NB-IoT UE over the NPRACH.

Then, the NB-IoT UE may receive a random access response (RAR) for the preamble from the base station on the NPDCCH and the NPDSCH related thereto (S14). That is, the base station may transmit the random access response (RAR) for the preamble to the base station on the NPDCCH and the NPDSCH related thereto.

The NB-IoT UE may transmit an NPUSCH using scheduling information in the RAR (S15) and perform a contention resolution procedure based on the NPDCCH and the NPDSCH related thereto (S16). That is, the base station may receive the NPUSCH from the NB-IoT UE based on the scheduling information in the RAR and perform the contention resolution procedure.

After performing the above-described processes, the NB-IoT UE may perform NPDCCH/NPDSCH reception (S17) and NPUSCH transmission (S18) as a normal UL/DL signal transmission procedure. After the above-described processes, the base station may transmit the NPDCCH/NPDSCH to the NB-IoT UE and receive the NPUSCH from the NB-IoT UE during the normal uplink/downlink signal transmission procedure.

In the NB-IoT, the NPBCH, NPDCCH, NPDSCH, etc. may be repeatedly transmitted for the coverage enhancement as described above. In addition, UL-SCH (normal uplink data) and UCI may be transmitted on the NPUSCH. In this case, the UL-SCH and UCI may be configured to be transmitted in different NPUSCH formats (e.g., NPUSCH format 1, NPUSCH format 2, etc.)

As described above, the UCI means control information transmitted from the UE to the base station. The UCI may include the HARQ ACK/NACK, scheduling request (SR), CSI, etc. The CSI may include the CQI, PMI, RI, etc. Generally, the UCI may be transmitted over the NPUSCH in the NB-IoT as described above. In particular, the UE may transmit the UCI on the NPUSCH periodically, aperiodically, or semi-persistently according to the request/indication from the network (e.g., base station).

E. Initial Network Access and Communication Process

A UE may perform a network access process to perform the described/proposed procedures and/or methods of the present disclosure. For example, the UE may receive system information and configuration information required to perform the described/proposed procedures and/or methods of the present disclosure and store the received information in a memory. The configuration information required for the present disclosure may be received by higher-layer signaling (e.g., RRC signaling or medium access control (MAC) signaling).

FIG. 17 is a diagram illustrating an exemplary initial network access and subsequent communication process in an NR system. In NR, a physical channel and an RS may be transmitted by beamforming. When beamforming-based signal transmission is supported, beam management may be performed for beam alignment between a BS and a UE. Further, a signal proposed in the present disclosure may be transmitted/received by beamforming. In RRC_IDLE mode, beam alignment may be performed based on a synchronization signal block (SSB), whereas in RRC_CONNECTED mode, beam alignment may be performed based on a CSI-RS (in DL) and an SRS (in UL). On the contrary, when beamforming-based signal transmission is not supported, beam-related operations may be omitted in the description of the present disclosure.

Referring to FIG. 17, a BS (e.g., eNB) may periodically transmit an SSB (S1602). The SSB includes a PSS/SSS/PBCH. The SSB may be transmitted by beam sweeping. The PBCH may include a master information block (MIB), and the MIB may include scheduling information for remaining minimum system information (RMSI). The BS may then transmit the RMSI and other system information (OSI) (S1604). The RMSI may include information required for the UE to perform initial access to the BS (e.g., PRACH configuration information). After detecting SSBs, the UE identifies the best SSB. The UE may then transmit an RACH preamble (Message 1 or Msg1) in PRACH resources linked/corresponding to the index (i.e., beam) of the best SSB (S1606). The beam direction of the RACH preamble is associated with the PRACH resources. Association between PRACH resources (and/or RACH preambles) and SSBs (SSB indexes) may be configured by system information (e.g., RMSI). Subsequently, in a random access procedure (or an RACH procedure), the BS may transmit a random access response (RAR) (Msg2) in response to the RACH preamble (S1608), the UE may transmit Msg3 (e.g., RRC Connection Request) based on a UL grant included in the RAR (S1610), and the BS may transmit a contention resolution message (Msg4) (S1630). Msg4 may include RRC Connection Setup.

When an RRC connection is established between the BS and the UE in the random access procedure (or the RACH procedure), beam alignment may subsequently be performed based on an SSB/CSI-RS (in DL) and an SRS (in UL). For example, the UE may receive an SSB/CSI-RS (S1614). The SSB/CSI-RS may be used for the UE to generate a beam/CSI report. The BS may request the UE to transmit a beam/CSI report, by DCI (S1616). In this case, the UE may generate a beam/CSI report based on the SSB/CSI-RS and transmit the generated beam/CSI report to the BS on a PUSCH/PUCCH (S1618). The beam/CSI report may include a beam measurement result, information about a preferred beam, and so on. The BS and the UE may switch beams based on the beam/CSI report (51620*a* and 51620*b*).

Subsequently, the UE and the BS may perform the above-described/proposed procedures and/or methods. For example, the UE and the BS may transmit a wireless signal by processing information stored in a memory or may process received wireless signal and store the processed signal in the memory according to a proposal of the present disclosure, based on configuration information obtained in the network access process (e.g., the system information acquisition process, the RRC connection process through an RACH, and so on). The wireless signal may include at least one of a PDCCH, a PDSCH, or an RS on DL and at least one of a PUCCH, a PUSCH, or an SRS on UL.

The above description may be applied commonly to MTC and NB-IoT. The difference between LTE and MTC and the difference between LTE and NB-IoT in the random access procedure will be additionally described below.

MTC Network Access Procedure

An MTC network access procedure will be further described based on the LTE network access procedure. The following description may also be extended to NR. In FIG. 17, PDCCH is replaced with MTC PDCCH (MPDCCH) (e.g., see FIG. 9 and a related description).

The MIB in LTE includes 10 reserved bits. In MTC, 5 most significant bits (MSBs) out of 10 reserved bits in an MIB is used to indicate scheduling information for a system information block for bandwidth reduced device (SIB1-BR). The 5 MSBs are used to indicate the repetition number and transport block size (TBS) of the SIB1-BR. The SIB1-BR is transmitted on a PDSCH. The SIB1-BR may not be changed over 512 radio frames (5120 ms) to allow multiple subframes to be combined. Information carried in the SIB1-BR is similar to the SIB1 in the LTE system.

An MTC random access procedure (or RACH procedure) is basically the same as the LTE random access procedure (or RACH procedure), except the following difference: the MTC random access procedure (or RACH procedure) is performed based on a coverage enhancement (CE) level. For example, whether a PRACH is repeatedly transmitted/the repetition number of the PRACH may be different at each CE level, for PRACH coverage enhancement. As described before with reference to Table 8, a mode that supports repeated signal transmissions for coverage enhancement or extension is referred to as a CE mode, and the repetition number of a signal for coverage enhancement or extension is referred to as a CE level. For example, as illustrated in Table 8, a first mode (e.g., CE mode A) is a mode for small coverage enhancement, supporting full mobility and CSI feedback, in which no repetition or a small repetition number may be set. A second mode (e.g., CE mode B) is a mode for a UE in an extremely poor coverage condition, supporting CSI feedback and limited mobility, in which a large repetition number may be set.

A BS may broadcast system information including a plurality of (e.g., three) reference signal received power (RSRP) thresholds, and a UE may compare the RSRP thresholds with an RSRP measurement to determine a CE level. For each CE level, the following information may be independently configured through system information.

PRACH resource information: A periodicity/offset of a PRACH occasion and a PRACH frequency resource Preamble group: A set of preambles allocated for each CE level A repetition number per preamble attempt, and a maximum number of preamble attempts RAR window time: The duration (e.g., the number of subframes) of a time period in which RAR reception is expected Contention resolution window time: The duration of a time period in which reception of contention resolution message is expected After selecting a PRACH resource corresponding to its CE level, the UE may perform a PRACH transmission in the selected PRACH resource. A PRACH waveform used in MTC is the same as a PRACH waveform used in LTE (e.g., OFDM and Zadoff-Chu sequence). Signals/messages transmitted after the PRACH may also be repeatedly transmitted, and the repetition number may be independently set according to a CE mode/level.

NB-IoT Network Access Procedure

An NB-IoT network access procedure will be further described based on the LTE network access procedure. The following description may also be extended to NR. In FIG. 17, PSS, SSS, and PBCH are replaced with NPSS, NSSS, and NPBCH. Further, PDCCH, PDSCH, PUSCH, and PRACH are replaced with NPDCCH, NPDSCH, NPUSCH, and NPRACH in FIG. 17.

The NB-IoT random access procedure (or RACH procedure) is basically the same as the LTE random access procedure (or RACH procedure) except for the following differences. First, the RACH preamble format is different. In LTE, a preamble is based on a code/sequence (e.g., Zadoff-Chu sequence), whereas in NB-IoT, a preamble is a subcarrier. Secondly, the NB-IoT random access procedure (or RACH procedure) is performed based on a CE level. Accordingly, a different PRACH resource is for each CE level. Thirdly, since no SR resources are configured in NB-IoT, a UL resource allocation request is performed in a random access procedure (or RACH procedure) in NB-IoT.

Figure 18:
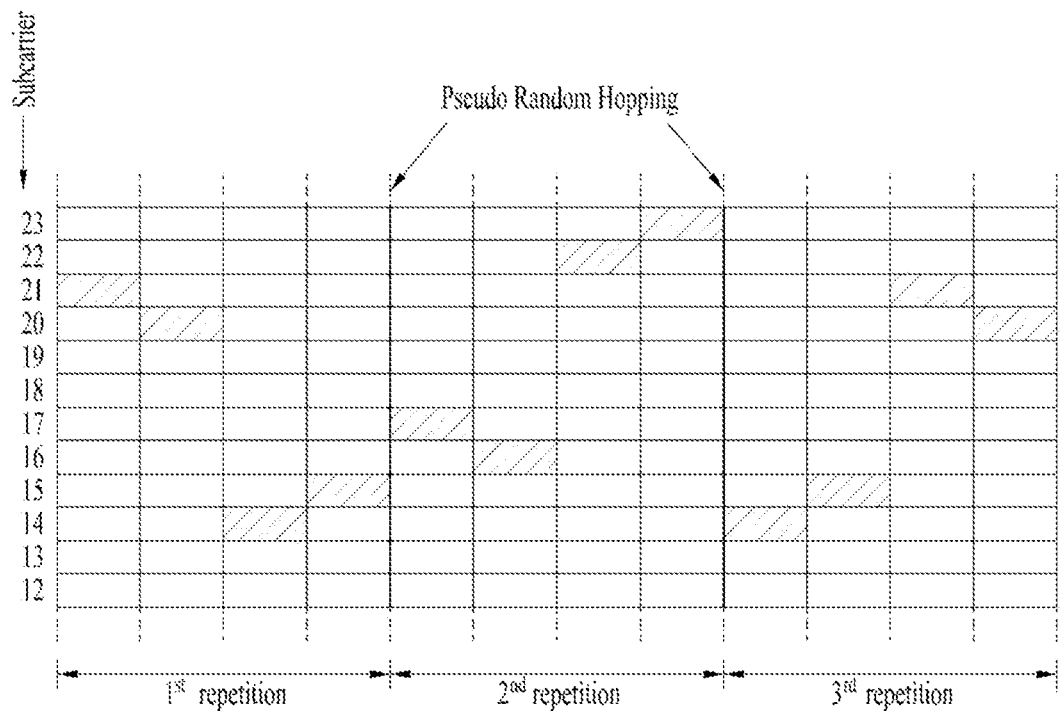
FIG. 18 is a diagram illustrating an exemplary transmission of a preamble on an NB-IoT random access channel (RACH)

FIG. 18 is a diagram illustrating an exemplary preamble transmission on an NB-IoT RACH.

Referring to FIG. 18, an NPRACH preamble includes four symbol groups, each including a CP and a plurality of (e.g., five) SC-FDMA symbols. In NR, SC-FDMA symbol may be replaced with OFDM symbol or DFT-s-OFDM symbol. The NPRACH supports only single-tone transmission with an SCS of 3.75 kHz, and provides CPs with lengths 66.7 μs and 266.67 μs to support different cell radiuses. Each symbol group is subjected to frequency hopping, and the following hopping pattern is used. Subcarriers carrying the first symbol group are determined in a pseudo-random manner. The second symbol group hops one subcarrier, the third symbol group hops six subcarriers, and the fourth symbol group hops one subcarrier. In the case of repeated transmissions, the frequency hopping procedure is repeatedly applied, and the NPRACH preamble may be transmitted repeatedly {1, 2, 4, 8, 16, 32, 64, 128} times to enhance coverage. An NPRACH resource may be configured for each CE level. The UE may select an NPRACH resource based on a CE level determined according to a DL measurement (e.g., RSRP) and transmit an RACH preamble in the selected NPRACH resource. The NPRACH may be transmitted on an anchor carrier or a non-anchor carrier in which an NPRACH resource is configured.

F. Discontinuous Reception (DRX) Operation

The UE may perform a DRX operation in the procedures and/or methods described in the present disclosure. When the UE is configured with DRX, the UE may reduce power consumption by receiving a DL signal discontinuously. DRX may be performed in an RRC_IDLE state, an RRC_INACTIVE state, and an RRC_CONNECTED state.
RRC_CONNECTED DRX In the RRC_CONNECTED state, DRX is used to receive a PDCCH discontinuously. DRX in the RRC_CONNECTED state is referred to as RRC_CONNECTED DRX).

Figure 19:
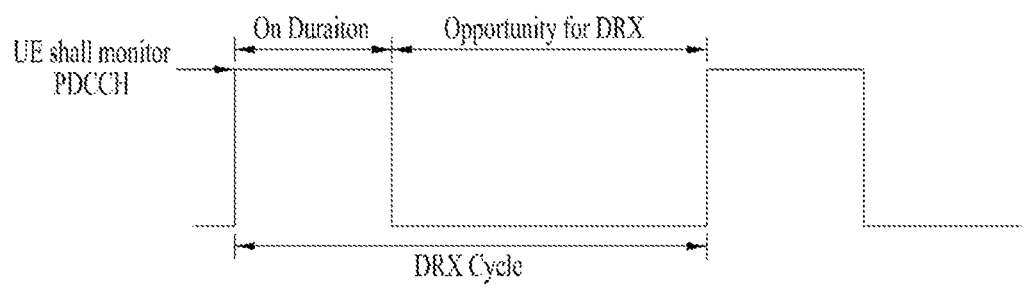
FIG. 19 is a diagram illustrating an exemplary discontinuous reception (DRX) cycle for discontinuous reception of a physical downlink control channel (PDCCH)

FIG. 19 is a diagram illustrating a DRX cycle for discontinuous reception of a PDCCH.

Referring to FIG. 19, a DRX cycle includes an On Duration and an Opportunity for DRX. The DRX cycle defines a time interval between periodic repetitions of the On Duration. The On Duration is a time period during which the UE monitors a PDCCH (or an MPDCCH or an NPDCCH). When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, the UE may perform PDCCH monitoring/reception discontinuously in the time domain in the above-described procedures and/or methods. For example, when DRX is configured, PDCCH monitoring may be performed discontinuously according to a DRX configuration in active cell(s) in the present disclosure. Specifically, when a PDCCH occasion (e.g., a time period configured for PDCCH monitoring (e.g., one or more consecutive OFDM symbols)) corresponds to the On Duration, PDCCH monitoring may be performed, whereas when the PDCCH occasion corresponds to the Opportunity for DRX, PDCCH monitoring may be skipped. On the contrary, when DRX is not configured, the UE may perform PDCCH monitoring/reception continuously in the time domain in the above-described procedures and/or methods. For example, when DRX is not configured, PDCCH reception occasions may be configured continuously in the present disclosure. Irrespective of whether DRX is configured, PDCCH monitoring may be restricted during a time period configured as a measurement gap.
RRC_IDLE DRX In the RRC_IDLE state and the RRC_INACTIVE state, DRX is used to receive a paging signal discontinuously. For convenience, DRX performed in the RRC_IDLE (or RRC_INACTIVE) state is referred to as RRC_IDLE DRX. Therefore, when DRX is configured, PDCCH monitoring/reception may be performed discontinuously in the time domain in the afore-described/proposed procedures and/or methods.

Figure 20:
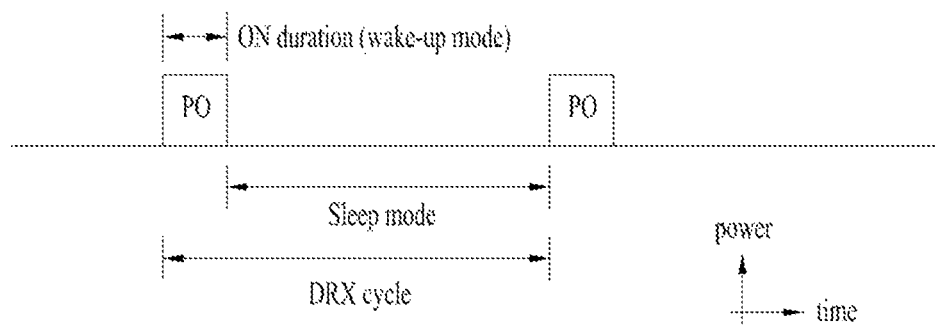
FIG. 20 is a diagram illustrating an exemplary DRX cycle for paging.

FIG. 20 is a diagram illustrating an exemplary DRX cycle for paging.

Referring to FIG. 20, DRX may be configured for discontinuous reception of a paging signal. The UE may receive DRX configuration information from the BS by higher-layer (e.g., RRC) signaling. The DRX configuration information may include configuration information for a DRX cycle, a DRX offset, for a DRX timer, and the like. The UE repeats an On Duration and a Sleep duration according to a DRX cycle. The UE may operate in a wakeup mode during the On duration and in a sleep mode during the Sleep duration. In the wakeup mode, the UE may monitor a paging occasion (PO) to receive a paging message. A PO means a time resource/interval (e.g., subframe or slot) in which the UE expects to receive a paging message. PO monitoring includes monitoring a PDCCH (or an MPDCCH or an NPDCCH) scrambled with a P-RNTI (hereinafter, referred to as a paging PDCCH) in a PO. The paging message may be included in the paging PDCCH or in a PDSCH scheduled by the paging PDCCH. One or more POs may be included in a paging frame (PF), and the PF may be periodically configured based on a UE ID. A PF may correspond to one radio frame, and the UE ID may be determined based on the international mobile subscriber identity (IMSI) of the UE. When DRX is configured, the UE monitors only one PO per DRX cycle. When the UE receives a paging message indicating a change of its ID and/or system information in a PO, the UE may perform an RACH procedure to initialize (or reconfigure) a connection with the BS, or receive (or obtain) new system information from the BS. Therefore, PO monitoring may be performed discontinuously in the time domain to perform an RACH procedure for connection to the BS or to receive (or obtain) new system information from the BS in the afore-described procedures and/or methods.

Figure 21:
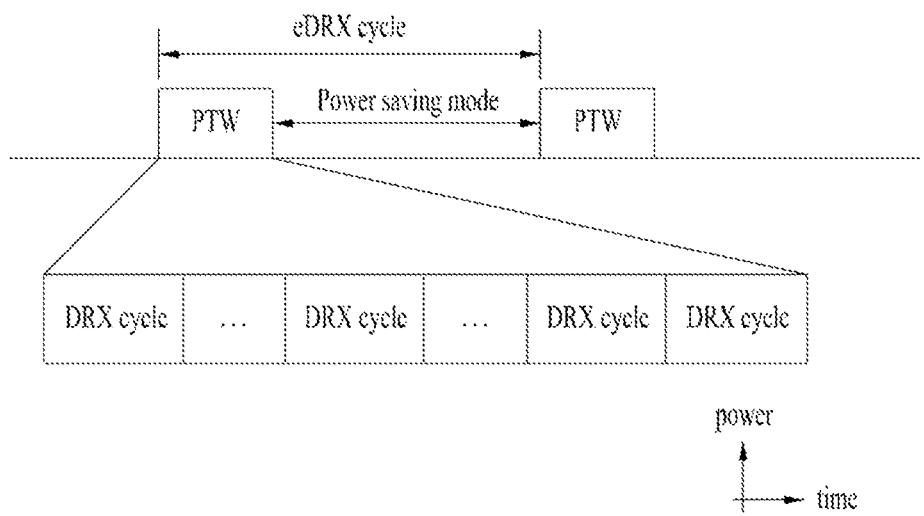
FIG. 21 is a diagram illustrating an exemplary extended DRX (eDRX) cycle.

FIG. 21 is a diagram illustrating an exemplary extended DRX (eDRX).

According to a DRX cycle configuration, a maximum cycle duration may be limited to 2.56 seconds. However, a UE that transmits and receives data intermittently, such as an MTC UE or an NB-IoT UE may suffer from unnecessary power consumption during a DRX cycle. To further reduce the power consumption of the UE, a method of significantly extending the DRX cycle based on a power saving mode (PSM) and a paging time window or paging transmission window (PTW) has been introduced, and the extended DRX cycle is simply referred to as an eDRX cycle. Specifically, paging hyper-frames (PHs) are periodically configured based on a UE ID, and a PTW is defined in a PH. The UE may monitor a paging signal by performing a DRX cycle in a PTW duration and thus switching to the wakeup mode in its PO. One or more DRX cycles (e.g., each including the wakeup mode and the sleep mode) as illustrated in FIG. 19 may be included in the PTW duration. The number of DRX cycles in the PTW duration may be configured by higher-layer (e.g., RRC) signaling from the BS.

G. Symbols, Abbreviations, and Terms

Symbols/abbreviations/terms used herein are defined as follows.
PDCCH: Physical downlink control channel. The PDCCH is a communication channel in the physical layer, for providing DCI. The proposed methods of the present disclosure are applicable to PDCCHs of various structures such as enhanced PDCCH (EPDCCH), MTC-PDCCH (MPDCCH), and narrowband-PDCCH (NPDCCH), even though not specified. The PDCCH is used as a term representing the PDCCHs of various structures, although not specified separately.
PUCCH: Physical uplink control channel. The PUCCH is a communication channel in the physical layer, for providing UCI. The proposed methods of the present disclosure are applicable to PUCCHs of various structures, even though not specified. The PUCCH is used as a term representing the PUCCHs of various structures, although not specified separately.
PDSCH: Physical downlink shared channel. The PDSCH is a communication channel in the physical layer, for providing DL data. The proposed methods of the present disclosure are applicable to PDCCHs of various structures such as narrowband-PDSCH (NPDSCH), even though not specified. The PDSCH is used as a term representing the PSCCHs of various structures, although not specified separately.
PUSCH: Physical uplink shared channel. The PUSCH is a communication channel in the physical layer, for providing UL data. The proposed methods of the present disclosure are applicable to PUSCHs of various structures such as narrowband-PUSCH (NPUSCH), even though not specified. The PUSCH is used as a term representing the PUSCHs of various structures, although not specified separately.
DCI: Downlink control information
UCI: Uplink control information
NDI: New data indicator. The NDI may be included in DCI (transmitted/received on the PDCCH) and indicates whether new data is transmitted/receives or previous data is retransmitted on a PDSCH/PUSCH scheduled by the DCI.
CB: Code block
CBG: Code block group
TB: Transport block
TBS: Transport block size
MCS: Modulation and coding scheme
SF: Subframe
RE: Resource element
RB: Resource block
HARQ: Hybrid automatic repeat request
SIB: System information block
LAA: licensed assisted access. A band defined in the LTE/LTE-A/LTE-A Pro/5G/NR system is referred to as a licensed bandwidth, and a band that is not defined in the LTE/LTE-A/LTE-A Pro/5G/NR system such as a Wi-Fi band or a Bluetooth (BT) band is referred to as an unlicensed bandwidth. An operation method in an unlicensed band is referred to as an LAA scheme.
Scheduling delay: The interval between the last transmission position (e.g., SF or slot) of the PDCCH dynamically scheduled by DCI and the starting transmission position (e.g., SF or slot) of a scheduled TB (PUSCH or PDSCH).
FH: Frequency hopping. An FH indicator is a DCI field indicating FH, and FH indication information is information indicating whether FH is enabled/disabled.
RA: Resource assignment
RV: Redundancy version
QAM: Quadrature amplitude modulation
MCL: Maximum coupling loss H. Proposed Methods of the Present Disclosure H.1. Technical Problem In communication systems such as LTE and NR, one DCI is generally used to schedule one PDSCH or PUSCH. When a plurality of TBs or HARQ processes are to be scheduled, the UE generally needs to monitor a plurality of different search spaces to obtain DCI that schedules each TB or HARQ process. However, when the size of transmission data is larger than a TBS transmittable at one time on a PDSCH/PUSCH or when continuous PDSCH/PUSCH transmissions are required for such a reason as the need for periodic data transmission, repeated PDCCH transmissions may increase the network overhead of the BS, and repeated PDCCH monitoring may cause power consumption in the UE. To solve these problems, a multi-TB scheduling (multiple-TB scheduling) structure for scheduling a plurality of TBs by one DCI may be considered. In the multi-TB scheduling structure, network overhead caused by repeated PDCCH transmissions may be reduced, and power consumption for detecting an additional DCI may be reduced in the UE. In LTE, a multi-SF scheduling structure for controlling a plurality of PUSCH transmissions by one DCI in LAA communication has been proposed. In this structure, the BS may schedule PUSCH transmissions corresponding to up to four HARQ processes by one DCI, and the UE may perform a plurality of PUSCH transmissions only by one PDCCH monitoring. Similarly, in the current Rel-16 NB-IoT/MTC item, a multi-TB scheduling technique for scheduling a plurality of TBs by one DCI is under discussion.

A multi-TB scheduling method under discussion in Rel-16 MTC is to support up to 8 HARQ processes in CE mode A and up to 4 HARQ processes in CE mode B. As the maximum number of TBs scheduled by one DCI is increased, overhead required for a DCI transmission may be reduced. However, the amount of information required for simultaneous scheduling of multiple TBs increases, thereby significantly increasing the number of required DCI bits. Particularly, considering that decoding reliability should be maintained to satisfy a target MCL in a system that should support enhanced coverage such as MTC, the number of DCI bits should be considered important in the design of DCI for multi-TB scheduling.

To solve the above problem, the present disclosure proposes methods of reducing the number of required DCI bits based on a correlation between some scheduling parameters in a DCI design process of a multi-TB scheduling method. Characteristically, the present disclosure proposes a method of determining the sizes and interpretations of specific DCI fields by information included in other DCI fields, when a plurality of TBs or HARQ processes are scheduled by one DCI, and also proposes a related TB transmission/reception procedure.

Proposed methods of the present disclosure may be applied to a multi-TB scheduling technique that controls transmission of one or more TBs by using one DCI in MTC and NB-IoT implemented in the LTE system. MTC and NB-IoT have low complexity and wide coverage requirements for UEs, and decoding reliability may be considered important to satisfy target MCL performance. Alternatively, the proposed methods of the present disclosure may be applied to multi-SF scheduling (or multiple-SF scheduling) for scheduling one or more PUSCH transmissions by one DCI, as in LAA implemented in the LTE system. As described before, when additional information is introduced to multi-SF scheduling DCI defined in the current LAA, the present disclosure may be applied, which is proposed to allow a new operation while the number of required DCI bits is maintained as much as possible.

Further, the same solution may be considered for an unlicensed band (U-band) technology being discussed in the NR system in view of similarity between the U-band technology of the NR system and the LAA technology of the LTE system. Specifically for the U-band technology, discussions are underway for multi-TTI scheduling or multiple-TTI scheduling in which one DCI schedules TBs in one or more slots, and a DCI design with low overhead may be sought. In addition, one of candidate technologies discussed for power saving of a UE in the NR system is multi-slot scheduling or multiple-slot scheduling for scheduling one or more PDSCH/PUSCHs by one DCI. Similarly, methods proposed for the purpose of scheduling non-consecutive TBs or HARQ process IDs may be applied. In addition to the examples of technologies to which the proposed methods described above may be applied, the present disclosure proposed to design a control channel carrying DCI or UCI in a general communication system may be applied, as far as the principle of the present disclosure is maintained.

H.2. Proposed Methods of the Present Disclosure

As an example to which the proposed methods of the present disclosure are applied, multi-TB scheduling (multiple-TB scheduling) may be considered, in which one or more TBs are dynamically scheduled by one DCI in a communication system such as LTE and NR. A TB is a unit in which one transmission is performed, and the term TB may be replaced with another term describing a transmission unit for scheduling in an applied technology (e.g., CB, CBG, subframe, slot, symbol, RE, RB, HARQ process, or the like).

Figure 22:
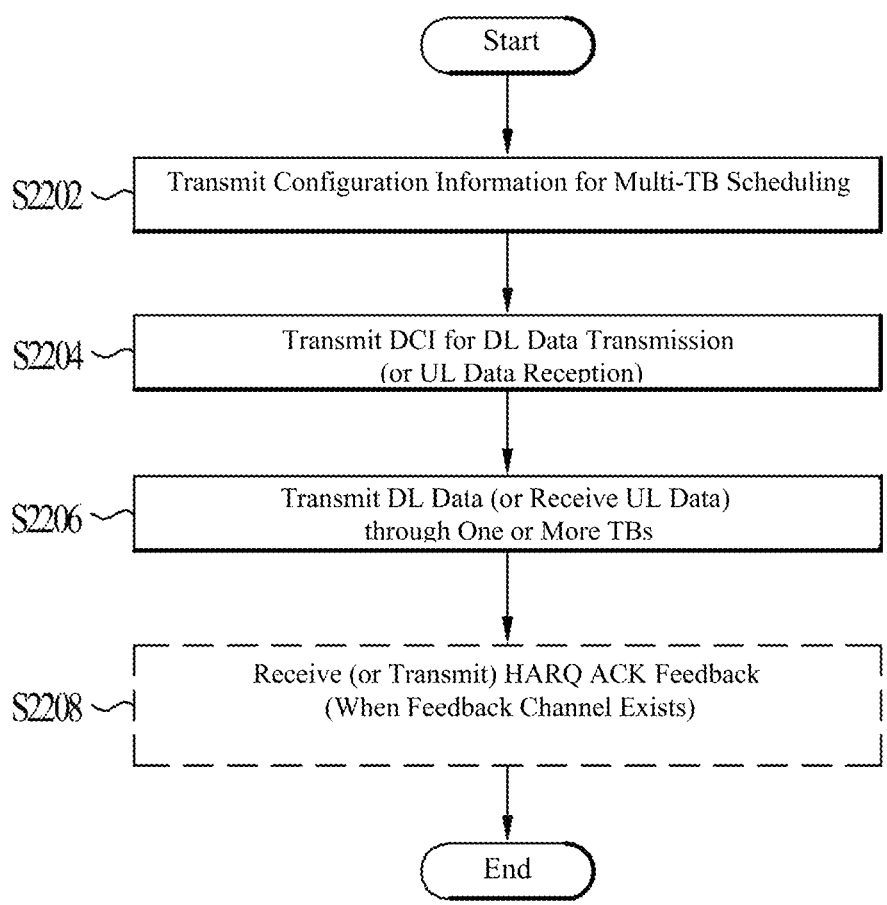
FIGS. 22 and 23 are exemplary flowcharts illustrating operations to which proposed methods of the present disclosure are applicable.

FIG. 22 is a flowchart illustrating a BS operation to which the proposed methods of the present disclosure are applicable. The illustrated case of FIG. 22 is merely an example, which should not be construed as limiting the proposed methods of the present disclosure. For example, even though some operations of FIG. 22 are not performed, the proposed methods of the present disclosure may be applied. Further, even though an operation not illustrated in FIG. 22 is added, the proposed methods of the present disclosure may be applied.

Referring to FIG. 22, to support multi-TB scheduling, a BS may signal (or transmit) configuration information for the multi-TB scheduling (e.g., information indicating support of multi-TB scheduling and parameters related to the multi-TB scheduling) to a UE (S2202). For example, the signaling may be information configured by higher-layer signaling such as an SIB or RRC signaling or information configured dynamically by DCI. Subsequently, in the presence of data to be transmitted to the UE or data to be received from the UE, the BS transmits DCI that schedules (transmission/reception of) one or more TBs (or DCI for DL data transmission or DCI for UL data reception) to the UE (S2204). In the presence of transmission data, the BS performs a DL data transmission (in the one or more TBs) after the DCI transmission (S2204). When the BS needs an HARQ-ACK feedback channel (for the TBs or DL data), the BS performs an operation of receiving the HARQ-ACK feedback channel (S2208). In the presence of data to be received, the BS performs a UL data reception (in the one or more TBs) after the DCI transmission (S2204). When the BS needs an HARQ-ACK feedback channel (for the TBs or UL data), the BS performs an operation of transmitting the HARQ-ACK feedback channel (52208). When no HARQ-ACK feedback is needed, the transmission/reception of the HARQ-ACK feedback channel (52208) may be skipped.

Figure 23:
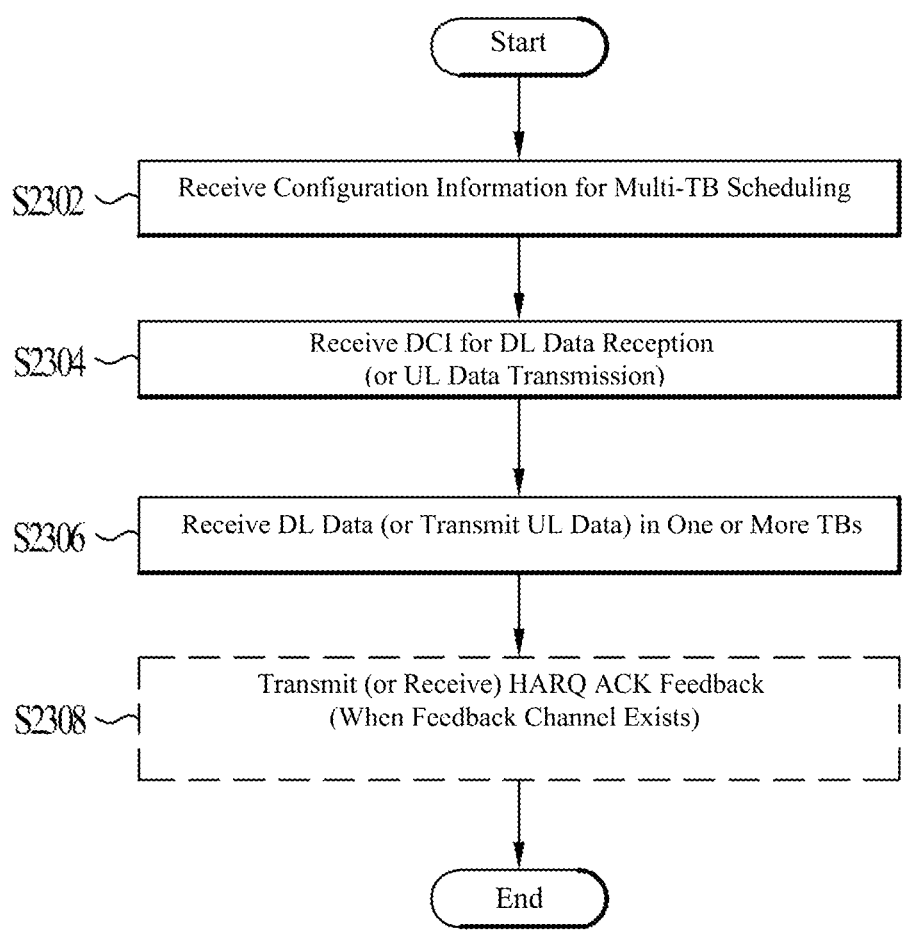

FIG. 23 is a flowchart illustrating a UE operation to which the proposed methods of the present disclosure are applicable. The illustrated case of FIG. 23 is merely an example, which should not be construed as limiting the proposed methods of the present disclosure. For example, even though some operations of FIG. 23 are not performed, the proposed methods of the present disclosure may be applied. Further, even though an operation not illustrated in FIG. 23 is added, the proposed methods of the present disclosure may be applied.

Upon receipt of signaling including configuration information for multi-TB scheduling (e.g., information indicating support of multi-TB scheduling and parameters related to the multi-TB scheduling) (S2302), the UE may monitor DCI that schedules one or more TBs (or DCI for multi-TB scheduling) (S2304). For example, the signaling may be information configured by higher-layer signaling such as an SIB or RRC signaling or information configured dynamically by DCI. Upon detection/reception of DCI including information that schedules one or more TBs (or information for multi-TB scheduling) (52304), the UE identifies the transmission/reception positions of the TBs based on the signaling and scheduling information included in the DCI. In the presence of data to be received, the UE receives (DL data in) the one or more TBs after the DCI reception (S2306). When the UE needs an HARQ-ACK feedback channel (for the TBs or DL data), the UE performs an operation of transmitting the HARQ-ACK feedback channel (S2308). In the presence of data to be transmitted, the UE transmits (UL data in) the one or more TBS after the DCI reception (S2306). When the UE needs an HARQ-ACK feedback channel (for the TBs or UL data), the UE performs an operation of receiving the HARQ-ACK feedback channel (S2308).

Figure 24:
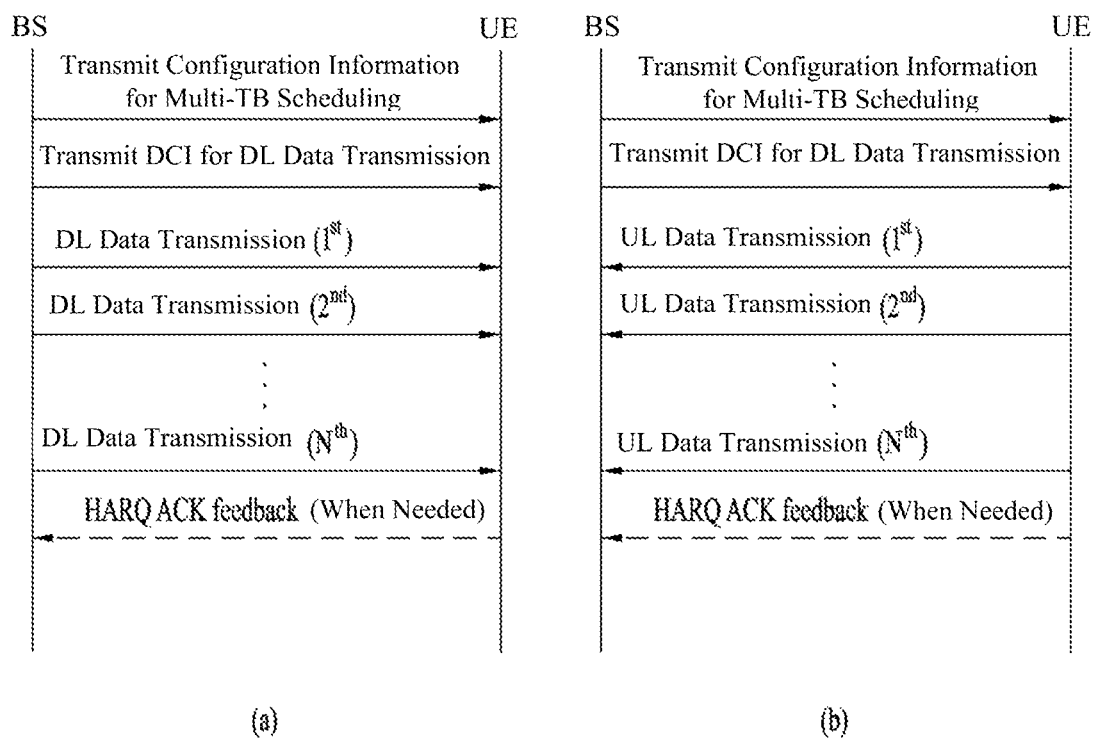
FIG. 24 is a diagram illustrating a transmission/reception process between a base station (BS) and a user equipment (UE), to which the proposed methods of the present disclosure are applicable.

FIG. 24 is a diagram schematically illustrating a transmission/reception process between a BS and a UE.

In the example of FIGS. 22 to 24, when the system supports MTC, DCI may be transmitted/received on an MPDCCH (S2204 or S2304), UL data may be transmitted/received at least once on a PUSCH (S2206 or S2306), DL data may be transmitted/received at least once on a PDSCH (S2206 or S2306), and an HARQ-ACK feedback may be transmitted/received at least once on a PUCCH (S2208 or S2308) (e.g., see "C. MTC (Machine Type Communication)"). In the example of FIGS. 22 to 24, when the system supports NB-IoT, DCI may be transmitted/received on an NPDCCH (S2204 or S2304), UL data may be transmitted/received at least once on an NPUSCH (S2206 or S2306), DL data may be transmitted/received at least once on an NPDSCH (S2206 or S2306), and an HARQ-ACK feedback may be transmitted/received at least once on an NPUSCH (S2208 or S2308) (e.g., see "D. NB-IoT (Narrowband- Internet of Things)"). NPDCCH and MPDCCH may be collectively referred to as PDCCH, NPUSCH may be collectively referred to as PUSCH, and NPDSCH may be collectively referred to as PDSCH.

While a BS operation and a UE operation have been described above in the context of multi-TB scheduling using one DCI, by way of example, the principle of the present disclosure may also be applied to other information transmission schemes such as a UL control channel using UCI.

In the proposed methods of the present disclosure, some of the following methods may be selectively applied. Each method may be performed independently or one or more methods may be performed in combination. Some terms, symbols, sequences, and so on used to describe the present disclosure may be replaced with other terms, symbols, sequences, and so on, as far as the principle of present disclosure is maintained.

(Method 1)

In Method 1 of the present disclosure, the same TB may be repeatedly transmitted for coverage extension, and a repetition number for the TB may be configured by the BS. For example, repeated TB transmissions may amount to repeated transmissions, in subframes, of a physical channel scheduled for data transmission by DCI such as a PDSCH or a PUSCH, as is done in MTC.

When the DCI may include both of RV indication information and FH indication, the present disclosure proposes a method of interpreting the RV indication information and the FH indication information in a different manner according to a repetition number configured by the BS. This proposed method may be used to reduce the total number of bits in the DCI based on the characteristics of application of an RV and an FH.

When an RV is changed at each of repeated TB transmissions, that is, RC cycling is applied to the repeated TB transmissions, the proposed method may be advantageous. For example, when there are a total of four available RV states (e.g., RV0, RV1, RV2, and RV3) as in MTC, and an RV is cyclically used for each subframe, more RVs are used for a larger repetition number. The resulting increased probability of using all RV states decreases the need for RV scheduling by DCI. Further, when a TB is not repeated, there is no period to which FH is applied, which obviates the need for including an FH indicator in the DCI and thus makes application of the proposed method advantageous.

In an example of Method 1, a total of 2 bits in DCI may be used to indicate an RV and FH. When a TB scheduled by the DCI is not repeatedly transmitted, the 2 bits are used to indicate the RV in the 2-bit DCI field, while FH may always be fixed. When it is said that FH is always fixed, this may mean that FH is always disabled (or a value indicating disable is always applied to FH), or FH is semi-statically enabled/disabled by higher-layer signaling such as an SIB or RRC signaling. Alternatively, FH may be implicitly determined based on other parameters in the DCI, rather than FH is always fixed. When the TB scheduled by the DCI is repeatedly transmitted two or more times, it may be regulated that only one bit of the 2-bit DCI field is used to indicate an RV, and the remaining one bit is used as the FH indicator. When an RV is indicated in one bit, the RV may be one selected between RV0 (or an RV value of 0) and RV2 (or an RV value of 2). When an RV is indicated in two bits, the RV may be one selected from among RV0 (or an RV value of 0), RV1 (or an RV value of 1), RV2 (or an RV value of 2), and RV3 (or an RV value of 3). When the above example is applied to MTC, one bit may be reduced compared to a legacy DCI format in which an RV and FH are independently indicated in two bits and one bit, respectively. Further, when the repetition number is 1, RV states may be represented at the same level as the legacy DCI format. Only when the repetition number is 2 or larger, it is possible to apply FH and thus a frequency diversity gain may be expected. The above-described example is tabulated in Table 13.

TABLE 13

| Repetition | =1 | ≥2 |
|---|---|---|
| FH | 0 bit | 1 bit |
| RV | 2 bit | 1 bit |

Referring to Table 13, the first one bit of two bits in total may be used as information about an RV regardless of whether a TB is repeated, and the second one bit of the 2 bits may be used as information about an RV or FH according to whether the TB is repeated. Accordingly, when the BS transmits DCI for multi-TB scheduling (e.g., S2204), the BS may indicate an RV by the first one bit of 2 bits included in the DCI, and additionally use the second one bit to indicate the RV or to indicate whether to apply FH. More specifically, when a TB scheduled by the DCI is not repeated, the BS may indicate the RV related to the TB by the second one bit. When the TB scheduled by the DCI is repeated two or more times, the BS may indicate whether to apply FH by the second one bit. When the second one bit is used to indicate the RV, the BS may transmit or receive the TB scheduled by the DCI based on the fixed FH and the indicated RV (e.g., S2206). When the second one bit is used to indicate FH, the BS may transmit or receive the TB scheduled by the DCI based on the indicated FH and the RV indicated by the first one bit (e.g., S2206).

When the UE receives DCI for multi-TB scheduling (S2204), the UE may use the second one bit of 2 bits included in the DCI to determine an RV or to determine whether to apply FH. More specifically, when a TB scheduled by the DCI is not repeated, the UE may determine an RV based on the second one bit, and when the TB scheduled by the DCI is repeated two or more times, the UE may determine whether to apply FH based on the second one bit. When the second one bit is used to determine the RV, the UE may transmit or receive the TB scheduled by the DCI based on the fixed FH and the determined RV (e.g., S2206). When the second one bit is used to determine FH, the UE may transmit or receive the TB scheduled by the DCI based on the determined FH and the RV indicated by the first one bit (e.g., S2206).

In another example of Method 1, when a total of two bits are used for RV indication and FH indication, and when a TB scheduled by DCI is not repeated or is repeated less than four times, the two bits of the 2-bit DCI field may be used to indicate an RV, while FH may always be fixed. When it is said that FH is always fixed, this may mean that FH is always disabled (or a value indicating disable is applied to FH), or FH is semi-statically enabled/disabled by higher-layer signaling such as an SIB or RRC signaling. Alternatively, FH may be implicitly determined based on other parameters of the DCI, rather than FH is always fixed. When the TB scheduled by the DCI is repeatedly transmitted four or more times, it may be regulated that only one bit of the 2-bit DCI field is used to indicate an RV, and the remaining one bit is used as the FH indicator. When an RV is indicated in one bit, the RV may be one selected between RV0 (or an RV value of 0) and RV2 (or an RV value of 2). When an RV is indicated in 2 bits, the RV may be one selected from among RV0 (or an RV value of 0), RV1 (or an RV value of 1), RV2 (or an RV value of 2), and RV3 (or an RV value of 3). When the above example is applied to MTC, one bit may be reduced compared to the legacy DCI format in which an RV and FH are independently indicated in two bits and one bit, respectively. Further, when the repetition number is 2 or less, RV states may be represented at the same level as the legacy DCI format. When the repetition number is 2 or less, a diversity gain achievable from FH may not be great. In this case, a higher RV gain may be intended instead of an FH gain. Additionally, when the repetition number is 4 or more, FH is applicable, and thus a frequency diversity gain may be expected. The above example is tabulated in Table 14.

TABLE 14

| Repetition | <4 | ≥4 |
|---|---|---|
| FH | 0 bit | 1 bit |
| RV | 2 bit | 1 bit |

The example of Table 14 is different from the example of Table 13, in terms of a repetition number based on which the second one bit is differently interpreted. Therefore, the UE operation and the BS operation described with reference to Table 13 are incorporated herein by reference, except that "when the TB scheduled by the DCI is not repeated" in the operation described with reference to Table 13 is replaced by "when the TB scheduled by the DCI is not repeated or is repeated less than four times", and "when the TB scheduled by the DCI is repeated two or more times" in the operation described with reference to Table 13 is replaced by "when the TB scheduled by the DCI is repeated four or more times".

In another example of Method 1, a total of one bit may be used for RV indication and FH indication. When a TB scheduled by DCI is not repeated or is repeated less than four times, the 1-bit DCI field may be used to indicate an RV, while FH may always be fixed. When it is said that FH is always fixed, this may mean that FH is always disabled (or a value indicating disable is applied to FH) or FH is semi-statically enabled/disabled by higher-layer signaling such as an SIB or RRC signaling. Alternatively, FH may be implicitly determined based on other parameters of the DCI, rather than FH is always fixed. When the TB scheduled by the DCI is transmitted repeatedly four or more times, or two or more times, the 1-bit DCI field may be used as the FH indicator, while an RV may always have a fixed value. When it is said that an RV is always fixed, this may mean that a specific RV value (e.g., RV0 or an RV value of 0) is used all the time, or an RV is semi-statically enabled/disabled by higher-layer signaling such as an SIB or RRC signaling. Alternatively, the RV may be implicitly determined (e.g., an initial transmission or a retransmission) based on other parameters of the DCI, rather than the RV is always fixed. When an RV is indicated in one bit, the RV may be one selected between RV0 (or an RV value of 0) and RV2 (or an RV value of 2). When an RV is indicated in two bits, the RV may be one selected from among RV0 (or an RV value of 0), RV1 (or an RV value of 1), RV2 (or an RV value of 2), and RV3 (or an RV value of 3). When the above example is applied to MTC, two bits may be reduced compared to the legacy DCI format in which an RV and FH are independently indicated in two bits and one bit, respectively. The above example is tabulated in Table 15.

[FIG. 15]

| Repetition | <4 | >4 |
|---|---|---|
| FH | 0 bit | 1 bit |
| RV | 1 bit | 0 bit |

In the example of Table 15, DCI includes one bit for an RV or FH, and the one bit may be used as information about the RV or FH according to TB repetition. Accordingly, when the BS transmits DCI for multi-TB scheduling (e.g., S2204), the BS may indicate an RV or indicate whether to apply FH by one bit included in the DCI. More specifically, when the TB scheduled by the DCI is not repeated or is repeated less than four times, the BS may indicate an RV related to the TB by the one bit, and when the TB scheduled by the DCI is repeated four or more times or two or more times, the BS may indicate whether to apply FH by the one bit. When the one bit is used to indicate an RV, the BS may transmit or receive the TB scheduled by the DCI based on the fixed FH and the indicated RV (e.g., S2206). When the one bit is used to indicate FH, the BS may transmit or receive the TB scheduled by the DCI based on the indicated FH and the fixed RV (e.g., S2206).

When the UE receives DCI for multi-TB scheduling (S2204), the UE may use one bit included in the DCI to determine an RV or to determine whether to apply FH. More specifically, when a TB scheduled by the DCI is not repeated or is repeated less than four times, the UE may determine an RV based on the one bit, and when the TB scheduled by the DCI is repeated four or more times or two or more times, the UE may determine whether to apply FH based on the one bit. When the one bit is used to determine an RV, the UE may transmit or receive the TB scheduled by the DCI based on fixed FH and the determined RV (e.g., S2206). When the one bit is used to determine whether to apply FH, the UE may transmit or receive the TB scheduled by the DCI based on the determined FH and a fixed RV (e.g., S2206).

When DCI may schedule RV indication information and FH indication information and at the same time, schedule subframe-wise repeated transmissions of a PDSCH/PUSCH as in MTC CE mode A, the BS may use the methods proposed in Method 1 to determine an RV and determine whether to apply FH according to a situation.

(Method 1-A)

The present disclosure proposes a method of implicitly determining the size of a DCI field that determines an RV for a TB scheduled by DCI according to a code rate applied to a transmission of the TB. The code rate refers to the ratio of the length of a codeword after rate matching to the length of data before channel coding, when the length of the actually transmitted codeword is determined during the rate matching after the data to be transmitted is channel-encoded (e.g., TBCC, turbo code, polar code, LDPC, or the like).

In an example of Method 1-A, the size of a DCI field indicating an RV may be determined in consideration of a puncturing ratio during rate matching of channel-encoded data based on scheduling information for a TB transmission (e.g., a TBS, the size of time/frequency-domain resources used for the TB transmission, and so on).

In a specific method of Method 1-A, it is assumed that up to M bits are available for a DCI field indicating an RV. Then, when X % or more of encoded data may be included in a TB transmission after rate matching, the size of the DCI field indicating an RV may be determined to be Y(≥0) bits. (M-Y) bits that are not used for RV indication may be included in a DCI field serving a purpose other than RV indication. On the other hand, when less than X % of the encoded data may be included in the TB transmission after the rate matching, the size of the DCI field indicating an RV may be determined to be Z(>Y) bits. (M-Z) bits that are not used for RV indication may be included in a DCI field serving a purpose other than RV indication.

The method proposed in Method 1-A may be intended to increase a coding gain by increasing the scheduling flexibility of an RV in consideration of the characteristics of a circular buffer in the UE and a coding gain brought by the RV, when many encoded bits are punctured during rate matching. On the contrary, when a smaller number of encoded bits are punctured during rate matching or when repetition is applied, a coding gain brought by an RV is low. Therefore, a gain (e.g., a FH-incurred diversity gain) may be achieved in a method other than the method proposed in Method 1-A.

(Method 1-B)

In the present disclosure, a case in which an FH indicator may be used for a different purpose by a higher-layer configuration as in MTC is considered. Because the methods proposed in Method 1 are for adaptively using RV information and FH information through joint encoding, when the FH indicator is used for a different purpose, Method 1 may be restrictively applied. To overcome this limitation, the proposed methods of the present disclosure may include a method of determining whether Method 1 is applied according to higher-layer signaling indicating whether the FH indicator is used for a different purpose.

In a characteristic example to which Method 1-B is applied, use of the FH indicator to support 64QAM in MTC may be considered. When 64QAM is to be supported for PDSCH transmission in CE mode A in MTC, it may be indicated that 64QAM is available by a higher-layer signal (e.g., RRC signal). When the repetition number is set to 2 or larger by DCI, a UE receiving the indication uses the FH indicator to determine whether FH is applied. When the repetition number is set to 1, the UE uses the FH indicator as an additional bit for an MCS field. When the FH indicator may be used for different purposes according to repetition numbers in this manner, there may be limitations in using methods of using the FH indicator to provide RV information in the case of a small number of PDSCH repetitions as in the methods proposed in Method 1.

To solve the above problems, the present disclosure proposes that when a DCI field available for transmission of information of an FH indicator is used for any other purpose by higher-layer signaling (e.g., RRC signaling), Method 1 is not applied, and when the higher-layer signaling does not exist or it is determined not to use the FH indicator for any other purpose, Method 1 is applied. In the above-described example of MTC, it may be regulated when a UE of CE mode A is configured to support 64QAM for PDSCH reception by higher-layer signaling (e.g., RRC signaling), Method 1 is not applied, and when it is not signaled whether 64QAM is supported (or 64QAM is not configured for PDSCH reception), Method 1 is applied.

In a specific example of the method proposed in Method 1-B, when a UE is configured to support 64QAM for PDSCH reception by higher-layer signaling (e.g., RRC signaling) in MTC CE mode A, a DCI field for providing an FH indicator exists. When the repetition number for the PDSCH is 1, the DCI field may be used for MCS interpretation (e.g., as an additional bit of the MCS field) to support 64QAM, and when the repetition number for the PDSCH is 2 or larger, the DCI field may be used as the FH indicator without separately providing information about an RV. On the contrary, when it is not signaled whether 64QAM is supported (or 64QAM is not configured for PDSCH reception), the method of using one bit of DCI as the FH indicator for the repetition number set to 4 (or 2) or larger, and using the one bit for providing RV information for the repetition number set to be less than 4 (or 2) as described in Table 15 proposed in Method 1 may be used.

The proposed methods of Method 1-B may include a method of using different DCI field interpretations for a case in which a DCI field available for transmission of information of an FH indicator is used for any other purpose by higher-layer signaling (e.g., RRC signaling) and a case in which the DCI field is used for its original purpose. For example, in the case where one bit is designated as a field for FH and RV information in the example of MTC, when 64QAM support is determined for a UE not configured to use 64QAM by higher-layer signaling (e.g., RRC signaling), the DCI field interpretation method as illustrated in Table 15 proposed in Method 1 may be applied to the UE. On the other hand, when the UE is configured to use 64QAM by higher-layer signaling (e.g., RRC signaling), for a repetition number set to 1, the one bit may be used as an MCS interpretation field (or an additional bit of the MCS field) for supporting 64QAM. For a repetition number set to 2, the one bit may be used as an RV interpretation field. For a repetition number set to 4, the one bit may be used as an FH indicator, as illustrated in Table 16.

TABLE 16

| Repetition | =1 | =2 | ≥4 |
| --- | --- | --- | --- |
| FH | 0 bit | 0 bit | 1 bit |
| RV | 0 bit | 1 bit | 0 bit |
| 64 QAM | 1 bit | 0 bit | 0 bit |

It may be assumed that a UE supporting 64QAM is generally in a good MCL (i.e., good coverage) state, and thus it may be predicted that the UE may have a low retransmission probability. Further, when 64QAM is used, the amount of information transmittable in one RE greatly increases. Therefore, there is a high possibility that no bit is punctured or a relatively small number of bits are punctured during rate matching. Considering this characteristic, it may be expected that a UE configured to use 64QAM will have a relatively small gain from a retransmission scheme in which an RV is designated. In this respect, the method proposed in Method 1-B is advantageous in that it may be determined whether to provide an RV according to a requirement level of RV information. Further, network overhead may be reduced because an existing higher-layer signal is reused without causing signaling overhead for indicating this operation.

(Method 2)

In the present disclosure, multi-TB scheduling is considered to dynamically schedule one or more TBs by one DCI. Further, a case in which the plurality of TBs scheduled by the DCI always have consecutive HARQ process IDs is considered. In this case, to represent the dynamic number of TBs together with the HARQ process IDs, the DCI may include information about the number of scheduled TBs and information about a starting HARQ process ID. For example, when up to 8 TBs are scheduled by one DCI as in MTC CE mode A, X (≤8) TBs may be dynamically scheduled, and sequential HARQ process IDs for the X TBs, #Y,

(mod(Y+1, 8)), . . . , #(mod(Y+X−1, 8)) may be calculated based on information Y about the starting one of the scheduled HARQ process IDs.

The present disclosure proposes a method of differently interpreting a bitmap representing NDI information about scheduled TBs, information about the starting one of HARQ process IDs for the scheduled TBs, and some other scheduling information, according to the number of TBs dynamically scheduled by DCI. In the proposed method, some other scheduling information includes MCS/TBS information based on which the code rate of a codeword carried by a TB may be determined in MTC and RA information based on which a frequency-domain resource area used for RE mapping is determined. The proposed method may be used for the purpose of reducing the total number of bits of DCI in consideration of a specific situation that may be mainly applied when a plurality of TBs are scheduled.

The proposed method may be advantageous in a situation in which when payload larger than the maximum size of payload schedulable in one TB is to be transmitted, multi-TB scheduling is used to reduce network overhead by reducing the number of DCI transmissions.

For example, when multi-TB scheduling is used and the same TBS is applied to all TBs scheduled by one DCI, scheduling of X (<Y) TBs with a small TBS may be supported by scheduling of Y TBs with a large TBS. Therefore, a method of reducing the number of DCI bits may be considered, instead of limiting some of a plurality of scheduling methods for supporting the same payload.

A method proposed in Method 2 may be configured by combining one or more of the following options.

(Option 2-1) Method 2 may include a method of determining the size of a DCI field indicating information about the starting one of the HARQ process IDs of TBs scheduled by DCI according to the number of the scheduled TBs, like Option 2-1. Characteristically, as the number of TBs scheduled by one DCI increases, a method of reducing the number of bits representing the starting one of the HARQ process IDs of the scheduled TBs may be considered. For example, in the case where up to 8 TBs are scheduled by one DCI as in CE mode A of MTC, when all 8 TBs are scheduled by multi-TB scheduling DCI, information about the starting HARQ process ID may not be required. On the other hand, when only a small number of TBs are scheduled, a maximum number of cases should be supported to utilize all the HARQ process IDs. For example, a 3-bit DCI field may be needed to represent all numbers from 1 to 8.

(Option 2-2) Method 2 may include a method of determining the size of a bitmap representing the NDIs of TBs scheduled by DCI according to the number of the scheduled TBs, like Option 2-2. In general, the bitmap may need as many bits as a minimum number of scheduled TBs in order to represent NDIs. Therefore, a method of adaptively reducing the size of an NDI bitmap for a small number of scheduled TBs and adaptively increasing the size of the NDI bitmap for a large number of scheduled TBs may be used. For example, in the case where up to 8 TBs are scheduled by one DCI as in CE mode A of MTC, when all 8 TBs are scheduled by multi-TB scheduling DCI, the size of a required NDI bitmap may be 8 bits. On the other hand, when only X (<8) TBs are scheduled, 8-X bits are useless in terms of representing NDIs. Therefore, the size of the NDI bitmap may be reduced to be used for any other purpose, to thereby reduce the whole DCI size. In this example, the NDIs may be represented in the same number of bits as the number of scheduled TBs (X bits) and the remaining bits (8-X bits) are not used to represent the NDIs.

(Option 2-3) As in Option 2-3, the size of a DCI field indicating an MCS/TBS may be determined according to the number of TBs scheduled by DCI in Method 2. Characteristically, as the number of TBs scheduled by one DCI increases, a method of reducing the size of bits representing MCS/TBS information may be considered. This method may be intended to reduce the total DCI size instead of reducing unnecessary scheduling flexibility, when the same payload as described above may be accommodated in one or more scheduling schemes. For example, in the case where up to 8 TBs are scheduled by one DCI as in CE mode A of MTC, when a plurality of TBs (e.g., 2 to 7 TBs) are scheduled, the size of a DCI field indicating an available MCS/TBS may be adaptively determined. The size of the DCI field may be less than or equal to the size of a DCI field indicating an MCS/TBS used when one TB is scheduled.

(Option 2-4) As in Option 2-4, the size of a DCI field indicating an RA may be determined according to the number of TBs scheduled by DCI in Method 2. Characteristically, as the number of TBs scheduled by one DCI increases, a method of reducing the size of bits representing RA information may be considered. This may be intended to exclude allocation of a small-size frequency domain resource to ensure the code rate of each TB, when it may be assumed that especially when a plurality of TBs are scheduled by applying Option 2-3, only a large TBS is selected. On the contrary, when a small-size RA is used for a large TBS per TB, a code rate may increase, thereby degrading decoding performance and causing the difficulty of supporting a target MCL. For example, in the case where up to 8 TBs are scheduled by one DCI as in CE mode A of MTC, the size of the DCI field indicating an RA available when a plurality of TBs (2 to 7 TBs) are scheduled may be determined adaptively. The size of the DCI field may be less than or equal to the size of the DCI field indicating an RA which is used when one TB is scheduled.

(Option 2-5) As in Option 2-5, the size of a DCI field specifying an MCS and/or an RA may be determined by a flag bit(s) field included in DCI in Method 2. Characteristically, a method of determining a configuration scheme for the remaining DCI bits according to flag information included in DCI, and reducing the number of bits indicating MCS and/or RA information in a configuration scheme for some DCI fields may be considered. Particularly because a small TBS leads to a small number of bits (or states) required to represent HARQ IDs and NDIs, more information may be transmitted. Thus, this method may be intended to reduce the computation complexity of a UE and maximize the size of available information. Characteristically, in the multi-TB scheduling DCI using the flag bit(s) field, the flag bit(s) field may be used to distinguish a method of supporting the MCS and RA field to have a smaller size compared to the legacy DCI for single-TB scheduling only from a method of supporting an MCS and an RA at the same level as the legacy DCI for single-TB scheduling only, when only a smaller number of TBs (e.g., one or two TBs) are scheduled.

Table 17 tabulates an example of designing some areas of DCI fields by combining Option 2-1, Option 2-2, Option 2-3, and Option 2-4 in a situation in which up to 8 TBs are scheduled by one DCI. In the example of the following table, as the number of scheduled TBs increases, the size of a bitmap representing NDIs increases according to the number of the TBs. The numbers of DCI bits representing an MCS, an RA, and a starting HARQ process ID may decrease according to the increased size of the NDI bitmap, and as a result, the total size of DCI fields may be maintained equal. In the following example, the number of bits representing an RA may mean a required minimum number of bits, and one to four bits may be added according to the size of a bandwidth in which a PDSCH may be transmitted.

TABLE 17

| | Size of DCI fields | | | |
|---|---|---|---|---|
| Number of scheduled TBs | Starting HARQ process ID | NDI bitmap | MCS | Resource assignment |
| 8 | 0 bit | 8 bit | 2 bit | 2 bit |
| 7 | 1 bit | 7 bit | 2 bit | 2 bit |
| 6 | 2 bit | 6 bit | 2 bit | 2 bit |
| 5 | 3 bit | 5 bit | 2 bit | 2 bit |
| 4 | 3 bit | 4 bit | 2 bit | 3 bit |
| 3 | 3 bit | 3 bit | 2 bit | 4 bit |
| 2 | 3 bit | 2 bit | 3 bit | 4 bit |
| 1 | 3 bit | 1 bit | 4 bit | 4 bit |

Table 18 tabulates an example of designing some areas of DCI fields by combining Option 2-2 and Option 2-5 in a situation where up to 8 TBs are scheduled by one DCI. In the example of the following table, the sizes of DCI fields representing an MCS and an RA may be determined according to the state of a flag bit. For the determination, a method of using the same sizes as those of MCS and RA fields in the legacy single-TB scheduling DCI and a method of decreasing the size of each of the MCS and RA fields by 1 bit are available. In the example of the following table, Others means all cases in which the method of reducing the MCS/RA field by a flag is applied, which may be designed by combining other methods and options proposed in the present disclosure (e.g., Option 2-1, Option 2-2, Option 2-3, and Option 2-4). In the example of the following table, the states of the flag are an example given for illustrative purposes, and the spirit of the present disclosure is equally applicable to other methods of representing a flag. Further, in the following example of the flag, the flag bit(s) field may not exist according to a previously determined upper flag bit or information included in other fields. In this case, the bit sizes of the MCS and RA fields may be determined to correspond to Others. In the following example, the size of bits representing an RA means a required minimum number of bits, and 1 to 4 bits may be added according to the size of a bandwidth in which a PDSCH may be transmitted.

TABLE 18

| | Size of DCI fields | | | |
|---|---|---|---|---|
| Number of scheduled TBs | Flag bit(s) | NDI bitmap | MCS | Resource assignment |
| 1 | Flag = 1 | 1 bit | 4 bit | 5 bit |
| 2 | | 2 bit | 4 bit | 5 bit |
| Others | Flag = 0 (Or Not exist) | Y bit | 3 bit | 4 bit |

Table 19 tabulates an example of designing some areas of DCI fields by combining Option 2-2, Option 2-3, Option 2-4, and Option 2-5, when up to 8 TBs are scheduled by one DCI. In the example of the following table, when the number of scheduled TBs is 1 or 2, the sizes of DCI fields representing an MCS and an RA are 4 bits and 5 bits, respectively, and in the other cases, they are 3 bits and 4 bits, respectively. In the following example, the size of bits representing an RA means a required minimum number of bits, and 1 to 4 bits may be added according to the size of a bandwidth in which a PDSCH may be transmitted.

TABLE 19

| | Size of DCI fields | | | |
|---|---|---|---|---|
| Number of scheduled TBs | Number of TBs & HARQ process IDs | NDI bitmap | MCS | Resource assignment |
| 1 | 9 bit | 1 bit | 4 bit | 5 bit |
| 2 | 8 bit | 2 bit | 4 bit | 5 bit |
| 4 | 8 bit | 4 bit | 3 bit | 4 bit |
| 6 | 6 bit | 6 bit | 3 bit | 4 bit |
| 8 | 4 bit | 8 bit | 3 bit | 4 bit |

When the size of the DCI field representing an MCS/TBS and the size of the DCI field representing an RA are limited by the number of scheduled TBs as in Option 2-3, Option 2-4, and Option 2-5, scheduling flexibility may be limited. To compensate for the limitation, a method of semi-statically configuring information represented by the decreased DCI fields by higher-layer signaling such as an SIB or RRC signaling may be considered. For example, when 2 bits are used for the DCI field representing an MCS in Table 17, an MCS index indicated by the 2 bits may be determined by (or in conjunction with) RRC signaling.

(Method 3)

In Method 3 of the present disclosure, multi-TB scheduling is considered to dynamically schedule one or more TBs by one DCI. Further, a case in which the BS may set a maximum number of TBs scheduled by one DCI is considered. For example, the BS may indicate the maximum number of TBs scheduled by one DCI by higher-layer signaling such as an SIB or RRC signaling.

In Method 3 of the present disclosure, it is proposed that the number of bits and information of each field in DCI are different according to the maximum number of TBs scheduled by one DCI, set by the BS. In a characteristic example, the DCI fields may include a bitmap representing NDI information of TBs, an MCS/TBS for the scheduled TBs, an RA, and other scheduling information. In the case where a structure of scheduling a plurality of TBs is supported, the proposed method may overcome the increase of the total number of DCI bits caused by an increase in the number of pieces of information required for each TB, proportional to the number of TBs scheduled by one DCI, and allow determination of an appropriate total number of DCI bits by evaluating the importance of network overhead and DCI decoding performance and their influence on performance.

When the proposed method of Method 3 is applied, the BS indicates a maximum number of TBs scheduled by one DCI by a higher-layer signal, and the number of DCI bits is set accordingly, the number of actual TBs scheduled by the DCI may be determined based on information included in the DCI. Further, a method of differentiating the sizes and interpretation of the remaining fields in the DCI according to the number of actually scheduled TBs may also be used. For example, the proposed methods of Method 1, Method 1-A, Method 1-B, and/or Method 2 proposed in the present disclosure may be used in combination with Method 3.

The proposed method of Method 3 may be configured by combining one or more of the following options.

(Option 3-1) Method 3 may include a method of determining the size of a field that may represent the NDIs of scheduled TBs according to the maximum number of TBs scheduled by one DCI, like Option 3-1. Characteristically, a method of determining the size of a field available as a bitmap representing the NDIs in proportion to the maximum number of TBs scheduled by one DCI may be considered. For example, when up to 8 HARQ processes may be supported as in CE mode A of MTC, and the BS designates up to $N_{TB}(\leq 8)$ TBs scheduled by one DCI, the size of the field available as an NDI bitmap may be set to up to Nm bits. Compared to DCI that may schedule all of 8 TBs, (8-Nm) bits may be reduced. The field available as an NDI bitmap may serve as the NDI bitmap or may be used partially to represent other information, according to the number of actually scheduled TBs.

(Option 3-2) Method 3 may include a method of determining the size of a field representing an MCS/TBS according to the maximum number of TBs scheduled by one DCI, like Option 3-2. Characteristically, as the maximum number of TBs scheduled by one DCI increases, a method of reducing the size of the field representing an MCS/TBS may be used. On the other hand, when the maximum number of TBs scheduled by one DCI is less than or equal to a specific value, the size of the field representing an MCS/TBS may be set to the maximum size of the DCI field available for an MCS/TBS purpose (e.g., the size of a DCI field for the MCS/TBS purpose used in the legacy DCI for single-TB scheduling only). For example, in MTC CE mode A, when the maximum number of TBs scheduled by one DCI, set by the BS is less than or equal to a specific number (or $N_{thr}$), the size of the DCI field that determines an MCS is 4 bits. Herein, the 4 bits may be subjected to the same MCS interpretation method as when the BS designates single-TB scheduling DCI. On the other hand, in the example of MTC CE mode A, when the maximum number of TBs scheduled by one DCI, set by the BS is greater than the specific number (or $N_{thr}$), the number of bits available for the DCI field determining an MCS may be set to 4 or less.

(Option 3-3) Method 3 may include a method of determining the size of a field indicating an RA according to the maximum number of TBs scheduled by one DCI, like Option 3-3. Characteristically, as the maximum number of TBs scheduled by one DCI increases, a method of reducing the size of the field representing RA information may be used. This may be intended to ensure scheduling flexibility at the same level as the legacy single-TB scheduling DCI under some condition (e.g., the maximum number of TBs scheduled by one DCI is less than or equal to a certain value), even though the size of the field for an RA purpose is decreased to reduce the total number of DCI bits. For example, in MTC CE mode A, when the maximum number of TBs scheduled by one DCI, set by the BS is less than or equal to a specific number (or $N_{thr}$), the minimum size of the DCI field that determines an RA is 5 bits. Herein, the 5 bits may be subjected to the same RA interpretation method as when the BS designates single-TB scheduling DCI. On the other hand, in the example of MTC CE mode A, when the maximum number of TBs scheduled by one DCI, set by the BS is greater than the specific number (or $N_{thr}$), the number of bits available for the DCI field determining an RA may be set to 4 or less.

(Option 3-4) Method 3 may include a method of determining the size of a DCI field indicating FH and/or an RV according to the maximum number of TBs scheduled by one DCI, like Option 3-4. Characteristically, according to the maximum number of TBs scheduled by one DCI, one of the methods of configuring FH and/or an RV proposed in Method 1 (e.g., refer to the descriptions of Method 1, Method 1-A, and Method 1-B) may be selected, or the FH and RV configuration method used in the legacy DCI may be selected. For example, in MTC CE mode A, in the case where the maximum number of TBs scheduled by one DCI, set by the BS is less than or equal to a specific value (or $N_{thr}$), when the size of the DCI field determining FH is 1 bit, and the size of the DCI field determining an RV is 2 bits, the same interpretation method as when the BS designates single-TB scheduling DCI may be applied to the DCI fields. On the other hand, when the maximum number of TBs scheduled by one DCI, set by the BS is greater than the specific value (or $N_{thr}$), one of the methods proposed in Method 1 (e.g., refer to the descriptions of Method 1, Method 1-A, and Method 1-B) may be applied.

As described above, the method of differentiating the sizes and interpretation of the remaining fields in DCI according to the number of actually scheduled TBs may be used together. For example, regarding an RV/FH, Method 3 may be used in combination with the proposed methods of Method 1, Method 1-A, and Method 1-B. In this case, the maximum number of TBs scheduled by one DCI may be replaced with the number of TBs scheduled by DCI.

In a more specific example, in the case where the methods proposed in Method 1, Method 1-A, and Method 1-B are used in combination with Method 3, when the number of TBs scheduled by DCI is equal to or less than a specific value (or $N_{thr}$), a 2-bit DCI field may be used/allocated for an RV for the specific number of (or $N_{thr}$) TBs, and a 1-bit DCI field may be used/allocated for FH for the specific number of (or $N_{thr}$) TBs in the same manner as single-TB scheduling DCI. When the number of TBs scheduled by the DCI is greater than the specific value (or $N_{thr}$), the numbers of bits of the DCI fields for the RV and FH of the specific number of (or $N_{thr}$) TBs may be determined according to the methods proposed in Method 1, Method 1-A, and Method 1-B. For example, when Method 1 (e.g., the method related to Table 15 or Method 1-B) is applied, a 1-bit field indicating the RV and FH of the specific number of (or $N_{thr}$) TBs may be used/allocated in the DCI. When Method 1 (e.g., the method related to Table 13 or Table 14) is applied, a 2-bit field indicating the RV and FH of the specific number of (or $N_{thr}$) TBs may be used/allocated in the DCI.

In this example, when the number of TBs scheduled by the DCI is less than or equal to the specific value (or $N_{thr}$), the same method as the single-TB scheduling DCI may be applied, and thus the specific value (or $N_{thr}$) may be 1. Therefore, the BS may determine the number of TBs to be scheduled for the UE, generate DCI including a 2-bit field indicating an RV for one TB and a 1-bit field indicating FH for the one TB, when the number of TBs to be scheduled is 1 or DCI including a 1-bit field (e.g., refer to the method related to Table 15 or Method 1-B) or a 2-bit field (e.g., refer to the method related to Table 13 or Table 14) indicating an RV and/or FH for a plurality of TBs, when the number of TBs to be scheduled is greater than 1, and then transmit the generated DCI to the UE (e.g., S2204). The BS may transmit the TB(s) scheduled based on the transmitted DCI to the UE or receive the TB(s) from the UE (e.g., S2206). The UE may receive the DCI scheduling one or more TBs from the BS (e.g., S2304). When the number of scheduled TBs is 1, the UE may obtain 2-bit information indicating an RV for one TB and 1-bit information indicating FH for the one TB. When the number of scheduled TBs is greater than 1, the UE may obtain 1-bit information indicating an RV and/or FH for a plurality of TBs (e.g., refer to the method related to Table 15 or Method 1-B) or 2-bit information indicating the RV and/or FH of the plurality of TBs indicating FH (e.g., refer to the method related to Table 13 or Table 14) from the received DCI. The UE may determine whether to apply the RV and FH based on the information obtained from the DCI, and may receive or transmit the scheduled TB(s) from or to the BS (e.g., S2306).

(Option 3-A) Method 3 may include a method of determining whether to apply the methods proposed in Method 2 according to the maximum number of TBs scheduled by one DCI, like Option 3-A. For example, in MTC CE mode A, when the maximum number of TBs scheduled by one DCI, set by the BS is less than or equal to a specific value (or $N_{thr}$), the size of a DCI field that determines an MCS is always 4 bits, and the 4-bit region may represent the same MCS information regardless of the number of scheduled TBs. On the other hand, in the above example of MTC CE mode A, when the maximum number of TBs scheduled by one DCI, set by the BS is greater than the specific value (or $N_{thr}$), the size and interpretation of the DCI field representing an MCS/TBS may be determined to be different according to the number of actually scheduled TBs, as in the method proposed in Option 2-3. While the above example has been described in the context of the DCI field determining an MCS/TBS, the principle of the proposed method may be applied to other DCI fields (e.g., RA, FH, and/or RV) to which Method 3 is applicable.

(Method 4)

In Method 4 of the present disclosure, multi-TB scheduling is considered to dynamically schedule one or more TBs by one DCI. For example, the BS may dynamically configure the number of scheduled TBs for the UE by DCI.

In Method 4 of the present disclosure, a method of differentiating the size and interpretation of a DCI field indicating MCS/TBS information for scheduled TBs or a DCI field indicating RV and/or FH information for the scheduled TBs according to the number of TBs dynamically scheduled by DCI is proposed. The proposed method may be used to dynamically determine the scheduling flexibility of an RV and FH based on the property that each field included in DCI requires a different degree of scheduling flexibility according to the number of scheduled TBs.

For the size and interpretation of a DCI field indicating an RV and FH in Method 4, the proposed methods of Method 1 (e.g., refer to the descriptions of Method 1, Method 1-A, and Method 1-B) may be used. For example, the DCI field indicating an RV and FH may be interpreted by selecting one of the tables (e.g., Table 13 to Table 16) proposed in Method 1 according to the number of TBs scheduled by the corresponding DCI. Alternatively, for the size and interpretation of the DCI field indicating an RV and FH, the DCI field indicating an RV and FH defined in the legacy DCI (e.g., 2 bits for an RV and 1 bit for FH) may be used. In a more specific example, when the number of TBs scheduled by DCI is equal to or larger than a specific value (e.g., 2), the DCI field indicating an RV and FH may be used/allocated according to one of the methods proposed in Method 1 (e.g., refer to the descriptions of Method 1, Method 1-A, and Method 1-B). When the number of TBs scheduled by the DCI is less than the specific value (e.g., 2), the same DCI field for an RV and FH as used in the legacy DCI may be used/allocated.

In one of specific methods proposed in Method 4, when the number of TBs scheduled by DCI is 1, P bits may be used to represent an RV and FH. When the number of TBs scheduled by the DCI is two or more, Q (<P) bits may be used to represent an RV and FH. P and Q are positive integers.

For example, a 2-bit RV field and a 1-bit FH field may be separately used/allocated in the legacy DCI, whereas P=3 and Q=1 in Method 1 (e.g., the method related to Table 15 or Method 1-B). In this example, the BS may determine the number of TBs to be scheduled for the UE. When the number of TBs to be scheduled is 1, the BS may generate DCI including a 2-bit field indicating an RV for the one TB and a 1-bit field indicating FH for the one TB, whereas when the number of TBs to be scheduled is two or more, the BS may generate DCI including a 1-bit field indicating an RV or FH for the plurality of TBs. Then, the BS may transmit the generated DCI to the UE (e.g., S2204). The BS may transmit or receive the scheduled TB(s) to or from the UE based on the transmitted DCI (e.g., S2206). The UE may receive the DCI scheduling one or more TBs from the BS (e.g., S2304). When the number of scheduled TBs is 1, the UE may obtain 2-bit information indicating an RV for the one TB and 1-bit information indicating FH for the one TB. When the number of scheduled TBs is greater than 1, the UE may obtain 1-bit information indicating an RV and/or FH for the plurality of TBs. The UE may determine the RV and whether to apply FH based on the information obtained from the DCI, and may receive or transmit the scheduled TB(s) from or to the BS (e.g., S2306).

In another example, a 2-bit RV field and a 1-bit FH field may be separately used/allocated in the legacy DCI, whereas P=3 and Q=1 in Method 1 (e.g., the method related to Table 13 or Table 14). In this example, the BS may determine the number of TBs to be scheduled for the UE. When the number of TBs to be scheduled is 1, the BS may generate DCI including a 2-bit field indicating an RV for the one TB and a 1-bit field indicating FH for the one TB, whereas when the number of TBs to be scheduled is two or more, the BS may generate DCI including a 2-bit field indicating an RV or FH for the plurality of TBs. Then, the BS may transmit the generated DCI to the UE (e.g., S2204). The BS may transmit or receive the scheduled TB(s) to or from the UE based on the transmitted DCI (e.g., S2206). The UE may receive the DCI scheduling one or more TBs from the BS (e.g., S2304). When the number of scheduled TBs is 1, the UE may obtain 2-bit information indicating an RV for the one TB and 1-bit information indicating FH for the one TB. When the number of scheduled TBs is two or more, the UE may obtain 2-bit information indicating an RV and/or FH for the plurality of TBs. The UE may determine the RV and whether to apply FH based on the information obtained from the DCI, and may receive or transmit the scheduled TB(s) from or to the BS (e.g., S2306).

This may be intended to ensure scheduling flexibility at the same level as or a similar level to that of the legacy DCI, when the BS is to schedule only one TB.

In one of specific methods proposed in Method 4, when the number of TBs scheduled by DCI is 1, P bits may be used to indicate an MCS/TBS, whereas when a plurality of TBs are scheduled by DCI, Q (<P) bits may be used to represent an MCS/TBS. For example, P=4 and Q=3. This may be intended to ensure scheduling flexibility at the same level as or a similar level to that of the legacy DCI, when the BS is to schedule only one TB.

G. Communication System and Devices to which the Present Disclosure is Applied

Various descriptions, functions, procedures, proposals, methods, and/or flowcharts of the present disclosure may be applied to, but not limited to, various fields requiring wireless communication/connection (e.g., 5G) among devices.

Hereinafter, they will be described in more detail with reference to the drawings. In the following drawings/description, the same reference numerals may denote the same or corresponding hardware blocks, software blocks, or functional blocks, unless specified otherwise.

Figure 25:
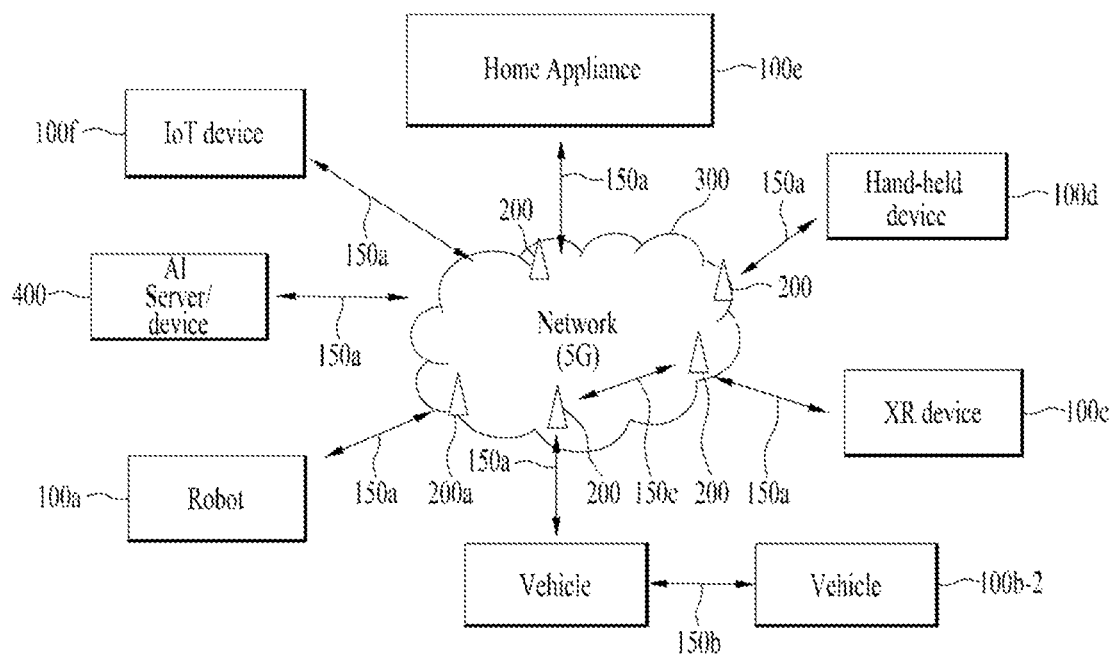
FIG. 25 is a diagram illustrating an exemplary communication system applied to the present disclosure.

FIG. 25 illustrates a communication system 1 applied to the present disclosure.

Referring to FIG. 25, the communication system 1 applied to the present disclosure includes wireless devices, base stations (BSs), and a network. The wireless devices refer to devices performing communication by radio access technology (RAT) (e.g., 5G New RAT (NR) or LTE), which may also be called communication/radio/5G devices. The wireless devices may include, but no limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle equipped with a wireless communication function, an autonomous driving vehicle, and a vehicle capable of performing vehicle-to-vehicle (V2V) communication. The vehicles may include an unmanned aerial vehicle (UAV) (e.g., a drone). The XR device may include an augmented reality (AR)/virtual reality (VR)/mixed reality (MR) device, and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smart glasses), and a computer (e.g., a laptop). The home appliance may include a TV, a refrigerator, and a washing machine. The IoT device may include a sensor and a smart meter. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured by using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f and the BSs 200, or between the BSs 200. Herein, the wireless communication/connections may be established through various RATs (e.g., 5G NR) such as UL/DL communication 150a, sidelink communication 150b (or, D2D communication), or inter-BS communication 150c (e.g. relay, integrated access backhaul (IAB)). A wireless device and a BS/a wireless devices, and BSs may transmit/receive radio signals to/from each other through the wireless communication/connections 150a, 150b, and 150c. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 26:
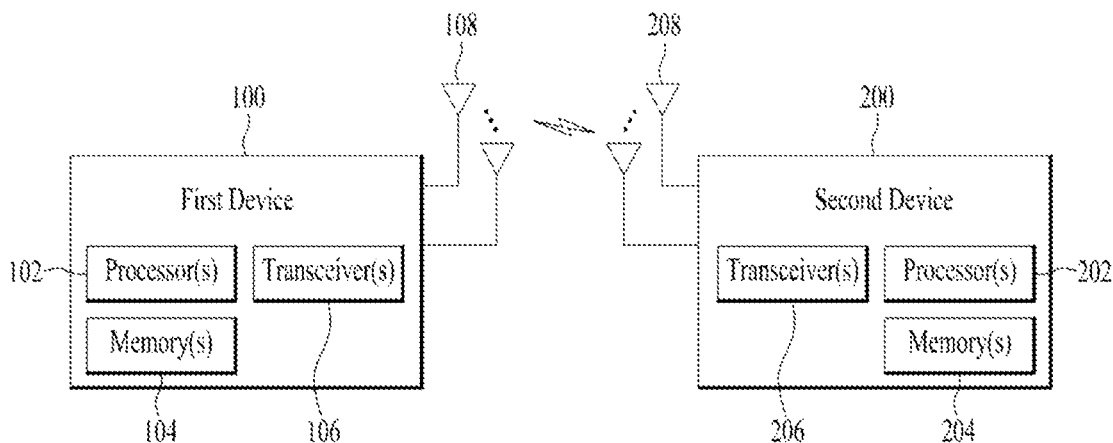
FIG. 26 is a diagram illustrating an exemplary wireless device applied to the present disclosure.

FIG. 26 illustrates wireless devices applicable to the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless devices 100a to 100f and the BSs 200} and/or {the wireless devices 100a to 100f and the wireless devices 100a to 100f} of FIG. 25.

The first wireless device 100 may include at least one processor 102 and at least one memory 104, and may further include at least one transceiver 106 and/or at least one antenna 108. The processor 102 may control the memory 104 and/or the transceiver 106 and may be configured to implement the descriptions, functions, procedures, proposals, methods, and/or operational flowcharts disclosed in this document. For example, the processor 102 may process information within the memory 104 to generate first information/signal and then transmit a radio signal including the first information/signal through the transceiver 106. The processor 102 may receive a radio signal including second information/signal through the transceiver 106 and then store information obtained by processing the second information/signal in the memory 104. The memory 104 may be coupled to the processor 102 and store various types of information related to operations of the processor 102. For example, the memory 104 may store software code including commands for performing a part or all of processes controlled by the processor 102 or for performing the descriptions, functions, procedures, proposals, methods, and/or operational flowcharts disclosed in this document. Herein, the processor 102 and the memory 104 may be a part of a communication modem/circuit/chip designed to implement an RAT (e.g., LTE or NR). The transceiver 106 may be coupled to the processor 102 and transmit and/or receive radio signals through the at least one antenna 108. The transceiver 106 may include a transmitter and/or a receiver. The transceiver 106 may be interchangeably used with an RF unit. In the present disclosure, a wireless device may refer to a communication modem/circuit/chip.

The second wireless device 200 may include at least one processor 202 and at least one memory 204, and may further include at least one transceiver 206 and/or at least one antenna 208. The processor 202 may control the memory 204 and/or the transceiver 206 and may be configured to implement the descriptions, functions, procedures, proposals, methods, and/or operational flowcharts disclosed in this document. For example, the processor 202 may process information within the memory 204 to generate third information/signal and then transmit a radio signal including the third information/signal through the transceiver 206. The processor 202 may receive a radio signal including fourth information/signal through the transceiver 206 and then store information obtained by processing the fourth information/signal in the memory 204. The memory 204 may be coupled to the processor 202 and store various types of information related to operations of the processor 202. For example, the memory 204 may store software code including commands for performing a part or all of processes controlled by the processor 202 or for performing the descriptions, functions, procedures, proposals, methods, and/or operational flowcharts disclosed in this document. Herein, the processor 202 and the memory 204 may be a part of a communication modem/circuit/chip designed to implement an RAT (e.g., LTE or NR). The transceiver 206 may be coupled to the processor 202 and transmit and/or receive radio signals through the at least one antenna 208. The transceiver 206 may include a transmitter and/or a receiver. The transceiver 206 may be interchangeably used with an RF unit. In the present disclosure, a wireless device may refer to a communication modem/circuit/chip.

Hereinafter, hardware elements of the wireless devices 100 and 200 will be described in greater detail. One or more protocol layers may be implemented by, but not limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more protocol data units (PDUs) and/or one or more service data units (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented in hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operational flowcharts disclosed in this document may be implemented in firmware or software, which may be configured to include modules, procedures, or functions. Firmware or software configured to perform the descriptions, functions, procedures, proposals, methods, and/or operational flowcharts disclosed in this document may be included in the one or more processors 102 and 202, or may be stored in the one or more memories 104 and 204 and executed by the one or more processors 102 and 202. The descriptions, functions, procedures, proposals, methods, and/or operational flowcharts disclosed in this document may be implemented as code, instructions, and/or a set of instructions in firmware or software.

The one or more memories 104 and 204 may be coupled to the one or more processors 102 and 202 and store various types of data, signals, messages, information, programs, code, instructions, and/or commands. The one or more memories 104 and 204 may be configured as read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be coupled to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be coupled to the one or more processors 102 and 202 and transmit and receive radio signals. For example, the one or more processors 102 and 202 may control the one or more transceivers 106 and 206 to transmit user data, control information, or radio signals to one or more other devices. The one or more processors 102 and 202 may control the one or more transceivers 106 and 206 to receive user data, control information, or radio signals from one or more other devices. The one or more transceivers 106 and 206 may be coupled to the one or more antennas 108 and 208 and configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
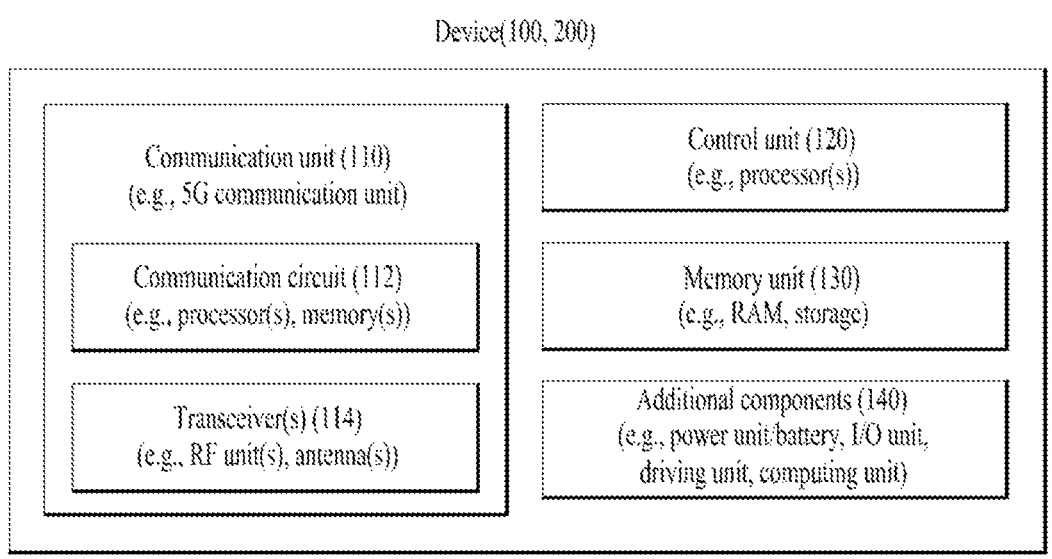
FIG. 27 is a diagram illustrating another exemplary wireless device applied to the present disclosure.

FIG. 27 illustrates another example of wireless devices applied to the present disclosure. The wireless devices may be implemented in various forms according to use-cases/services (refer to FIG. 25).

Referring to FIG. 27, wireless devices 100 and 200 may correspond to the wireless devices 100 and 200 of FIG. 26 and may be configured as various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically coupled to the communication unit 110, the memory unit 130, and the additional components 140 and provides overall control to operations of the wireless devices. For example, the control unit 120 may control an electric/mechanical operation of the wireless device based on programs/code/commands/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to the types of wireless devices. For example, the additional components 140 may include at least one of a power unit/battery, an input/output (I/O) unit, a driver, and a computing unit. The wireless device may be configured as, but not limited to, the robot (100a of FIG. 25), the vehicles (100b-1 and 100b-2 of FIG. 25), the XR device (100c of FIG. 25), the hand-held device (100d of FIG. 25), the home appliance (100e of FIG. 25), the IoT device (100f of FIG. 25), a digital broadcasting terminal, a hologram device, a public safety device, an MTC device, a medicine device, a FinTech device (or a finance device), a security device, a climate/environment device, the AI server/device (400 of FIG. 25), the BSs (200 of FIG. 25), a network node, etc. The wireless device may be mobile or fixed according to a use-case/service.

In FIG. 27, all of the various elements, components, units/portions, and/or modules in the wireless devices 100 and 200 may be coupled to each other through a wired interface or at least a part thereof may be wirelessly coupled to each other through the communication unit 110. For example, in each of the wireless devices 100 and 200, the control unit 120 and the communication unit 110 may be coupled wiredly, and the control unit 120 and first units (e.g., 130 and 140) may be wirelessly coupled through the communication unit 110. Each element, component, unit/portion, and/or module within the wireless devices 100 and 200 may further include one or more elements. For example, the control unit 120 may be configured as a set of one or more processors. For example, the control unit 120 may be configured as a set of a communication control processor, an application processor, an electronic control unit (ECU), a graphical processing unit, and a memory control processor. In another example, the memory unit 130 may be configured as a random access memory (RAM), a dynamic RAM (DRAM), a read only memory (ROM), a flash memory, a volatile memory, a non-volatile memory, and/or a combination thereof.

An implementation example of FIG. 27 will be described in detail with reference to the drawings.

Figure 28:
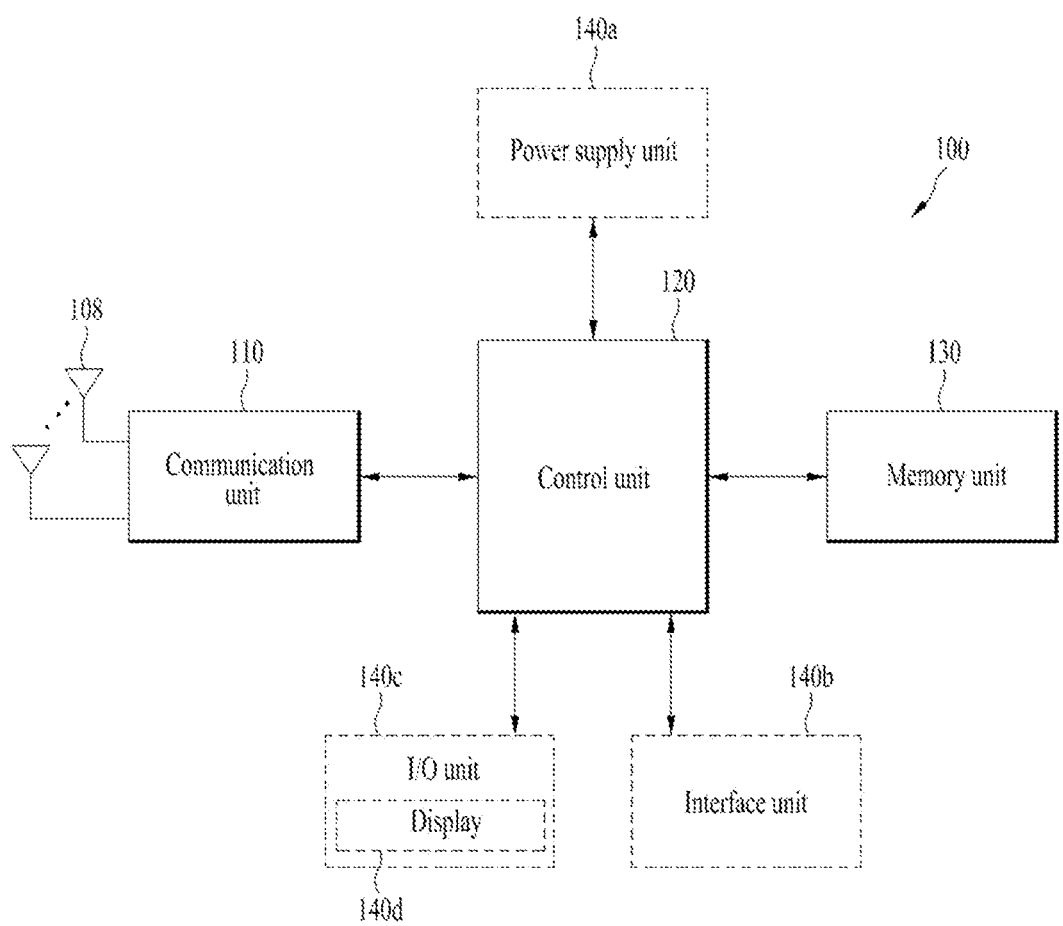
FIG. 28 is a diagram illustrating an exemplary portable device applied to the present disclosure.

FIG. 28 illustrates a portable device applied to the present disclosure. The portable device may include a smartphone, a smartpad, a wearable device (e.g., a smart watch and smart glasses), and a portable computer (e.g., a laptop). The portable device may be referred to as a mobile station (MS), a user terminal (UT), a mobile subscriber station (MSS), a subscriber station (SS), an advanced mobile station (AMS), or a wireless terminal (WT).

Referring to FIG. 28, a portable device 100 may include an antenna unit 108, a communication unit 110, a control unit 120, a power supply unit 140a, an interface unit 140b, and an I/O unit 140c. The antenna unit 108 may be configured as a part of the communication unit 110. The blocks 110 to 130/140a to 140c correspond to the blocks 110 to 130/140 of FIG. 27, respectively.

The communication unit 110 may transmit and receive signals (e.g., data and control signals) to and from another wireless device and a BS. The control unit 120 may perform various operations by controlling elements of the portable device 100. The control unit 120 may include an application processor (AP). The memory unit 130 may store data/parameters/programs/code/commands required for operation of the portable device 100. Further, the memory unit 130 may store input/output data/information. The power supply unit 140a may supply power to the portable device 100, and include a wired/wireless charging circuit and a battery. The interface unit 140b may include various ports (e.g., an audio I/O port and a video I/O port) for connectivity to external devices The I/O unit 140c may acquire information/signals (e.g., touch, text, voice, images, and video) input by a user, and store the acquired information/signals in the memory unit 130. The communication unit 110 may receive or output video information/signal, audio information/signal, data, and/or information input by the user. The I/O unit 140c may include a camera, a microphone, a user input unit, a display 140d, a speaker, and/or a haptic module.

For example, for data communication, the I/O unit 140c may acquire information/signals (e.g., touch, text, voice, images, and video) received from the user and store the acquired information/signal sin the memory unit 130. The communication unit 110 may convert the information/signals to radio signals and transmit the radio signals directly to another device or to a BS. Further, the communication unit 110 may receive a radio signal from another device or a BS and then restore the received radio signal to original information/signal. The restored information/signal may be stored in the memory unit 130 and output in various forms (e.g., text, voice, an image, video, and a haptic effect) through the I/O unit 140c.

Figure 29:
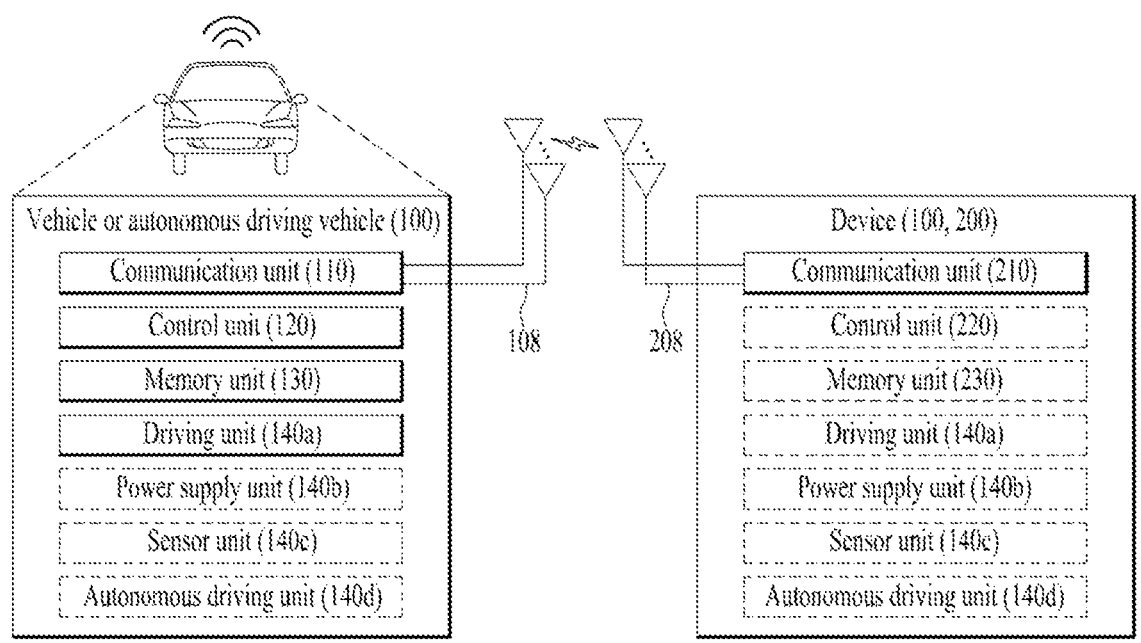
FIG. 29 is a diagram illustrating an exemplary vehicle or autonomous driving vehicle applied to the present disclosure.

FIG. 29 illustrates a vehicle or an autonomous driving vehicle applied to the present disclosure. The vehicle or autonomous driving vehicle may be configured as a mobile robot, a car, a train, a manned/unmanned aerial vehicle (AV), a ship, or the like.

Referring to FIG. 29, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 27, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to travel on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire vehicle state information, ambient environment information, user information, and so on. The sensor unit 140c may include an inertial measurement unit (IU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement a technology for maintaining a lane on which a vehicle is driving, a technology for automatically adjusting speed, such as adaptive cruise control, a technology for autonomously traveling along a determined path, a technology for traveling by automatically setting a path, when a destination is set, and the like.

For example, the communication unit 110 may receive map data, traffic information data, and so on from an external server. The autonomous driving unit 140*d* may generate an autonomous driving path and a driving plan from the obtained data. The control unit 120 may control the driving unit 140*a* such that the vehicle or autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain vehicle state information and/or ambient environment information. The autonomous driving unit 140*d* may update the autonomous driving path and the driving plan based on the newly obtained data/information. The communication unit 110 may transmit information about a vehicle position, the autonomous driving path, and/or the driving plan to the external server. The external server may predict traffic information data using AI technology or the like, based on the information collected from vehicles or autonomous driving vehicles and provide the predicted traffic information data to the vehicles or the autonomous driving vehicles.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment. It is obvious to those skilled in the art that claims that are not explicitly cited in each other in the appended claims may be presented in combination as an embodiment of the present disclosure or included as a new claim by a subsequent amendment after the application is filed.

The present disclosure is applicable to wireless communication devices such as a user equipment (UE) and a base station (BS) operating in various wireless communication systems including 3GPP LTE/LTE-A/5G (or New RAT (NR)).

What is claimed is:

1. A method performed by a user equipment (UE) in a wireless communication system supporting multiple transport block scheduling, the method comprising:
  receiving downlink control information (DCI) for scheduling one or more transport blocks, the DCI including first information regarding a number of the scheduled one or more transport blocks and second information regarding a repetition number of each transport block; and
  obtaining information from the DCI based on the number of the scheduled one or more transport blocks,
  wherein obtaining the information from the DCI comprises:
    based on the number of the scheduled one or more transport blocks being a first number, obtaining first redundancy version (RV) information from 2-bit of the DCI;
    based on the number of the scheduled one or more transport blocks being a second number different from the first number and the repetition number not exceeding a threshold, obtaining second RV information from a specific 1-bit of the DCI; and
    based on the number of the scheduled one or more transport blocks being the second number and the repetition number exceeding the threshold, (i) obtaining frequency hopping information instead of the second RV information from the specific 1-bit of the DCI and (ii) determining that all the second number of the scheduled one or more transport blocks are related to RV0.

2. The method according to claim 1, wherein the second RV information indicates a redundancy version of 0 or 2.

3. The method according to claim 1, wherein the first RV information indicates one of redundancy versions of 0, 1, 2, and 3.

4. The method according to claim 1, wherein the DCI includes new data indicator (NDI) information having a same number of bits as the number of the scheduled one or more transport blocks.

5. The method according to claim 1, further comprising:
  transmitting the one or more transport blocks on a physical uplink shared channel (PUSCH) based on the DCI.

6. The method according to claim 1, further comprising:
  receiving the one or more transport blocks on a physical downlink shared channel (PDSCH) based on the DCI.

7. The method according to claim 6, wherein the UE is not configured to use 64-quadrature amplitude modulation (64QAM).

8. The method according to claim 1, wherein the DCI is configured to schedule up to 8 transport blocks.

9. The method according to claim 1, further comprising:
  receiving a higher-layer signal indicating a maximum number of transport blocks scheduled by one DCI.

10. A device configured to perform wireless communication system, the device comprising:
  a memory configured to store instructions; and
  a processor configured to execute the instructions to perform operations comprising:
  receiving downlink control information (DCI) for scheduling one or more transport blocks, the DCI including first information regarding a number of the scheduled one or more transport blocks and second information regarding a repetition number of each transport block; and
  obtaining information from the DCI based on the number of the scheduled one or more transport blocks,
  wherein obtaining the information from the DCI comprises:
    based on the number of the scheduled one or more transport blocks being a first number, obtaining first redundancy version (RV) information from 2-bit of the DCI;
    based on the number of the scheduled one or more transport blocks being a second number different from the first number and the repetition number not exceeding a threshold, obtaining second RV information from a specific 1-bit of the DCI; and
    based on the number of the scheduled one or more transport blocks being the second number and the repetition number exceeding the threshold, (i)

obtaining frequency hopping information instead of the second RV information from the specific 1-bit of the DCI and (ii) determining that all the second number of the scheduled one or more transport blocks are related to RV0.

11. A non-transitory medium readable by a processor and storing instructions which, when executed by the processor, are configured to cause the processor to perform the method according to claim 1.

12. The device according to claim 10, further comprising: a transceiver configured to transmit or receive a wireless signal under control of the processor.

13. The device according to claim 10, wherein the device is a user equipment (UE) configured to operate in a wireless communication system.

14. The device according to claim 10, wherein the device is application specific integrated circuit (ASIC) or a digital signal processing device.

15. A method performed by a base station (BS) in a wireless communication system supporting multiple transport block scheduling, the method comprising:
generating downlink control information (DCI) for scheduling one or more transport blocks, the DCI including first information regarding a number of the scheduled one or more transport blocks and second information regarding a repetition number of each transport block; and
transmitting the DCI to a user equipment (UE),
wherein generating the DCI comprises:
based on the number of the scheduled one or more transport blocks being a first number, setting first redundancy version (RV) information to 2-bit of the DCI;
based on the number of the scheduled one or more transport blocks being a second number different from the first number and the repetition number not exceeding a threshold, setting second RV information to a specific 1-bit of the DCI; and
based on the number of the scheduled one or more transport blocks being the second number and the repetition number exceeding the threshold, setting frequency hopping information instead of the second RV information to the specific 1-bit of the DCI, wherein all the second number of the scheduled one or more transport blocks are related to RV0.

16. A device configured to operate in a wireless communication system, the device comprising:
a memory configured to store instructions; and
a processor configured to execute the instructions to perform operations comprising:
generating downlink control information (DCI) for scheduling one or more transport blocks, the DCI including first information regarding a number of the scheduled one or more transport blocks and second information regarding a repetition number of each transport block; and
transmitting the DCI to a user equipment (UE),
wherein generating the DCI comprises:
based on the number of the scheduled one or more transport blocks being a first number, setting first redundancy version (RV) information to 2-bit of the DCI;
based on the number of the scheduled one or more transport blocks being a second number different from the first number and the repetition number not exceeding a threshold, setting second RV information to a specific 1-bit of the DCI; and
based on the number of the scheduled one or more transport blocks being the second number and the repetition number exceeding the threshold, setting frequency hopping information instead of the second RV information to the specific 1-bit of the DCI, wherein all the second number of the scheduled one or more transport blocks are related to RV0.

* * * * *